US012705791B2

(12) United States Patent
Streem et al.

(10) Patent No.: US 12,705,791 B2
(45) Date of Patent: Aug. 11, 2026

(54) LOCALIZATION PROCESSING SERVICE

(71) Applicant: AEROCINE VENTURES, INC., Jackson Heights, NY (US)

(72) Inventors: Brian Streem, Jackson Heights, NY (US); Ricardo Achilles Filho, Bauru (BR); Vijaykumar Sureshkumar, Jersey City, NJ (US)

(73) Assignee: AEROCINE VENTURES, INC., Jackson Heights, NY (US)

( * ) Notice: Subject to any disclaimer, the term of this patent is extended or adjusted under 35 U.S.C. 154(b) by 693 days.

(21) Appl. No.: 17/836,985

(22) Filed: Jun. 9, 2022

(65) Prior Publication Data

US 2022/0398775 A1 Dec. 15, 2022

Related U.S. Application Data

(60) Provisional application No. 63/208,634, filed on Jun. 9, 2021.

(51) Int. Cl.

| | |
|---|---|
| ***G06T 7/73*** | (2017.01) |
| ***G06F 16/55*** | (2019.01) |
| ***G06T 17/05*** | (2011.01) |
| ***G06V 10/44*** | (2022.01) |
| ***G06V 10/75*** | (2022.01) |
| ***G06V 10/764*** | (2022.01) |
| ***G06V 10/776*** | (2022.01) |

(52) U.S. Cl.

CPC ................ *G06T 7/74* (2017.01); *G06F 16/55* (2019.01); *G06T 17/05* (2013.01); *G06V 10/443* (2022.01); *G06V 10/751* (2022.01); *G06V 10/764* (2022.01); *G06V 10/776* (2022.01); *G06T 2200/08* (2013.01); *G06T 2207/20081* (2013.01)

(58) Field of Classification Search

CPC ....... G06T 7/74; G06T 17/05; G06T 2200/08; G06T 2207/20081; G06T 7/75; G06T 2207/10016; G06T 2207/10024; G06T 2207/10032; G06T 2207/10048; G06T 2207/20076; G06T 2207/20084; G06T 2207/30252; G06F 16/55; G06F 16/29; G06F 16/587; G06V 10/443; G06V 10/751; G06V 10/764; G06V 10/776; G06V 10/75; G06V 20/56

See application file for complete search history.

(56) References Cited

U.S. PATENT DOCUMENTS

| | | | |
|---|---|---|---|
| 7,822,264 | B2 | 10/2010 | Balslev et al. |
| 8,509,488 | B1 | 8/2013 | Enge et al. |
| 9,467,660 | B1 | 10/2016 | Edelstein |
| 9,483,842 | B2 | 11/2016 | Haglund et al. |
| 9,964,955 | B2 | 5/2018 | Keivan et al. |

(Continued)

OTHER PUBLICATIONS

Facebook AI Similarity Search: https://github.com/facebookresearch/faiss.

(Continued)

*Primary Examiner* — Oneal R Mistry
*Assistant Examiner* — Jongbong Nah
(74) *Attorney, Agent, or Firm* — Van Court & Aldridge LLP

(57) ABSTRACT

Systems, methods, and computer-readable media for providing a localization processing service for enabling localization of a navigation network-restricted subsystem are provided.

30 Claims, 18 Drawing Sheets

(56) References Cited

U.S. PATENT DOCUMENTS 10,515,458 B1* 12/2019 Yakimenko .............. G06T 7/33
10,992,755 B1 4/2021 Tran
2010/0253598 A1* 10/2010 Szczerba ............. G06V 10/806 701/532
2011/0064312 A1* 3/2011 Janky ....................... G06T 7/74 382/195
2012/0184845 A1* 7/2012 Ishikawa ............... G06V 10/50 600/425
2013/0243250 A1* 9/2013 France .................. G06V 20/10 382/103
2019/0088030 A1 3/2019 Masterson
2019/0129431 A1* 5/2019 Yalla ................. G01C 21/3848
2019/0147221 A1* 5/2019 Grabner ................... G06T 7/75 382/103
2019/0355173 A1 11/2019 Gao
2020/0218690 A1* 7/2020 Huston .................. G06F 16/00
2020/0300637 A1* 9/2020 Chiu ..................... G05D 1/027
2021/0095992 A1* 4/2021 Kitaura .................. G06T 7/579
2022/0029941 A1 1/2022 Holmes
2022/0148219 A1* 5/2022 Kim ......................... G06T 7/74
2022/0398775 A1* 12/2022 Streem ................... G06T 17/05
2023/0087702 A1 3/2023 Carnahan
2023/0168106 A1 6/2023 Velkavrh
2023/0314162 A1 10/2023 Mori

OTHER PUBLICATIONS

Devil is in the Edges: Learning Semantic Boundaries from Noisy Annotations, Acuna et. al. (2019).
VLASE: Vehicle Localization by Aggregating Semantic Edges: https://github.com/sagachat/VLASE.
NetVLAD: CNN architecture for weakly supervised place recognition, Arandjelovic et al. (2016).
SuperPoint: Self-Supervised Interest Point Detection and Description, DeTone et al. (2017).

* cited by examiner

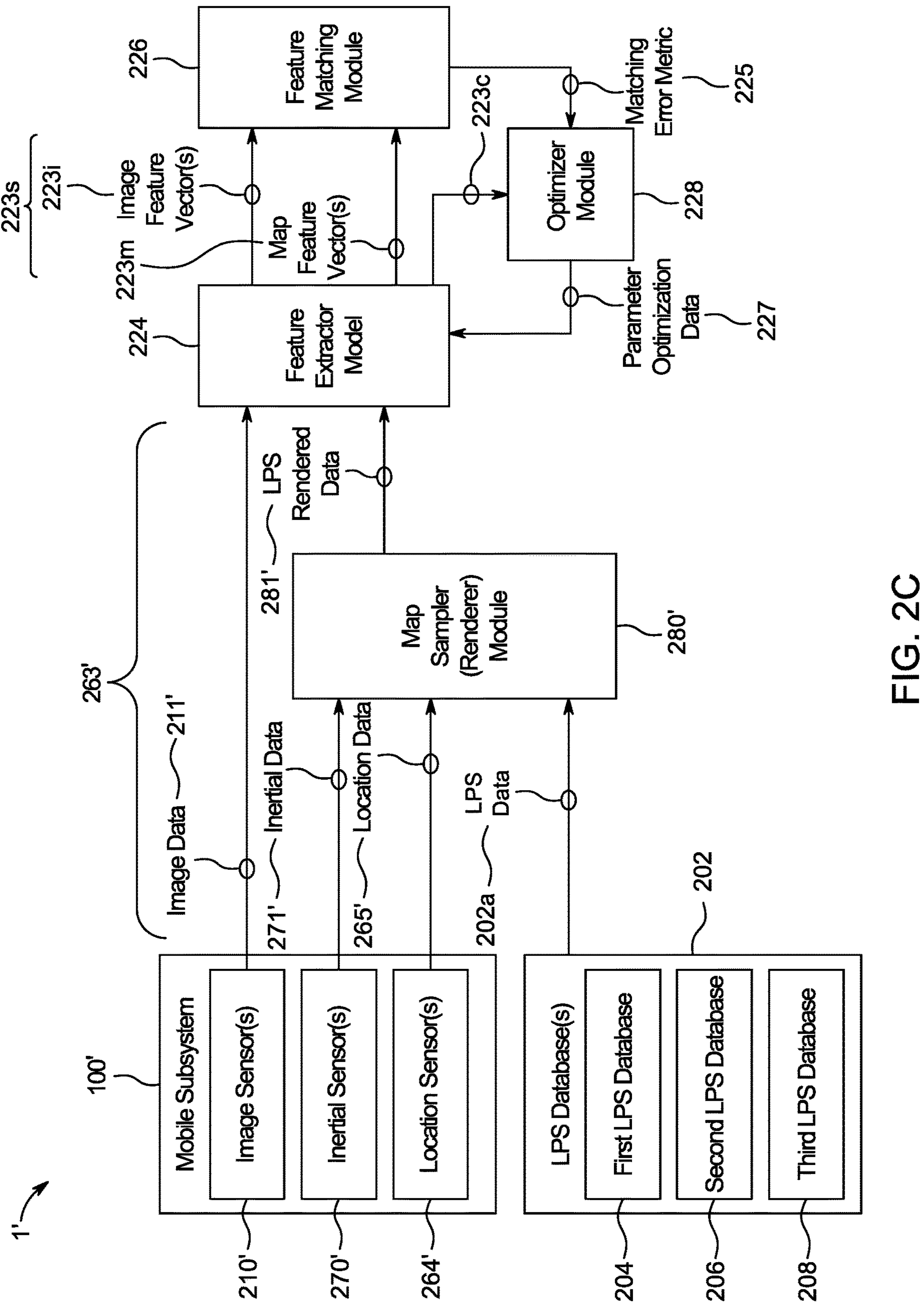
1'
100'
Mobile Subsystem
Image Sensor(s)
Inertial Sensor(s)
Location Sensor(s)
210'
270'
264'
LPS Database(s)
First LPS Database
Second LPS Database
Third LPS Database
202
204
206
208
Image Data
211'
271'
Inertial Data
265'
Location Data
202a
LPS Data
263'
Map Sampler (Renderer) Module
280'
281'
LPS Rendered Data
Feature Extractor Model
224
223m
Map Feature Vector(s)
223s
223i
Image Feature Vector(s)
Feature Matching Module
226
223c
Optimizer Module
228
Matching Error Metric
225
Parameter Optimization Data
227
FIG. 2C

LOCALIZATION PROCESSING SERVICE

CROSS-REFERENCE TO RELATED APPLICATION(S)

This application claims the benefit of prior filed U.S. Provisional Patent Application No. 63/208,634, filed Jun. 9, 2021, which is hereby incorporated by reference herein in its entirety.

COPYRIGHT NOTICE

At least a portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

TECHNICAL FIELD

This disclosure relates to a localization processing service and, more particularly, to a localization processing service for enabling localization of a navigation network-restricted subsystem.

BACKGROUND OF THE DISCLOSURE

Localizing a subsystem (e.g., a vehicle or other mobile subsystem) has commonly become reliant on a satellite navigation network to provide autonomous geo-spatial positioning, thereby threatening the localization process when network communication is restricted or denied.

SUMMARY OF THE DISCLOSURE

This document describes systems, methods, and computer-readable media for providing a localization processing service.

For example, a method of localizing a mobile subsystem including an image sensor component, an orientation sensor component, a memory component, and a processing module communicatively coupled to the image sensor component, the orientation sensor component, and the memory component is provided that may include storing, with the memory component, a map feature database including a plurality of map feature entries, wherein each map feature entry of the plurality of map feature entries is respectively associated with a rendered map image of a plurality of rendered map images rendered from a georeferenced three-dimensional map and each map feature entry of the plurality of map feature entries includes at least one map feature vector indicative of at least one map feature that has been extracted from the rendered map image associated with the map feature entry, and capturing, at a moment in time with the image sensor component, an image, extracting, with the processing module, at least one captured image feature from the captured image, generating, with the processing module, at least one captured image feature vector based on at least one of the at least one extracted captured image feature, comparing, with the processing module, the at least one captured image feature vector with at least one map feature vector from each map feature entry of at least a portion of the plurality of map feature entries of the stored map feature database, classifying, with the processing module, at least one particular map feature entry of the plurality of map feature entries as a matching map feature entry based on the comparing, and defining, with the processing module, an estimated location of the mobile subsystem at the moment in time based on the classifying.

As another example, a method of localizing a mobile subsystem including an image sensor component, a memory component, and a processing module communicatively coupled to the image sensor component and the memory component is provided that may include storing, with the memory component, a global map feature database including a plurality of global map feature entries, wherein each global map feature entry of the plurality of global map feature entries includes a global map feature that has been extracted from a respective global map image that has been rendered from a first three-dimensional map and a global map location of the respective global map image, storing, with the memory component, a local map feature database including a plurality of local map feature entries, wherein each local map feature entry of the plurality of local map feature entries includes a local map feature that has been extracted from a respective local map image that has been rendered from a second three-dimensional map and a local map location of the respective local map image, capturing, at a moment in time with the image sensor component, an image sensor image of an environment of the mobile subsystem, extracting, with the processing module, a global image feature from the captured image sensor image, extracting, with the processing module, a local image feature from the captured image sensor image, identifying, with the processing module, a proper subset of the plurality of global map feature entries based on a comparison of the global image feature with the global map feature of each of at least some entries of the plurality of global map feature entries, defining, with the processing module, a geographic range based on the global map location of each global map feature entry of the proper subset of the plurality of global map feature entries, identifying, with the processing module, a proper subset of the plurality of local map feature entries based on a comparison of the geographic range with the local map location of each of at least some entries of the plurality of local map feature entries, and defining, with the processing module, an estimated location of the mobile subsystem at the moment in time based on a comparison of the local image feature with the local map feature of each of at least some entries of the proper subset of the plurality of local map feature entries.

As yet another example, a method of localizing a second mobile subsystem using a first mobile subsystem, a first three-dimensional map, and a training system is provided, wherein the first mobile subsystem includes a first image sensor component, a first orientation sensor component, and a first location sensor component, and wherein the second mobile subsystem includes a second image sensor component, a memory component, and a processing module communicatively coupled to the second image sensor component and the memory component, where the method may include, at each of a first plurality of moments in time when the first mobile subsystem travels about a first environment, capturing a mobile image of the environment at that moment using the first image sensor component, a mobile orientation of the first image sensor component at that moment using the first orientation sensor component, and a mobile location of the first mobile subsystem at that moment using the first location sensor component, rendering, with a map sampler of the training system, a plurality of rendered map images from the first three-dimensional map, wherein each rendered map image of the plurality of rendered map images is associated with a respective map location and a respective map orientation, defining, with the training system, a similar image set, wherein the similar image set includes a particular captured mobile image of the plurality of captured mobile images and a particular rendered map image of the plurality of rendered map images and the defining includes determining that the mobile orientation of the particular captured mobile image satisfies an orientation similarity comparison with the map orientation of the particular rendered map image and that the mobile location of the particular captured mobile image satisfies a location similarity comparison with the map location of the particular rendered map image, extracting, with a feature extractor model of the training system, the following: an image feature from the particular captured mobile image of the similar image set and a map feature from the particular rendered map image of the similar image set, determining, with a feature matching module of the training system, a matching error metric between the extracted image feature and the extracted map feature, adjusting at least one parameter of the feature extractor model using the determined matching error, after the adjusting, loading the feature extractor model onto the memory component of the second mobile subsystem, capturing, at a second moment in time with the second image sensor component of the second mobile component, a second mobile image, and using, with the processing module of the second mobile subsystem, the loaded feature extractor model to estimate the location of the second mobile subsystem at the second moment in time based on the captured second mobile image.

This Summary is provided to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIG. 2C is a schematic view of a model training system, in accordance with one or more implementations;

DETAILED DESCRIPTION OF THE DISCLOSURE

Systems, methods, and computer-readable media are provided for a localization processing service. A localization processing service may be provided for enabling localization of a mobile subsystem (e.g., vehicle (e.g., aerial drone, boat, truck, etc.)) or any other subsystem whose location is to be determined. The localization processing service may enable accurate and efficient localization of a mobile subsystem when the subsystem is navigation network-restricted (e.g., when the ability of the subsystem to communicate with a navigation network is restricted or denied). For example, the mobile subsystem may be provided with a visual positioning system ("VPS") or localization processing service management system ("LPSMS") that may include one or more databases of map features extracted from one or more maps (e.g., georeferenced map data) of an environment (e.g., a city in the real-world, etc.), one or more image sensors (e.g., one or more still cameras, video cameras, thermal cameras, etc.) for capturing any suitable images of the surroundings of the mobile subsystem, one or more inertial sensors (e.g., one or more motion sensors (e.g., accelerometers), rotation sensors (e.g., gyroscopes), barometric altimeters, magnetic sensors (e.g., magnetometers), velocity (e.g., direction and speed of movement) measuring devices, etc.) for determining (e.g., continuously) the orientation or otherwise of the mobile subsystem (e.g., when moving or stationary) without the need for external references, and one or more modules for extracting image features from the captured image(s) and comparing the extracted image features to the extracted map features of the database(s) (e.g., after filtering based on the determined orientation of the mobile subsystem) for finding one or more matches upon which a prediction of the localization of the mobile subsystem may be based. This localization (e.g., determination of geolocation (e.g., GPS coordinates)) may be accomplished completely on board the mobile subsystem, may be totally passive, may be unsusceptible to jamming, and may be not reliant on any network communication (e.g., Wi-Fi, Bluetooth, navigation satellite, etc.).

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Figure 1:
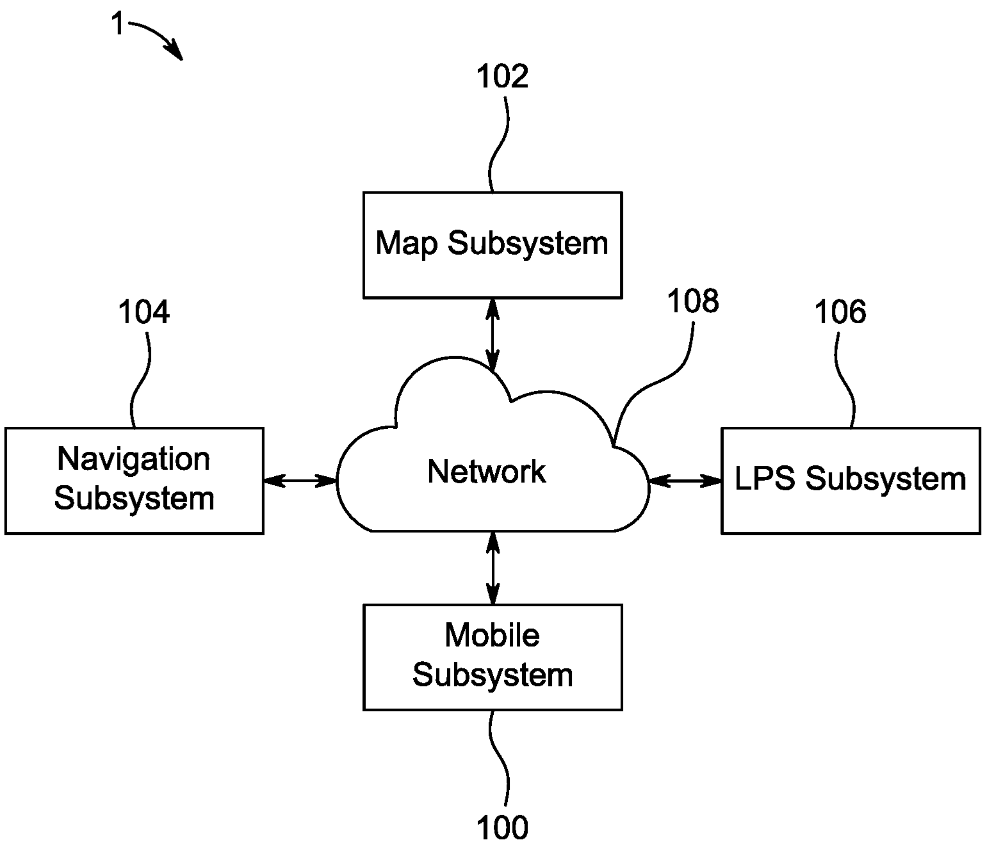
FIG. 1 is a schematic view of an illustrative system for providing a localization processing service of the disclosure, in accordance with one or more implementations.

FIG. 1 is a schematic view of an illustrative system 1 in which localization of a navigation network-restricted mobile subsystem may be facilitated utilizing one or more map subsystems, one or more localization processing service ("LPS") subsystems, and/or one or more navigation subsystems. For example, as shown in FIG. 1, system 1 may include an LPS subsystem 106, one or more map subsystems 102, one or more navigation subsystems 104, one or more mobile subsystems 100, and at least one communications network 108 through which any two or more subsystems of system 1 may communicate. A map subsystem 102 may be any suitable subsystem that may be configured to collect map data of any suitable environment (e.g., real-world map data) using any suitable techniques with or without the use of any independent navigation subsystem(s) 104. A navigation subsystem 104 may be any suitable subsystem that may be configured to provide any suitable navigation data for any suitable remote subsystem (e.g., a subsystem 102 and/or a subsystem 100) using any suitable techniques (e.g., as a global navigation satellite system ("GNSS") or any suitable positioning, navigation, and timing ("PNT") system (e.g., satellite-based PNT system), such as a global positioning system ("GPS"), etc.). An LPS subsystem 106 may be any suitable subsystem that may be configured to collect and process any suitable map data from one or more map subsystems 102 and any suitable navigation data from one or more navigation subsystems 104 (e.g., directly or via a map subsystem) and/or any other suitable data from any other suitable subsystem(s) (e.g., any suitable third party subsystem (not shown)) using any suitable techniques for creating any suitable map database(s) that may be used for providing a localization processing service to a mobile subsystem 100. A roving or mobile subsystem 100 may be any suitable subsystem that may be configured to collect image data of its surroundings using any suitable techniques with or without the use of any independent navigation subsystem(s) 104.

Map subsystem 102 may be any suitable subsystem that may be configured to be utilized to travel within any suitable environment (e.g., a real-world environment or a projected virtual (e.g., three dimensional ("3D")) environment or the like) for mapping the map subsystem's location and/or orientation within/with respect to the environment. Examples of a physical structure or housing of a map subsystem 102 may include, but are not limited to, any suitable portable, mobile, wearable, implantable, rideable, controllable, or hand-held mobile electronic device (e.g., a portable telephone and/or handheld media player), a headset, a helmet, glasses, a tablet computer, a laptop computer, a spatial tracking system, a controller, a virtual reality ("VR") and/or augmented reality ("AR") and/or mixed reality ("MR") device, a ring, a necklace, an augmented reality device, a mixed reality device, an unmanned or autonomous vehicle ("AV"), an aerial vehicle (e.g., an aerial AV), an airplane, a helicopter, a drone (e.g., a multirotor drone), a terrain vehicle, an aquatic vehicle, a hover vehicle, any combination thereof, and/or any other machine or device or housing or structure that can be utilized to travel within an environment for mapping its location and/or orientation within the environment. Map subsystem 102 may also include any suitable localization system that may be configured to collect any suitable map data that may be used to determine location(s)/orientation(s) of the map subsystem as it travels within an environment to be mapped. For example, map subsystem 102 may include one or more of the following types of localization systems: gyroscope, accelerometer, a camera, a gimbal, a light source, a sensor, motion capture, GPS (e.g., in conjunction with one or more navigation subsystems 104), real time kinematic ("RTK") GPS, electromagnetic tracking, inertial, ultra-sonic, ultra-wideband locating, visual marker/marker-less tracking, visual odometry, GPS-inertial odometry, visual-inertial odometry ("VIO"), lidar (e.g., light detection and ranging; laser imaging, detection, and ranging), sonar (sound navigation and ranging), iBeacon/tag, simultaneous localization and mapping ("SLAM"), structure-from-motion ("SfM"), Wi-Fi localization, and/or the like.

Navigation subsystem 104 may be any suitable subsystem that may be configured to be utilized to communicate with or track a map subsystem 102 to determine any suitable navigation data that may be used to determine the positioning (e.g., location(s)s/orientation(s)) of the map subsystem as it travels within an environment. Navigation subsystem 104 may include one or more satellites, beacons, antennas, and/or the like that may be positioned throughout the world or with respect to a particular environment and that may be configured (e.g., in conjunction with any suitable memory, processor(s), applications, and/or the like) to communicate with or otherwise detect a map subsystem 102 to determine such navigation data associated with the map subsystem's location using any suitable navigation protocols and/or techniques (e.g., GNSS, GPS, etc.).

LPS subsystem 106 may be any suitable subsystem that may be configured to be utilized to collect and process any suitable map data from one or more map subsystems 102 and any suitable navigation data from one or more navigation subsystems 104 and/or map subsystems 102 and/or any other suitable data from any other suitable subsystem(s) (e.g., any suitable third party subsystem (not shown)) using any suitable techniques for creating any suitable map database(s) and/or for receiving any suitable map database(s) that may be used for providing a localization processing service to a mobile subsystem 100. Such map database(s) may include, but are not limited to, geo-specific three-dimensional representations of the planet or other physical or projected virtual environment(s) that may include a digital elevation model ("DEM"), digital surface model ("DSM"), and/or digital terrain model ("DTM") (e.g., Precision3D or Vricon3D database), any suitable artificial intelligence ("AI")-generated 3D models and previsualization tools (e.g., Vermeer3D database), interactive panoramas of georeferenced images (e.g., of stitched virtual reality ("VR") photographs) of an environment (e.g., Street View database (e.g., Google Street View) or any georeferenced image(s)), satellite stereoscopic image(s), orthoimage(s), and/or the like. For example, the map can be generated from satellite images (e.g., a Maxar Precision 3D map, or Google Earth 3D map), from images (e.g., by the use of photogrammetry techniques and solvers (e.g., colmap, meshroom, and/or the like)), from lidar, and/or from any other suitable capture technique that may be able to generate 3D data. Once map database(s) have been generated or otherwise accessed by LPS subsystem 106, such map or LPS databases may be utilized (e.g., by LPS subsystem 106 or otherwise (e.g., with one or more map samplers and/or one or more map feature extractors)) to generate or at least partially define one or more map feature databases with any suitable types of map features that may be extracted from the LPS databases (e.g., along with their 3D or georeferenced coordinates) or map renderings thereof using any suitable techniques. Such map feature databases or portions thereof may then be provided by LPS subsystem 106 to one or more mobile subsystems 100. LPS subsystem 106 may correspond to any suitable subsystem (e.g., mobile device, tablet computer, laptop computer, server(s), etc.) that may be capable of providing LPS data to a mobile subsystem (e.g., directly or via any suitable communications network). In some embodiments, LPS subsystem 106 and map subsystem 102 may correspond to the same subsystem.

A mobile subsystem 100 may be any suitable subsystem that may be configured to collect images of its surroundings and inertial data (e.g., indicative of its orientation) using any suitable techniques and to process such data in conjunction with any suitable map feature databases to localize the mobile subsystem (e.g., with or without the use of any independent navigation subsystem(s) 104). Examples of a physical structure or housing of a mobile subsystem 100 may include, but are not limited to, any suitable portable, mobile, wearable, implantable, rideable, controllable, or hand-held mobile electronic device (e.g., a portable telephone and/or handheld media player), a headset, a helmet, glasses, a tablet computer, a laptop computer, a spatial tracking system, a controller, a VR and/or AR and/or MIR device, a ring, a necklace, an augmented reality device, a mixed reality device, an unmanned or autonomous vehicle ("AV"), an aerial vehicle (e.g., an aerial AV), an airplane, a helicopter, a drone (e.g., a multirotor drone), a terrain vehicle, an aquatic vehicle, a hover vehicle, any combination thereof, and/or any other machine or device or housing or structure that can be utilized to travel within an environment for mapping its location and/or orientation within the environment. In some embodiments, a mobile subsystem 100 may include the same localization system or a similar localization system to that of a map subsystem. For example, mobile subsystem 100 may include one or more of the following types of localization systems: gyroscope, accelerometer, a camera, a gimbal, a light source, a sensor, motion capture, GPS (e.g., in conjunction with one or more navigation subsystems 104), real time kinematic ("RTK") GPS, electromagnetic tracking, inertial, ultra-sonic, ultra-wideband locating, visual marker/marker-less tracking, visual odometry, GPS-inertial odometry, visual inertial odometry ("VIO"), lidar, iBeacon/tag, simultaneous localization and mapping ("SLAM"), structure-from-motion ("SfM"), Wi-Fi localization, and/or the like. However, in some embodiments, a mobile subsystem 100 may be navigation-restricted and/or navigation network-restricted, where the mobile subsystem may be at least temporarily limited or permanently denied in its ability to communicate with or be detected by a navigation subsystem (e.g., a navigation subsystem 104). For example, a mobile subsystem 100 may be at least temporarily GPS-denied or GNSS-denied or GPS-spoofed to disable or make inaccurate the network tracking of the mobile subsystem's location. In some embodiments, a map subsystem may be capable of generating maps while a mobile subsystem may be able to perform localization but not generate maps, whereby a mobile subsystem may have lighter hardware than a map subsystem. A mobile subsystem 100 may be configured to receive any suitable LPS data and/or map features and/or map feature database(s) from an LPS subsystem 106 and/or from a map subsystem 102 (e.g., directly or via any suitable communications network 108 (e.g., wired and/or wirelessly (e.g., via Bluetooth, NFC, Zigbee interface, WLAN, USB, and/or generally any communication interface))) prior to or during the mobile subsystem's travel through an environment in order to enable the mobile subsystem to determine its location and/or orientation with respect to the environment despite the mobile subsystem being navigation network-restricted.

One, some, or each subsystem of system 1 may be configured communicate with another one, some, or each subsystem of system 1 via any suitable communications network 108. Network 108 may be the internet or any other network, such that when interconnected, a first subsystem may access information (e.g., map data, navigation data, LPS data, etc.) from a second subsystem as if such information were stored locally at that first subsystem. One, some, or each communications component or communications interface of a first subsystem and/or one, some, or each communications component or communications interface of a second subsystem may be a network interface that may include the mechanical, electrical, and/or signaling circuitry for communicating data over links (e.g., physical links) that may be coupled to network 108.

Although only a single one of each of subsystems 100, 102, 104, and 106 are shown in FIG. 1, system 1 may include two or more of one, some, or each of subsystems 100, 102, 104, and 106, and/or different networks 108 may be provided for enabling communication between different subsystems. Multiple map subsystems may be used to map different portions of an environment. Different navigation subsystems may be used to service different map subsystems or different portions of an environment. Different LPS subsystems may service different mobile subsystems and/or different portions of an environment. Different mobile subsystems may be used in the same or different portions of an environment (e.g., for collaboration). In some embodiments, one or more subsystems of system 1 may be combined or omitted.

Figure 1A:
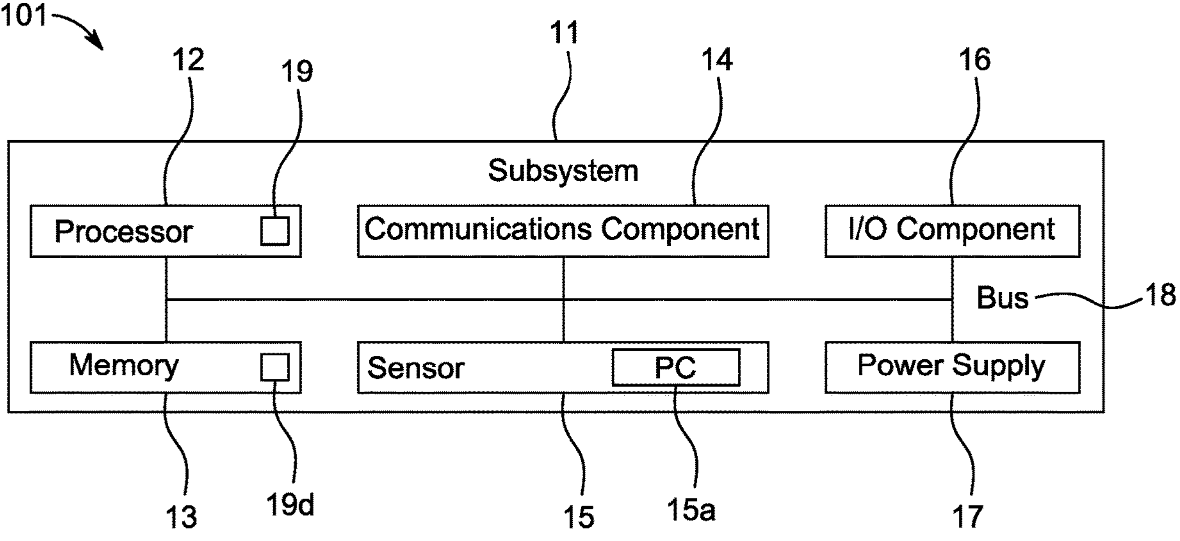
FIG. 1A is a more detailed schematic view of a subsystem of the system of FIG. 1.

As shown in FIG. 1A, a subsystem 101 of system 1 (e.g., one, some, or each of subsystems 100, 102, 104, and 106 of system 1 of FIG. 1) may include a processor component 12, a memory component 13, a communications component 14, a sensor 15, an input/output ("I/O") component 16, a power supply component 17, a structure or housing 11, and/or a bus 18 that may provide one or more wired or wireless communication links or paths for transferring data and/or power to, from, or between various other components of subsystem 101. In some embodiments, one or more components of subsystem 101 may be combined or omitted. Moreover, subsystem 101 may include other components not combined or included in FIG. 1A and/or several instances of the components shown in FIG. 1A. For the sake of simplicity, only one of each of the components of subsystem 101 is shown in FIG. 1A.

I/O component 16 may include at least one input component (e.g., button, mouse, keyboard, etc.) to receive information from a user and/or at least one output component (e.g., audio speaker, video display, haptic component, etc.) to provide information to a user, such as a touch screen that may receive input information through a user's touch of a display screen and that may also provide visual information to a user via that same display screen. Memory 13 may include one or more storage mediums, including for example, a hard-drive, flash memory, magnetic storage, permanent memory such as read-only memory ("ROM"), semi-permanent memory such as random access memory ("RAM"), any other suitable type of storage component, or any combination thereof (e.g., for storing data (e.g., data 19*d*)). Memory 13 may include suitable logic, circuitry, and/or code that may enable storage of various types of information, such as received data, generated data, code, and/or configuration information.

Communications component 14 may be provided to allow subsystem 101 to communicate with one or more other subsystems 101 using any suitable communications protocol (e.g., via communications network 108). Communications component 14 can be operative to create or connect to a communications network (e.g., network 108). Communications component 14 can provide wireless communications using any suitable short-range or long-range communications protocol, such as Wi-Fi (e.g., an 802.11 protocol), Bluetooth, radio frequency systems (e.g., 1200 MHz, 2.4 GHz, and 5.6 GHz communication systems), near field communication ("NFC"), Zigbee, wireless local area network ("WLAN"), universal serial bus ("USB"), infrared, protocols used by wireless and cellular telephones and personal e-mail devices, or any other protocol supporting wireless communications.

Communications component 14 can also be operative to connect to a wired communications network or directly to another data source wirelessly or via one or more wired connections. Communications component 14 may be a network interface that may include the mechanical, electrical, and/or signaling circuitry for communicating data over physical links that may be coupled to network 108. Such network interface(s) may be configured to transmit and/or receive any suitable data using a variety of different communication protocols, including, but not limited to, TCP/IP, UDP, ATM, synchronous optical networks ("SONET"), any suitable wireless protocols, Frame Relay, Ethernet, Fiber Distributed Data Interface ("FDDI"), and/or the like. In some embodiments, one, some, or each of such network interfaces may be configured to implement one or more virtual network interfaces, such as for Virtual Private Network ("VPN") access.

Sensor 15 may be any suitable sensor that may be configured to sense any suitable data for subsystem 101 (e.g., location-based data via a GPS sensor system, image data, inertia or inertial data, motion data, environmental data, biometric data, etc.). Sensor 15 may be a sensor assembly that may include any suitable sensor or any suitable combination of sensors operative to detect any suitable characteristic(s) of subsystem 101 and/or of a user thereof and/or of its environment/surroundings (e.g., physical activity or other characteristics of a user of subsystem 101, light content of the device environment, gas pollution content of the device environment, noise pollution content of the device environment, altitude of the device, etc.). Sensor 15 may include any suitable sensor(s), including, but not limited to, one or more of a GPS sensor, wireless communication sensor, image sensor, inertial sensor (e.g., inertial measurement unit ("IMU")), accelerometer, directional sensor (e.g., compass), gyroscope, motion sensor, pedometer, passive infrared sensor, ultrasonic sensor, microwave sensor, a tomographic motion detector, camera, biometric sensor, light sensor, timer, and/or the like. Sensor 15 may include one or more image sensors for capturing video image data and/or still image data (e.g., sensor 15 may include a rear-facing camera and/or a front-facing camera and/or any other directional camera (e g., on a gimballed and/or gyrostabilized platform and/or the like) and/or the like). Sensor 15 may include any suitable sensor components or subassemblies for detecting any suitable movement of subsystem 101 and/or of a user thereof. For example, sensor 15 may include one or more three-axis acceleration motion sensors (e.g., an accelerometer) that may be operative to detect linear acceleration in three directions (i.e., the x- or left/right direction, the y- or up/down direction, and the z- or forward/backward direction). As another example, sensor 15 may include one or more single-axis or two-axis acceleration motion sensors that may be operative to detect linear acceleration only along each of the x- or left/right direction and the y- or up/down direction, or along any other pair of directions. In some embodiments, sensor 15 may include an electrostatic capacitance (e.g., capacitance-coupling) accelerometer that may be based on silicon micro-machined micro electro-mechanical systems ("MEMS") technology, including a heat-based MEMS type accelerometer, a piezoelectric type accelerometer, a piezo-resistance type accelerometer, and/or any other suitable accelerometer (e.g., which may provide a pedometer or other suitable function). Sensor 15 may be operative to directly or indirectly detect rotation, rotational movement, angular displacement, tilt, position, orientation, motion along a non-linear (e.g., arcuate) path, or any other non-linear motions. Additionally or alternatively, sensor 15 may include one or more angular rate, inertial, and/or gyro-motion sensors or gyroscopes for detecting rotational movement. For example, sensor 15 may include one or more rotating or vibrating elements, optical gyroscopes, vibrating gyroscopes, gas rate gyroscopes, ring gyroscopes, magnetometers (e.g., scalar or vector magnetometers), compasses, attitude sensors (e.g., for roll, pitch, yaw, etc.) and/or the like. Any other suitable sensors may also or alternatively be provided by sensor 15 for detecting motion on subsystem 101, such as any suitable pressure sensors, altimeters, or the like. Using sensor 15, subsystem 101 may be configured to determine a velocity, acceleration, orientation, and/or any other suitable motion attribute of subsystem 101. Sensor 15 may include any suitable sensor components or subassemblies for detecting any suitable biometric data and/or health data and/or sleep data and/or mindfulness data and/or the like of a user of user subsystem 101. For example, sensor 15 may include any suitable biometric sensor that may include, but is not limited to, one or more facial recognition sensors, fingerprint scanners, iris scanners, retinal scanners, voice recognition sensors, gait sensors, hair sensors, hand geometry sensors, signature scanners, keystroke dynamics sensors, vein matching sensors, heart beat sensors, body temperature sensors, odor or scent sensors, behavioral biometric sensors (e.g., user behavioral modeling of movement, orientation, gesture, pausality, etc.), DNA sensors, sensors for any unclonable or extremely difficult to replicate personal function, and/or any other suitable sensors for detecting any suitable metrics related to any suitable characteristics of a user, which may also include health-related optical sensors, capacitive sensors, thermal sensors, electric field ("eField") sensors, and/or ultrasound sensors, such as photoplethysmogram ("PPG") sensors, electrocardiography ("ECG") sensors, galvanic skin response ("GSR") sensors, posture sensors, stress sensors, photoplethysmogram sensors, and/or the like. These sensors can generate data providing health-related information associated with the user. For example, PPG sensors can provide information regarding a user's respiratory rate, blood pressure, and/or oxygen saturation. ECG sensors can provide information regarding a user's heartbeats. GSR sensors can provide information regarding a user's skin moisture, which may be indicative of sweating and can prioritize a thermostat application to determine a user's body temperature. One or more biometric sensors may be multi-modal biometric sensors and/or operative to detect long-lived biometrics, modern liveness (e.g., active, passive, etc.) biometric detection, and/or the like. Sensor 15 may include a microphone, camera, scanner (e.g., a barcode scanner or any other suitable scanner that may obtain product identifying information from a code, such as a linear barcode, a matrix barcode (e.g., a quick response ("QR") code), or the like), proximity sensor, light detector, temperature sensor, motion sensor, biometric sensor (e.g., a fingerprint reader or other feature (e.g., facial) recognition sensor, which may operate in conjunction with a feature-processing application that may be accessible to subsystem 101 for attempting to authenticate a user), line-in connector for data and/or power, and/or combinations thereof. In some examples, each sensor can be a separate device, while, in other examples, any combination of two or more of the sensors can be included within a single device. For example, a gyroscope, accelerometer, photoplethysmogram, galvanic skin response sensor, and temperature sensor can be included within a wearable subsystem 101, such as a smart watch, while a scale, blood pressure cuff, blood glucose monitor, SpO2 sensor, respiration sensor, posture sensor, stress sensor, and asthma inhaler can each be separate devices. Motion sensor(s) may be used to facilitate movement and orientation related functions of subsystem 101, for example, to detect movement, direction, and/or orientation of subsystem 101. While specific examples are provided, it should be appreciated that other sensors can be used and other combinations of sensors can be combined into a single subsystem 101. Using one or more of these sensors, subsystem 101 can determine physiological characteristics of the user while performing a detected activity, such as a heart rate of a user associated with the detected activity, average body temperature of a user detected during the detected activity, any normal or abnormal physical conditions associated with the detected activity, or the like. In some examples, a GPS sensor or any other suitable location detection component(s) or positioning circuitry ("PC") (e.g., PC 15*a*) of sensor 15 of subsystem 101 can be used to determine a user's location (e.g., geo-location and/or address and/or location type (e.g., library, school, office, zoo, etc.)) and movement, as well as a displacement of the user's motion. Any suitable positioning circuitry 15*a* may be used in determining the location of subsystem 101 based on positioning technology. For example, positioning circuitry 15*a* may provide for one or more of GNSS positioning (e.g., via a GNSS receiver configured of subsystem 101 to receive signals from GNSS satellites (e.g., of a distinct navigation subsystem 104)), wireless access point positioning (e.g., via a wireless network receiver configured to receive signals from wireless access points (e.g., of a distinct navigation subsystem 104 or network 108)), cellular phone signal positioning, Bluetooth signal positioning (e.g., via a Bluetooth receiver), image recognition positioning (e.g., via an image sensor), and/or an INS (e.g., via motion sensors, such as an accelerometer and/or gyroscope). Positioning circuitry 15*a* may correspond to or otherwise be part of a localization system of subsystem 101 (e.g., motion capture system, GPS, RTK GPS, electromagnetic tracking system, inertial, ultrasonic system, ultra-wideband locating system, visual marker/marker-less tracking, visual odometry, GPS-Inertial Odometry, Visual-Inertial Odometry, Lidar system, sonar system, iBeacon/Tag, SLAM, SfM, Wi-Fi localization, and/or the like). An accelerometer, directional sensor, and/or gyroscope (e.g., rate gyroscope) of sensor 15 can further generate activity data that can be used to determine whether a user of subsystem 101 is engaging in an activity, is inactive, or is performing a gesture. Any suitable activity of a user may be tracked by sensor 15, including, but not limited to, steps taken, flights of stairs climbed, distance walked, distance run, minutes of exercise performed and exercise quality, any suitable work accomplishments of any suitable type (e.g., as may be sensed or logged by user input information indicative of such accomplishments), and/or the like. Subsystem 101 can further include a timer that can be used, for example, to add time dimensions to various attributes of the detected physical activity, such as a duration of a user's physical activity or inactivity, time(s) of a day when the activity is detected or not detected, and/or the like. Sensor 15 may include any suitable sensor components or subassemblies for detecting any suitable characteristics of any suitable condition of the lighting of the environment of subsystem 101. For example, sensor 15 may include any suitable light sensor that may include, but is not limited to, one or more ambient visible light color sensors, illuminance ambient light level sensors, ultraviolet ("UV") index and/or UV radiation ambient light sensors, and/or the like. Any suitable light sensor or combination of light sensors may be provided for determining the illuminance or light level of ambient light in the environment of subsystem 101 (e.g., in lux or lumens per square meter, etc.) and/or for determining the ambient color or white point chromaticity of ambient light in the environment of subsystem 101 (e.g., in hue and colorfulness or in x/y parameters with respect to an x-y chromaticity space, etc.) and/or for determining the UV index or UV radiation in the environment of subsystem 101 (e.g., in UV index units, etc.). A suitable light sensor may include, for example, a photodiode, a phototransistor, an integrated photodiode and amplifier, or any other suitable photo-sensitive device. In some embodiments, more than one light sensor may be integrated into subsystem 101. Sensor 15 may include any suitable sensor components or subassemblies for detecting any suitable characteristics of any suitable condition of the air quality of the environment of subsystem 101. For example, sensor 15 may include any suitable air quality sensor that may include, but is not limited to, one or more ambient air flow or air velocity meters, ambient oxygen level sensors, volatile organic compound ("VOC") sensors, ambient humidity sensors, ambient temperature sensors, and/or the like. Any suitable ambient air sensor or combination of ambient air sensors may be provided for determining the oxygen level of the ambient air in the environment of subsystem 101 (e.g., in $O_2$% per liter, etc.) and/or for determining the air velocity of the ambient air in the environment of subsystem 101 (e.g., in kilograms per second, etc.) and/or for determining the level of any suitable harmful gas or potentially harmful substance (e.g., VOC (e.g., any suitable harmful gasses, scents, odors, etc.) or particulate or dust or pollen or mold or the like) of the ambient air in the environment of subsystem 101 (e.g., in HG % per liter, etc.) and/or for determining the humidity of the ambient air in the environment of subsystem 101 (e.g., in grams of water per cubic meter, etc. (e.g., using a hygrometer)) and/or for determining the temperature of the ambient air in the environment of subsystem 101 (e.g., in degrees Celsius, etc. (e.g., using a thermometer)). Sensor 15 may include any suitable sensor components or subassemblies for detecting any suitable characteristics of any suitable condition of the sound quality of the environment of subsystem 101. For example, sensor 15 may include any suitable sound quality sensor that may include, but is not limited to, one or more microphones or the like that may determine the level of sound pollution or noise in the environment of subsystem 101 (e.g., in decibels, etc.). Sensor 15 may also include any other suitable sensor for determining any other suitable characteristics about a user of subsystem 101 and/or the environment of subsystem 101 and/or any situation within which subsystem 101 may be existing. For example, any suitable clock and/or position sensor(s) may be provided to determine the current time and/or time zone within which subsystem 101 may be located. Sensor 15 may be embedded in a structure or body (e.g., housing 11) of subsystem 101, such as along a bottom surface that may be operative to contact a user, or can be positioned at any other desirable location. In some examples, different sensors can be placed in different locations inside or on the surfaces of subsystem 101 (e.g., some located inside housing 11 and some attached to an attachment mechanism (e.g., a wrist band coupled to a housing of a wearable device), or the like). In other examples, one or more sensors can be worn by a user separately as different parts of a single subsystem 101 or as different devices. In such cases, the sensors can be configured to communicate with subsystem 101 using a wired and/or wireless technology (e.g., via communications component 14). In some examples, sensors can be configured to communicate with each other and/or share data collected from one or more sensors. In some examples, subsystem 101 can be waterproof such that the sensors can detect a user's or subsystem's activity in water.

Power supply 17 can include any suitable circuitry for receiving and/or generating power, and for providing such power to one or more of the other components of subsystem 101. For example, power supply assembly 17 can be coupled to a power grid (e.g., when subsystem 101 is not acting as a portable device or when a battery of the subsystem is being charged at an electrical outlet with power generated by an electrical power plant). As another example, power supply assembly 17 may be configured to generate power from a natural source (e.g., solar power using solar cells). As another example, power supply assembly 17 can include one or more batteries for providing power (e.g., when subsystem 101 is acting as a portable device). Subsystem 101 may also be provided with a housing 11 that may at least partially enclose one or more of the components of subsystem 101 for protection from debris and other degrading forces external to subsystem 101. Each component of subsystem 101 may be included in the same housing 11 (e.g., as a single unitary device, such as a portable media device or server) and/or different components may be provided in different housings (e.g., a keyboard input component may be provided in a first housing that may be communicatively coupled to a processor component and a display output component that may be provided in a second housing, such as in a desktop computer set-up). In some embodiments, subsystem 101 may include other components not combined or included in those shown or several instances of the components shown.

Processor 12 may be used to run one or more applications, such as an application 19 that may be accessible from memory 13 (e.g., as a portion of data **19*d*) and/or any other suitable source (e.g., from network 108 or any other subsystem and an active internet or other suitable data connection). Application 19 may include, but is not limited to, one or more operating system applications, firmware applications, communication applications (e.g., for enabling communication of data between subsystems 101), third party service applications (e.g., wallet applications, sensor applications social media applications, etc.), internet browsing applications (e.g., for interacting with a website provided by a third party subsystem or other subsystem for enabling subsystem 101 to interact with an online service), application programming interfaces ("APIs"), software development kits ("SDKs"), APS applications (e.g., a web application or a native application that may be at least partially produced by LPS subsystem 106 or otherwise for enabling subsystem 101 to interact with an online service), or any other suitable applications (e.g., an LPS application). For example, processor 12 may load an application 19 as a user interface program to determine how instructions or data received via an input component of I/O component 16 or other component of subsystem 101 (e.g., sensor 15 and/or communications component 14) may manipulate the way in which information may be stored (e.g., in memory 13) and/or provided to the user via an output component of I/O component 16 and/or to another subsystem via communications component 14. As one example, application 19 may provide a user or subsystem 101 with the ability to interact with an LPS platform ("LPSP") of system 1, where application 19 may be a third party application that may be running on subsystem 101 (e.g., an application associated with LPS subsystem 106 and/or a third party subsystem or the like) that may be loaded on subsystem 101 (e.g., using communications component 14) via an application market, such as the Apple App Store or Google Play, or that may be accessed via an internet application or web browser (e.g., by Apple Safari or Google Chrome) that may be running on subsystem 101 and that may be pointed to a uniform resource locator ("URL") whose target or web resource may be managed by or otherwise affiliated with the LPSP. Processor 12 may include suitable logic, circuitry, and/or code that may enable processing data and/or controlling operations of subsystem 101. In this regard, processor 12 may be enabled to provide control signals to various other components of subsystem 101. Processor 12 may also control transfers of data between various portions of subsystem 101. Processor 12 may further implement an operating system or may otherwise execute code to manage operations of subsystem 101**.

Subsystem 101 may be configured to have any physical structure (e.g., by one or more housings 11) that may include, but is not limited to, any suitable portable, mobile, wearable, implantable, rideable, controllable, or hand-held mobile electronic device (e.g., a portable telephone and/or handheld media player), a headset, a helmet, glasses, a tablet computer, a laptop computer, a spatial tracking system, a controller, a VR and/or AR and/or MR device, a ring, a necklace, an augmented reality device, a mixed reality device, an unmanned or autonomous vehicle ("AV"), an aerial vehicle (e.g., an aerial AV), an airplane, a helicopter, a drone (e.g., a multirotor drone), a terrain vehicle, an aquatic vehicle, a hover vehicle, any combination thereof, and/or any other machine or device or housing or structure that can be utilized to travel within an environment (e.g., for mapping or localizing its location and/or orientation within the environment). Alternatively, subsystem 101 may not be portable during use, but may instead be generally stationary (e.g., as a type of LPS subsystem 106). Subsystem 101 can include, but is not limited to, a media player, video player, still image player, game player, other media player, music recorder, movie or video camera or recorder, still camera, other media recorder, radio, medical equipment, domestic appliance, smart appliance, transportation vehicle instrument, musical instrument, calculator, cellular telephone, other wireless communication device, personal digital assistant, remote control, pager, computer (e.g., a desktop, laptop, tablet, server, etc.), monitor, television, stereo equipment, set up box, set-top box, wearable device (e.g., a smart watch), boom box, modem, router, printer, kiosk, beacon (e.g., a Bluetooth low energy beacon transmitter device), any combinations thereof, and/or the like. Not all of the depicted components may be used in all implementations, however, and one or more implementations may include additional or different components than those shown in FIG. 1A. In one or more implementations, one or more of processor 12, memory 13, sensor(s) 15, PC **15*a*, communications interface or communications component 14, I/O component 16, and/or power supply 17**, and/or one or more portions thereof, may be implemented in software (e.g., subroutines and code), may be implemented in hardware (e.g., an application specific integrated circuit ("ASIC"), a field programmable gate array ("FPGA"), a programmable logic device ("PLD"), a controller, a state machine, gated logic, discrete hardware components, or any other suitable devices), and/or a combination of both. Variations in the arrangement and type of the components may be made without departing from the spirit or scope of the claims as set forth herein. Additional components, different components, or fewer components may be provided.

Figure 2:
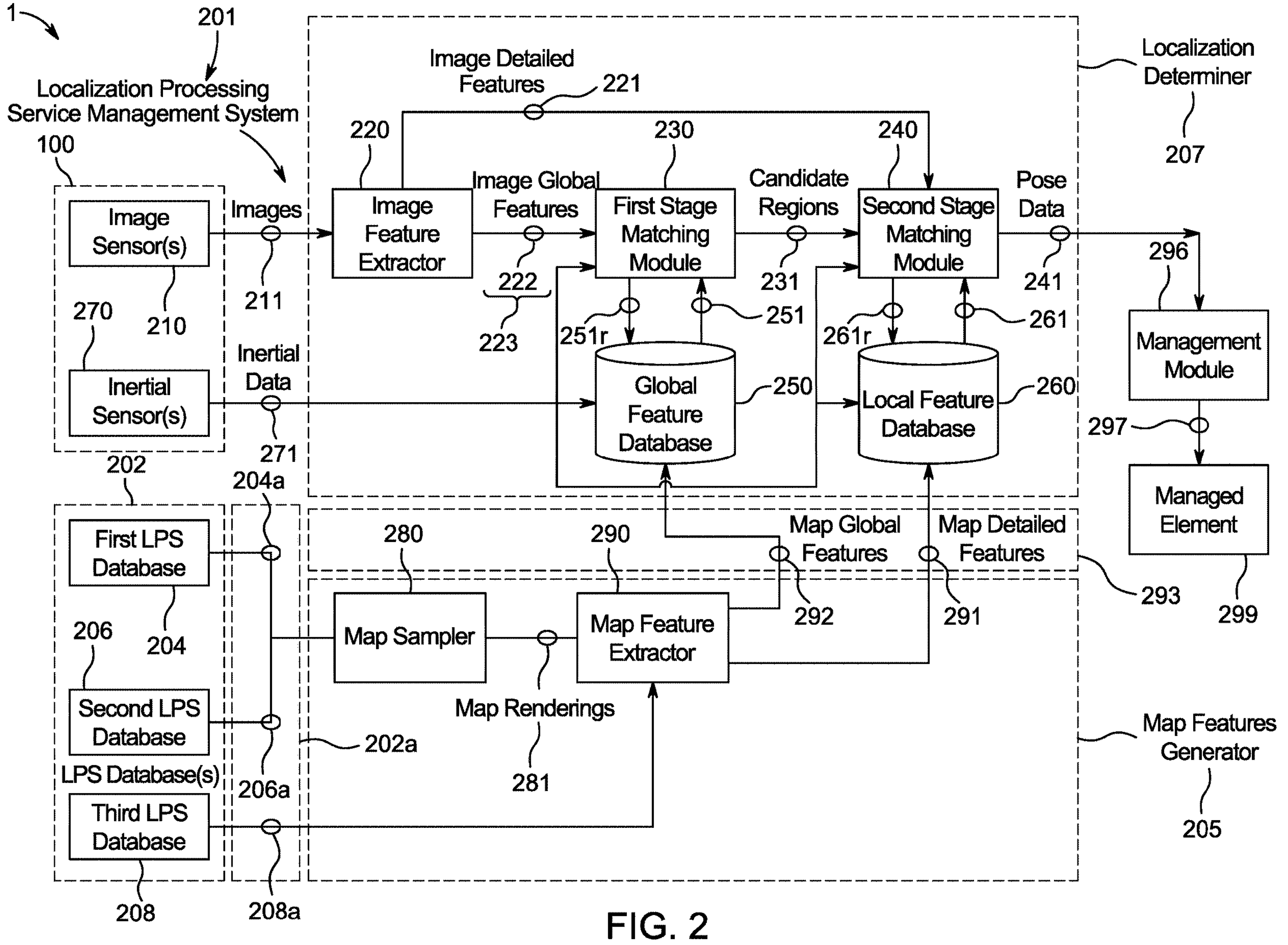
FIG. 2 is a schematic view of a portion of the system of FIG. 1, in accordance with one or more implementations.

FIG. 2 shows a schematic view of an exemplary localization processing service management system ("LPSMS") 201 of system 1 that may be provided to manage localization processing services for a mobile subsystem 100 (e.g., to determine a localization of a mobile subsystem 100 and/or to manage a mode of operation of mobile subsystem 100 and/or of any other suitable subsystem of system 1 based on the determined localization). LPSMS 201 may be configured to generate, receive, obtain, and/or otherwise use any suitable data, including, but not limited to, one or more images or image data 211 (e.g., query images, input images, full motion video images, etc.) that may be generated by any suitable camera(s) or image sensor(s) 210 (e.g., any suitable image sensor(s) 15) of mobile subsystem 100, any suitable inertial data 271 (e.g., estimated orientation data) that may be generated by any suitable proprioceptive sensor(s) and/or inertial sensor(s) 270 (e.g., any suitable orientation sensor(s) or attitude and heading reference system ("AHRS") sensor(s) (e.g., any suitable inertial or orientation sensor(s) 15)) of mobile subsystem 100, and any suitable map or LPS data 202*a* (e.g., LPS or map database data) that may be generated or provided by any suitable LPS or map database(s) 202 from any suitable subsystem(s) of system 1 (e.g., by any suitable map data and/or navigation data or otherwise that may be generated by one or more map subsystems 102 and/or by one or more navigation subsystems 104 and/or by one or more LPS subsystems 106 and/or the like), such as any suitable first reference map or LPS data 204*a* that may be provided by any suitable first reference map or LPS database(s) 204 (e.g., a Vricon 3D map database) and/or any suitable second reference map or LPS data 206*a* that may be provided by any suitable second reference map or LPS database(s) 206 (e.g., a Vermeer 3D map database) and/or any suitable third reference map or LPS data 208*a* that may be provided by any suitable third reference map or LPS database(s) 208 (e.g., a Street View database), and/or the like. LPSMS 201 may include a map features generator module 205 that may be configured to generate any suitable type(s) of map feature(s) 293 (e.g., map features 291 and/or map features 292) from any suitable map or LPS data 202*a* (e.g., data 204*a*, 206*a*, and/or 208*a*) from any suitable LPS or map database(s) 202 (e.g., database 204, 206, and/or 208). Map features generator 205 may be provided by any suitable subsystem of system 1, such as LPS subsystem 106 and/or map subsystem 102 and/or mobile subsystem 100. LPSMS 201 may include a localization determiner module 207 that may be configured to process (e.g., using any suitable models, algorithms, and/or the like) image data 211 and associated inertial data 271 from a mobile subsystem 100 in conjunction with any suitable map features 293 to determine a current localization of mobile subsystem 100 that may be indicated by pose data 241 (e.g., localization and orientation data). LPSMS 201 may be provided by mobile subsystem 100 or another subsystem local or proximate mobile subsystem 100. In response to determining the current localization of mobile subsystem 100, LPSMS 201 may be configured to apply at least one localization-based mode of operation to at least one managed element 299 (e.g., any suitable assembly of any suitable subsystem of system 1) based on the determined current localization (e.g., to suggest certain user behavior and/or to control the functionality of one or more system assemblies) for improving a user's experience. For example, as shown in FIG. 2, LPSMS 201 may include a management module 296 for receiving pose (e.g., localization) data 241 and providing localization mode data 297 to managed element 299.

Once localization determiner 207 has determined a current localization of mobile subsystem 100 (e.g., based on any suitable combination of image data 211 and associated inertial data 271 and any suitable map features 293), localization determiner 207 may be configured to generate and transmit pose data 241 to management module 296, where localization data 241 may be indicative of the determined current localization of mobile subsystem 100. In response to determining a current localization of mobile subsystem 100 by receiving pose data 241, management module 296 may be configured to apply at least one localization-based mode of operation to at least one managed element 299 of system 1 based on the determined current localization of mobile subsystem 100. For example, as shown in FIG. 2, management module 296 may be configured to receive pose data 241 from localization determiner 207 as well as to generate and share localization mode data 297 with at least one managed element 299 of system 1 at least partially based on the received pose data 241, where such localization mode data 297 may be received by managed element 299 for controlling at least one characteristic of managed element 299. Managed element 299 may be any suitable assembly of mobile subsystem 100 (e.g., any processor assembly 12, any memory assembly 13 and/or any data stored thereon, any communications assembly 14, any power supply assembly 17, any input and/or output assembly 16, any sensor assembly 15, etc.) and/or any suitable assembly of any suitable other subsystem of system 1, and localization mode data 297 may control managed element 299 in any suitable way, such as by providing, enhancing, enabling, disabling, restricting, and/or limiting one or more certain functionalities associated with such a managed element.

Localization mode data 297 may be any suitable subsystem control data for controlling any suitable functionality of any suitable assembly of subsystem 100 as a managed element 299 (e.g., any suitable subsystem output control data for controlling any suitable functionality of any suitable output assembly of subsystem 100 (e.g., for adjusting a user interface presentation to user (e.g., to provide a user interface map showing the estimated location of subsystem 100 within a map of an environment)), and/or any suitable subsystem sensor control data for controlling any suitable functionality of any suitable sensor 15 of subsystem 100 (e.g., for turning on or off a particular type of sensor and/or for adjusting the functionality (e.g., the accuracy) of a particular type of sensor (e.g., to gather any additional suitable sensor data)), and/or any suitable activity application control for updating or supplementing any input data available to any application that may be running on subsystem 100 (e.g., for controlling one or more functionalities of localization determiner 207), and/or the like). Additionally or alternatively, localization mode data 297 may be any suitable auxiliary subsystem data for controlling any suitable functionality of any suitable auxiliary subsystem of system 1 as a managed element 299 (e.g., for controlling a functionality of a LPS subsystem 106 (e.g., for controlling any suitable functionality of map features generator 205)). Data 297 may be used by any suitable managed element(s) 299, including, but not limited to, VR and/or AR and/or MR use cases (e.g., for navigation and/or mission planning/control), scene agent reconstruction (e.g., a map match approach), change detection (e.g., comparing existing map(s) at the estimated pose with saved map(s) and determine alterations on the landscape), and/or the like.

LPSMS 201 may receive any suitable image data 211 that may be generated by any suitable image sensor(s) 210 of mobile subsystem 100. For example, image sensor(s) 210 may include one or more cameras that may be configured to capture images as red-green-blue ("RGB") source images or in grayscale or in any other suitable format and output the one or more captured images (e.g., still images or image frames of full motion video) as image data 211. Image data may be converted to a mosaic or panorama image or stitched image or image mosaic or any other suitable construct that may have its orientation defined in any arbitrary reference frame (e.g., the North-East-Down ("NED") reference frame or any other suitable local tangent plane coordinates ("LTP") or spatial reference systems). For example, LPSMS 201 may be configured to generate a georeferenced mosaic by utilizing a panorama projective model (see, e.g., module 232 of FIG. 2D) to generate a stitched mosaic image that may be referenced according to a georeferenced frame. Such a mosaic may be generated based on any suitable image data 211 indicative of one image or two or more images that may have been captured by the mobile subsystem at the same moment in time (e.g., simultaneously or substantially simultaneously by two or more image sensors) and any suitable mobile subsystem inertial data 271 indicative of the orientation of the mobile subsystem and its image sensor(s) at the moment that the image data was captured. For example, in some embodiments, mobile subsystem 100 may include four cameras, each directed in different directions (e.g., forward, backward, leftward, and rightward) with respect to some arbitrary common direction, and each camera may be configured to capture an image at a moment in time, while inertial data may be indicative of the detected orientation of each camera at the moment it captured an image. Alternatively, a single camera may be used to capture multiple images at consecutive moments in time while the camera is moved through consecutively different orientations during the consecutive moments in time while inertial data may be indicative of the orientation of the camera at each of the moments in time. In some embodiments, a camera may be an omnidirectional (e.g., 360 degree) camera. The type(s) and number and relative positioning and configuration of image sensor(s) that may be provided by a mobile subsystem may vary based on the type of mobile subsystem and/or a particular use case for the mobile subsystem.

Inertia or orientation data 271 may be any suitable data indicative of the orientation of mobile subsystem and/or of one or more of its image sensors at any moment in time with respect to any suitable reference frame (e.g., NED reference frame) and may be generated by any suitable number of any suitable type(s) of orientation or inertial sensor(s) 270. Such inertial or orientation data may be used for generating a georeferenced mosaic (e.g., such data may be used by a stitching algorithm such that the stitched algorithm mosaic may be georeferenced, such that there may be an approximate mapping between each image column and a yaw (e.g., such that an image column 0 may point always north)). For example, sensor(s) 270 may include an AHRS that may be configured to provide estimations of orientation as data 271 on earth frame (e.g., NED or universal transverse Mercator ("UTM") or any other suitable plane coordinate grid system or any other suitable georeferenced frame). For example, such data 271 may be obtained using an IMU equipped with a 3-axis gyroscope, a 3-axis accelerometer, and a 3-axis magnetometer. The combination measurements of these sensors by any suitable sensor fusion algorithms (e.g., with Kalman filtering, Madgwick filtering, and/or the like) may be used for the task of generating orientation estimation of mobile subsystem 100 and/or of particular image senor(s) 210 in inertial data 271 (e.g., in degrees or radians or the like as the orientation of an image sensor at a particular moment with respect to any georeferenced frame (e.g., NED, UTM, etc.)).

Additionally or alternatively, LPSMS 201 may use any suitable visual inertial odometry ("VIO") that may be any suitable module(s) that may be configured to receive as input any suitable image data (e.g., image data 211, such as one or more images from one or more image sensor(s)) and any suitable inertial data (e.g., inertial data 271, such as linear acceleration and angular velocity measurement(s) from an IMU) and to provide as output any suitable pose data (e.g., an estimated six degrees of freedom ("6 DoF") pose for the sensor system (e.g., the camera and IMU system (e.g., mobile subsystem 100)), where some 6 DoF pose perception ma include locating the system to position (X, Y, Z) and orientation (pitch, roll, and yaw) (e.g., by comparing 6 DoF estimates computed by a system under test to 6 DoF ground truth values from a reference standard system with established accuracy). For example, a VIO module may be configured to detect image features and track them on consecutive frames. With the tracked features, a local map may be created by triangulating the position of each image feature. For each new frame, the VIO module may be configured to associate features on the acquired imagery with the ones on the local map, use a non-linear optimization procedure (e.g., based on the Gauss-Newton method) for optimizing the 6 DoF pose and refining the existing local map and, finally, triangulating new points. Such an estimated 6 DoF pose may be used to predict relative motion between frames and provide a distribution of probability of possible states given probabilities of previous states. In some embodiments, the LPSMS may be configured to use any suitable visual odometry (e.g., instead of coarse (e.g., first stage) matching). In such embodiments, the LPSMS may be configured to use any estimated relative motion between frames to propagate the pose in time and generate an estimate (e.g., a guess) for next fine localization, which may enable reducing search space. For example, a mobile subsystem (e.g., an aircraft) may perform localization at a time t=1, and during time t=1 until time t=99, there may be no sufficient features for map matching. However, at time t=100 there may be sufficient features, so the LPSMS may be configured to use the movement estimated by visual odometry between the frames t=1 until t=99 to generate an estimate or prediction (e.g., an initial guess) of the position at t=100. With such an estimate, which may be similar to the first stage matching, the LPSMS may be configured to perform the second stage matching to refine the position.

While LPSMS 201 may be described with respect to one or more image sensors 210 for generating image data 211 to be used for determining localization of mobile subsystem 100, it is to be understood that LPSMS 201 may be enabled using any other suitable environment sensor(s) as an alternative to or in addition to image sensors for capturing any other suitable environment data about the environment of mobile subsystem 100 as an alternative to or in addition to image data, including, but not limited to, temperature data, air quality data, sound quality data, and/or the like.

LPSMS 201 may receive any suitable georeferenced map or LPS data 202*a* (e.g., LPS or map database data) that may be generated or provided by any suitable LPS or map database(s) 202 from any suitable subsystem(s) of system 1 (e.g., by any suitable map data and/or navigation data or otherwise that may be generated by one or more map subsystems 102 and/or by one or more navigation subsystems 104 and/or by one or more LPS subsystems 106 and/or the like), such as any suitable first reference map or LPS data 204*a* that may be provided by any suitable first reference map or LPS database(s) 204 (e.g., a Vricon 3D map database) and/or any suitable second reference map or LPS data 206*a* that may be provided by any suitable second reference map or LPS database(s) 206 (e.g., a Vermeer 3D map database) and/or any suitable third reference map or LPS data 208*a* that may be provided by any suitable third reference map or LPS database(s) 208 (e.g., a Street View database), and/or the like. Different databases 202 may be used for providing different types of LPS data 202*a* (e.g., a first database may provide first georeferenced map data obtained by a satellite, while a second database may provide second georeferenced map data obtained by a plane or drone, while a third database may provide third georeferenced map data obtained by a ground vehicle, while a fourth database may provide fourth georeferenced map data obtained by a boat, and/or the like). For example, such map database(s) may provide any suitable georeferenced LPS data 202*a* via any suitable technology, including, but not limited to, geo-specific three-dimensional representations of the planet or other environment(s) that may include a digital elevation model ("DEM"), digital surface model ("DSM"), and/or digital terrain model ("DTM") (e.g., Precision3D or Vricon3D database), artificial intelligence ("AI")-generated 3D models and previsualization tools (e.g., Vermeer3D database), interactive panoramas of georeferenced images (e.g., of stitched virtual reality ("VR") photographs) of an environment (e.g., Street View database (e.g., Google Street View), where points of interest (e.g., latitude and longitude coordinates) of a mapped region may be selected and a number of images for each coordinate may be acquired to get a 360 degree view of each point)), and/or the like. Georeferencing may relate a map or any suitable images to a geographic coordinate system, where relevant coordinate transforms may be stored within the image file (e.g., GeoTIFF, GeoPDF, etc.). May other mechanisms for implementing georeferencing are suitable and able to be utilized for providing LPS data 202*a*. Therefore, georeferenced map data may include not only location information but also orientation information. As just one example, LPS data 204*a* (e.g., data from a Vricon3D database) may differ from LPS data 206*a* (e.g., data from a Vermeer3D database) based on resolution and/or source and/or any other suitable characteristic(s) (e.g., a Vricon 3D database may be populated by satellite images, while a Vermeer 3D database may be populated by scraping web data).

LPSMS 201 may include one or more feature extractor modules for extracting any suitable features from any suitable environment data for enabling the localization of mobile device 100. For example, as shown in FIG. 2, localization determiner 207 of LPSMS 201 may include any suitable image feature extractor module 220 that may be configured to extract from any suitable image data 211 any suitable image features 223, including, but not limited to, any suitable first or image detailed features 221 and any suitable second or image global features 222. Additionally, as also shown in FIG. 2, map features generator 205 of LPSMS 201 may include any suitable map feature extractor module 290 that may be configured to extract from any suitable LPS map data 202*a* any suitable map features 293, including, but not limited to, any suitable first or map detailed features 291 and any suitable second or map global features 292. While image data 211 from any suitable sensor(s) 211 of mobile subsystem 100 may be received as input to image feature extractor module 220, some LPS map data 202*a* from certain LPS database(s) 202 may be first handled by a map sampler module 280 such that the processed LPS map renderings data 281 output by map sampler module 280 may be received as input to map feature extractor module 290. For example, although any suitable third reference map or LPS data 208*a* that may be provided by any suitable third reference map or LPS database(s) 208 may be received as input to map feature extractor module 290 while any suitable first reference map or LPS data 204*a* that may be provided by any suitable first reference map or LPS database(s) 204 and/or any suitable second reference map or LPS data 206*a* that may be provided by any suitable second reference map or LPS database(s) 206 may first be handled by map sampler module 280. Map sampler module 280 may be configured to render a large number of different views of a map (e.g., of LPS data 204*a* and/or of LPS data 206*a*). For example, LPS data 204*a* and/or LPS data 206*a* may provide reference map data as input that may be processed by map sampler module 280 (e.g., by grid sampling on a map) to generate as output a set of map renderings data 281 that may be consumed by map feature extractor module 290 similarly to third reference map or LPS data 208*a*. For example, map sampler module 280 may be configured to transform 3D models (e.g., data from database 204 and/or database 206) into images, while other map data may already include images and not be processed by a map sampler module (e.g., data from a georeferenced image database (e.g., street view map data)).

Figure 2A:
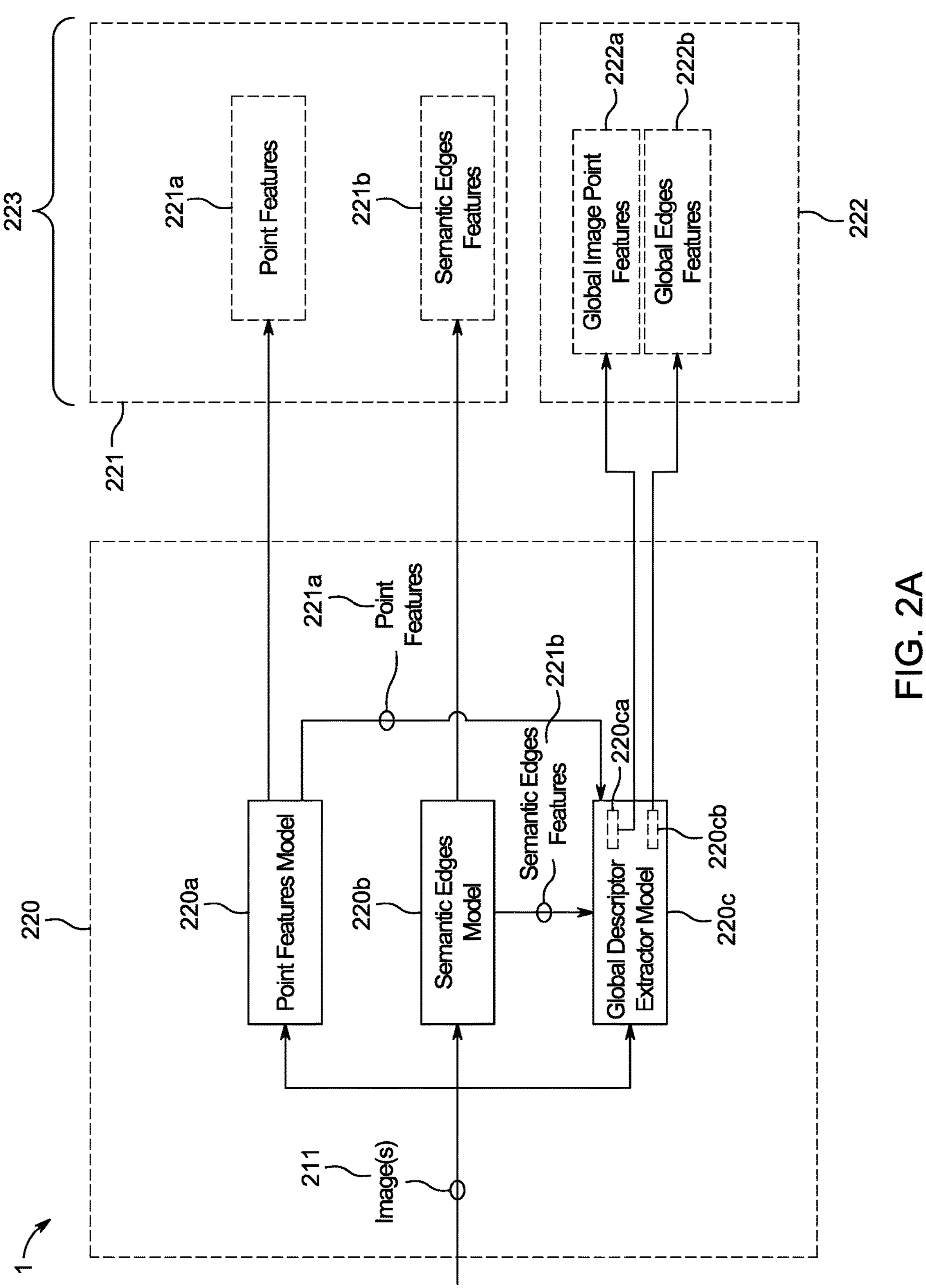
FIG. 2A is a schematic view of a portion of the system of FIG. 1, in accordance with one or more implementations.

As shown in FIGS. 2 and 2A, image feature extractor module 220 may be configured to extract from any suitable input image(s) of image data 211 any suitable image features 223, including, but not limited to, any suitable first or image detailed features 221 and any suitable second or image global features 222. In some embodiments, as shown in FIG. 2A, image feature extractor module 220 may include one or more models that may be trained to extract particular type(s) of image features 223. For example, as shown, image feature extractor module 220 may include a point features model 220*a* that may be configured to extract from any suitable image of image data 211 one or more image point features 221*a* as a first type of image detailed features 221 of image features 223 and/or a semantic edges features model 220*b* that may be configured to extract from any suitable image of image data 211 one or more image semantic edges features 221*b* as a second type of image detailed features 221 of image features 223. Additionally or alternatively, as shown, image feature extractor module 220 may include a global descriptor extractor model 220*c* that may be configured to extract from any suitable image of image data 211, in conjunction with one or more image point features 221*a* and/or image semantic edges features 221*b*, one or more global image point features 222*a* as a first type of image global features 222 of image features 223 (e.g., from any suitable image of image data 211 in conjunction with one or more image point features 221*a* via a global image feature extractor submodule 220*ca* of global descriptor extractor model 220*c*) and/or that may be configured to extract from any suitable image of image data 211, in conjunction with one or more image point features 221*a* and/or image semantic edges features 221*b*, one or more global image edges features 222*b* as a second type of image global features 222 of image features 223 (e.g., from any suitable image of image data 211 in conjunction with one or more image semantic edges features 221*b* via a global image semantic edges extractor submodule 220*cb* of global descriptor extractor model 220*c*).

Image point features 221*a* may be extracted from image data 211 by any suitable point features model 220*a*, which may be a deep learning model that may be trained on real and/or synthetic data. Point features model 220*a* may be a composition of linear and non-linear functions that may have its parameters optimized or otherwise configured for detecting optimal feature descriptions between image and map points. As described with respect to FIG. 2C, point features model 220*a* and/or any other model of feature extractor module 220 may be trained by comparing real images taken from image sensor(s) of a suitable mobile subsystem or the like with map renders captured by any suitable map subsystem(s) or the like. Image point features 221*a* or local point features or detailed point features or image point descriptors or image key features or interest point features or interest points from one or more images of image data 211 may be any suitable features, such as features that may be stable and repeatable (e.g., from different view-points, different lighting conditions, and/or different map representations). For example, point features may be a set of vectors containing image coordinates, possibly 3D coordinates, and a feature descriptor vector. The feature descriptor vector may be such that different point features taken from the same object but from different sources/views (e.g., sources might be a map, images from cameras, images from drones, images taken at different times, image taken at different positions/orientation, etc.) may have a similar feature descriptor vector (e.g., similar in the sense of distance in some mathematic measure of distance (e.g., cosine distance, L2-norm, Hamming distance, and/or any other suitable distance that may vary according to how that descriptor vector was generated)). Feature descriptor vectors may include, but are not limited to, scale invariant feature transform ("SIFT"), speeded up robust feature ("SURF"), oriented FAST ("features from accelerated segment test") and rotated BRIEF ("binary robust independent elementary features") ("ORB"), KAZE (e.g., accelerated KAZE), and/or the like. As a specific example, point features may contain 2D points for an image or 2D+3D points for a map render (e.g., stored in UTM coordinates), and a feature descriptor vector may be learned using any suitable machine learning ("ML") model. ML techniques may be utilized to allow improved or optimal feature description between image points (e.g., from image data 211) and map points (e.g., from LPS data 202*a*/281), such as by learning from patterns in the data distribution. By formulating feature description as a machine learning problem, it is possible to increase the algorithm effectiveness on particular data sets (e.g., aerial images). Each extracted detailed image point feature may be represented by its own image point feature vector of image point feature(s) data 221*a*.

Image semantic edges features 221*b* or local edges features or detailed edges features or semantic edges masks or skylines may be extracted from image data 211 by any suitable semantic edges features model 220*b*, which may be a deep learning model that may be trained on real and/or synthetic data. Semantic edges features model 220*b* may be configured to take one or more images of image data 211 as input and output K masks, which may contain edges with semantic meaning, where each mask may represent edges of a specific class in a set of K classes (e.g., buildings, vegetation, street, water bodies, etc.). Semantic edges features model 220*b* may be optimized for detecting the boundaries (e.g., edges) of objects in the captured image(s) while preserving the class information. Edge features may be features extracted from the boundaries of objects (e.g., skyline, boundary between building and ground, building and mountains, water and trees, etc.). An edge may be a vector that encodes information related to all points in a boundary in an image. A semantic edge may be an edge with specific information about what classes of objects these boundaries represent (e.g., tree/water, building/sky). Each extracted detailed edge feature may be represented by its own image detailed edge feature vector of image semantic edges feature(s) data 221*b*. For example, an edge feature vector may include pixel coordinates for some or all points representing an edge in a given image, and meta information that may point to which classes of objects (e.g., tree, building, water, sky, etc.) created this edge.

Global image point features 222*a* or global image descriptors may be extracted from any suitable image of image data 211 in conjunction with one or more image point features 221*a* by any suitable global descriptor extractor model 220*c* (e.g., via a global image feature extractor submodule 220*ca* of global descriptor extractor model 220*c*), which may be a deep learning model that may take one or more images from image data 211 and/or associated image point features 221*a* as input and output a single vector that may represent the ensemble of all image point features associated with a particular image.

Global image edges features 222*b* or VLAD based global descriptors may be extracted from any suitable image of image data 211 in conjunction with one or more image semantic edges features 221*b* by any suitable global descriptor extractor model 220*c* (e.g., via a global image semantic edges extractor submodule 220*cb* of global descriptor extractor model 220*c*), which may be a deep learning model that may take one or more images from image data 211 and/or associated global image edges features 222*b* as input and output a single vector that may represent the ensemble of all image edge features associated with a particular image.

Figure 2B:
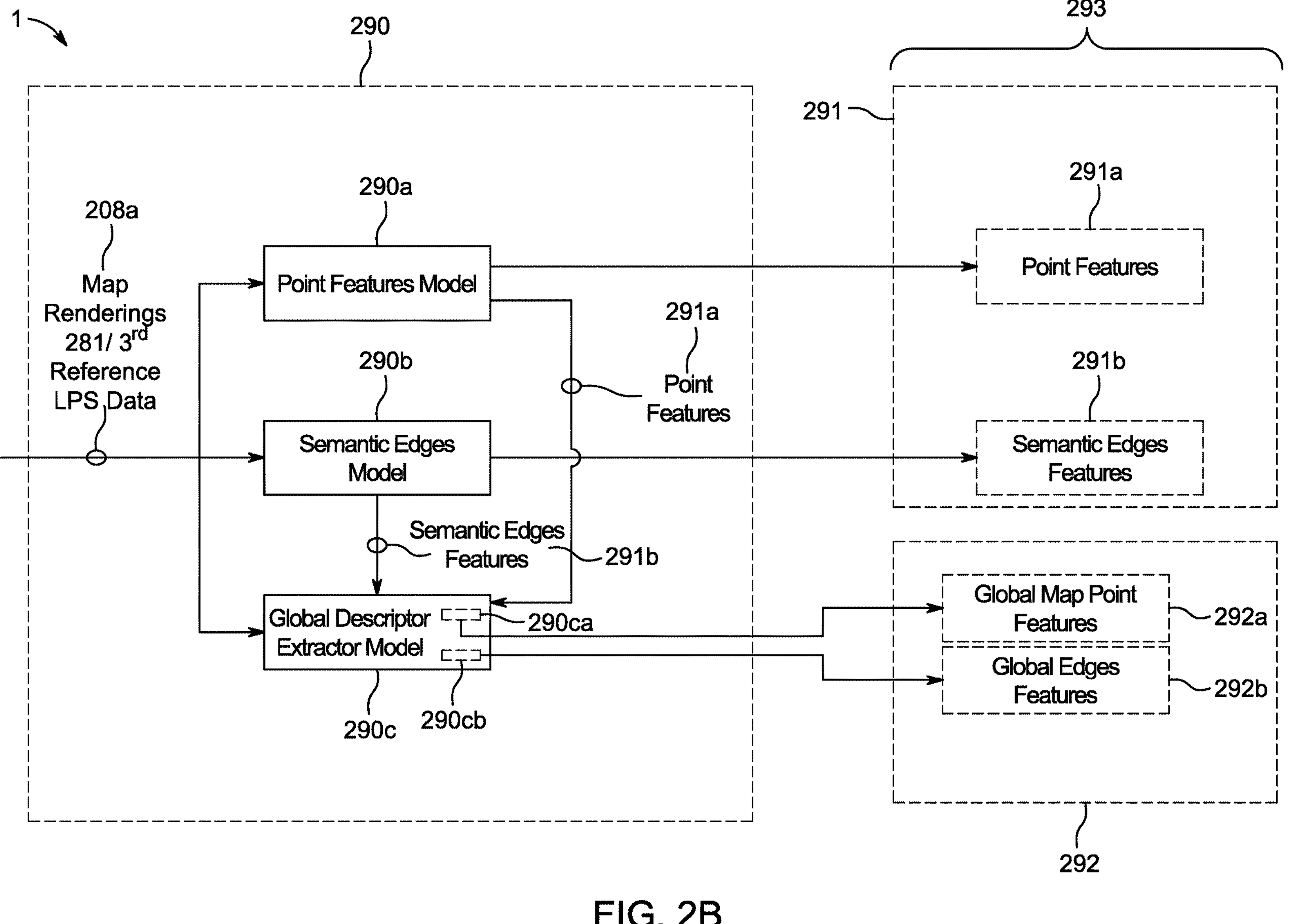
FIG. 2B is a schematic view of a portion of the system of FIG. 1, in accordance with one or more implementations.

As shown in FIGS. 2 and 2B, map feature extractor module 290 may be configured to extract from any suitable input map(s) of map data (e.g., map renderings 281/third reference LPS data 208*a*) any suitable map features 293, including, but not limited to, any suitable first or map detailed features 291 and any suitable second or map global features 222. In some embodiments, as shown in FIG. 2B, map feature extractor module 290 may include one or more models that may be trained to extract particular type(s) of map features 293 (e.g., similar to module 220 with respect to image features 223). For example, map feature extractor module 290 may be similar to image feature extractor module 220, but may be with adaptations to run faster on map renderings (e.g., it can extract some map features faster because there may be texture information and 3D geometry information in the map(s)) as it may be working on map renderings (e.g., data 281) and/or previously georeferenced images (e.g., data 208*a*). For example, as shown, map feature extractor module 290 may include a point features model 290*a*, which may be similar to model 220*a*, but that may be configured to extract from any suitable map(s) of map data 281/208*a* one or more map point features 291*a* as a first type of map detailed features 291 of map features 293 (e.g., unlike image point features, map point features may include 3D information (e.g., extracted from the map)), and/or a semantic edges features model 290*b*, which may be similar to model 220*b*, but that may be configured to extract from any suitable map(s) of map data 281/208*a* one or more map semantic edges features 291*b* as a second type of map detailed features 291 of map features 293 (e.g., unlike image edge features, map edge features may include 3D information (e.g., extracted from the map)). Additionally or alternatively, as shown, map feature extractor module 290 may include a global descriptor extractor model 290*c*, which may be similar to model 220*c*, but that may be configured to extract from any suitable map(s) of map data 281/208*a* in conjunction with one or more map point features 291*a* and/or map semantic edges features 291*b* one or more global map point features 292*a* as a first type of map global features 292 of map features 293 (e.g., from any suitable map of map data 281/208*a* in conjunction with one or more map point features 291*a* via a global map feature extractor submodule 290*ca* of global descriptor extractor model 290*c*) (e.g., global map point features may be similar to global image point features except their sources may be different) and/or that may be configured to extract from any suitable map of map data 281/208*a* in conjunction with one or more map point features 291*a* and/or map semantic edges features 291*b* one or more global map edges features 292*b* as a second type of map global features 292 of map features 293 (e.g., from any suitable map of map data 281/208*a* in conjunction with one or more map semantic edges features 291*b* via a global map semantic edges extractor submodule 290*cb* of global descriptor extractor model 290*c*) (e.g., global map edges features may be similar to global image edges features except their sources may be different). 3D information (e.g., for some or each coordinate on a map image) may be extracted from a map during render such that such 3D information may be passed along with any associated extracted feature(s), however the extraction process may be carried out independent of the 3D information. Such 3D information may be used during feature extractor model training (e.g., training, as may be described with respect to FIG. 2C). Such training may involve comparing feature vector descriptors extracted from a map and corresponding feature vector descriptors extracted from an image. After extraction (e.g., via an extractor model 224 being trained), a matching module may be configured to determine correspondences between extracted image feature vector descriptors and map feature vector descriptors (e.g., which feature from map corresponds to which feature from image) by utilizing any suitable reprojection function that may be configured to take as one input position/orientation information with respect to the image sensor(s) that captured the image and as another input 3D information extracted from the map. The extractor model may be trained to output feature descriptors and not to perform any matching, so when the model is run it may provide feature vector descriptors that need to be matched. While training an extractor model, correct matches may be identified and provided so that the model can learn from correct associations (e.g., a matching module may use reprojection to identify correct matches because georeferenced pose information associated with the image may be available during training (e.g., information that may not be available during run time of an extractor model during use of the LPSMS by a navigation-denied mobile subsystem). Therefore, relative pose information between image and map may be used by a matching module to determine correspondence, and when a good correspondence between vectors is determined, then the matching module may be configured to compute error by comparing the vectors (e.g., error may be any suitable difference between the image and map vector descriptors) and that error may then be used to optimize the feature extractor model. Local map point features and/or local map edges features may include depth information or may be associated with depth information (e.g., 3D information extracted from the map), while global map features may be configured not to. Local feature vectors may not include depth information but such 3D/depth information may be passed along with one or more local map feature vectors (e.g., passed along complimentary to vector(s) but represented by same object in code). Such 3D information may be used to improve or speed up or enable a reprojection function when training a feature extractor model. Additionally or alternatively, such 3D information may be used to solve a Perspective-n-Point ("PnP") problem for pose points (e.g., when estimating a pose of image sensor(s) of a mobile subsystem (e.g., at module 240 for providing pose data 241)).

Map point features 291*a* may be extracted from map(s) of map data 281/208*a* by any suitable point features model 290*a* and stored in database 260. Model 290*a* may be a deep learning model that may be trained on real and/or synthetic data. Point features model 290*a* may be a composition of linear and non-linear functions that may have its parameters optimized or otherwise configured for detecting optimal feature descriptions between image and map points. As described with respect to FIG. 2C, point features model 290*a* and/or any other model of feature extractor module 290 may be trained by comparing real images taken from image sensor(s) of a suitable mobile subsystem or the like with map renders captured by any suitable map subsystem(s) or the like. Map point features 291*a* or map point descriptors or map key features or interest point features or interest points from one or more map(s) of map data 281/208*a* may be any suitable features, such as features that may be stable and repeatable (e.g., from different view-points, different lighting conditions, and/or different map representations). Machine learning ("ML") techniques may be utilized to allow optimal feature description between image points (e.g., from image data 211) and map points (e.g., from LPS data 202*a*/281), such as by learning from patterns in the data distribution. By formulating feature description as a machine learning problem, it is possible to increase the algorithm effectiveness on particular data sets (e.g., aerial images). In embodiments where georeferenced images are made available (e.g., as data 208*a*), map point features 291*a* may be extracted using point features model 290*a*, where projective rays of these features may be cast to the map for recovering their depth. To create a particular embodiment of database 208 (e.g., a georeferenced Street View images database), points of interest (e.g., latitude and longitude coordinates) of the mapped region of such georeferenced map image data 208*a* may be selected, and a number of images for each coordinate may be acquired to get a 360 degrees view of each point. In such an embodiment, map point features 291*a* may be extracted from such georeferenced map image data 208*a* using the feature extraction deep learning model 290*a* while their corresponding 3D points on the map renderings 281 of data 204*a* and/or 206*a* may be extracted. Each map point feature 291*a* may be defined as a vector that may include feature information and that may, in some embodiments, also include or be associated with (e.g., passed along with) information indicative of the georeferenced location data of the map image from which the feature was extracted (e.g., by the point being in the reference frame of the map image where the camera is being extracted and the LPSMS may have the transformation of that image, and metadata of the image each map point was taken from may be stored). In some embodiments, module 290 may be configured to perform alignment refinement between the images of georeferenced map image data 208*a* and the reference map (e.g., using any suitable perspective-n-point algorithm that may be based on feature matches). The extracted points in world coordinates and the georeferenced pose related to the images (e.g., georeferenced map image data 208*a*) may be saved on a database 260 (e.g., as features 291). If georeferenced map image data 208*a* is available, then module 290 may be configured to utilize features from the images of such data and not from map renderings 281. If georeferenced map image data 208*a* is not available, but there are significant texture elements on the map (e.g., the map renderings 281 of data 204*a* and/or 206*a*), point features model 290*a* may be applied directly on map rendering(s) 281 and the depth of the point feature(s) may be recovered directly from the map (e.g., by point picking). In this case, an input of global descriptor extractor model 290*c* may be the map rendering(s).

Map semantic edges features 291*b* or semantic edges masks or skylines may be extracted from map(s) of map data 281/208*a* by any suitable semantic edges features model 290*b* and stored in database 260. Model 290*b* may be a deep learning model that may be trained on real and/or synthetic data. Semantic edges features model 290*b* may be configured to take one or map(s) of map data 281/208*a* as input and output K masks, which may contain edges with semantic meaning, where each mask may represent edges of a specific class in a set of K classes (e.g., buildings, vegetation, street, water bodies, etc.). Semantic edges features model 290*b* may be optimized for detecting the boundaries (e.g., edges) of objects in the map(s) while preserving the class information. Each map semantic edge feature 291*b* may be defined as a vector that may include feature information and that may, in some embodiments, also include or be associated with (e.g., passed along with) information indicative of the georeferenced location data of the map image from which the feature was extracted (e.g., by the point being in the reference frame of the map image where the camera is being extracted and the LPSMS may have the transformation of that image, and metadata of the image each map point was taken from may be stored).

Global map point features 292*a* or global map descriptors may be extracted from any suitable map(s) of map data 281/208*a* in conjunction with one or more map point features 291*a* by any suitable global descriptor extractor model 290*c* (e.g., via a global map feature extractor submodule 290*ca* of global descriptor extractor model 290*c*), which may be a deep learning model that may take one or more map(s) of map data 281/208*a* and/or associated map point features 291*a* as input and output a single vector (e.g., for storage on database 250) that may represent the ensemble of all map point features associated with a particular map. Each map point feature 292*a* may be defined as a vector that may include feature information and that may, in some embodiments, also include or be associated with (e.g., passed along with) information indicative of the georeferenced location data of the map image from which the feature was extracted (e.g., by the point being in the reference frame of the map image where the camera is being extracted and the LPSMS may have the transformation of that image, and metadata of the image each map point was taken from may be stored).

Global map edges features 292*b* or VLAD based global descriptors may be extracted from any suitable map(s) of map data 281/208*a* in conjunction with one or more map semantic edges features 291*b* by any suitable global descriptor extractor model 290*c* (e.g., via a global map semantic edges extractor submodule 290*cb* of global descriptor extractor model 290*c*), which may be a deep learning model that may take one or more map(s) of map data 281/208*a* and/or associated global map edges features 292*b* as input and output a single vector (e.g., for storage on database 250) that may represent the ensemble of all map edge features associated with a particular map. Each map semantic edge feature 292*b* may be defined as a vector that may include feature information and that may, in some embodiments, also include or be associated with (e.g., passed along with) information indicative of the georeferenced location data of the map image from which the feature was extracted (e.g., by the point being in the reference frame of the map image where the camera is being extracted and the LPSMS may have the transformation of that image, and metadata of the image each map point was taken from may be stored).

Semantic edges can be directly extracted from the map, for example, as there may be known semantic meaning associated with each map element (e.g., the map vertices and faces may be labeled into classes, either manually or by an automatic process). Therefore, semantic edges may be extracted directly from individual edges of one or some or each map object, which may result in an accurate estimation, as depth information may be extracted for every point in the edge. Map semantic edges features 291*b* may be used as input for global descriptor extractor model 290*c*.

Map feature extractor module 290 may be configured to produce map global features 292 and map detailed features 291 that may be matched with image global features 222 and image detailed features 221, respectively. Global features may encode the whole image in a single feature vector (e.g., encoding at models 220*c*/290*c*). These features can be extracted using machine learning models or by "bagging" methods (e.g., statistical techniques of creating a global representation for image features) around locally extracted features.

LPSMS 201 may include a map global feature database 250 that may store any suitable dataset of map global features (e.g., a dataset that may be built using any suitable technique(s) (e.g., Facebook AI Similarity Search ("FAISS")) as a library for efficient similarity search and clustering of dense vectors, which may contain any suitable algorithm(s) that may enable search in sets of vectors of any size) to index the map global features 292 extracted by map feature extractor 290 along with the corresponding poses where features were generated. Map global features 292 may be quantized and clustered in order to speed up queries, as map global feature database 250 may represent the largest possible area of search that may return global map mosaic vector data with localization 251 (e.g., quantized map global feature data 251 in response to a map global feature query 251*r* from a first matching module 230). For example, at a query time for a map global feature query 251*r* from a first matching module 230, image global features 222 may be provided along with orientation data 271 associated with the image(s) of the query. Such orientation data 271 may be used to reduce the search space so that for each query only features with similar orientation may be retrieved as data 251. As an example, orientation data 271 may be used as an input to database 250 to reduce map global features 292 to quantized map global feature data 251 for use by first matching module 230.

LPSMS 201 may include a map local feature database 260 that may store any suitable dataset of map local features (e.g., a dataset that may be built using any suitable technique(s) (e.g., FAISS) as a library for efficient similarity search and clustering of dense vectors, which may contain any suitable algorithm(s) that may enable search in sets of vectors of any size) to index the map local or detailed features 291 extracted by map feature extractor 290 along with the corresponding poses where features were generated. Map detailed features 291 may be quantized and clustered in order to speed up queries, as map local feature database 260 may represent the largest possible area of search that may return detailed map mosaic feature data with localization 261 (e.g., quantized map detailed feature data 261 in response to a map detailed or local feature query 261*r* from a second matching module 240). For example, at a query time for a map local feature query 261*r* from a second matching module 240, image detailed features 221 may be provided along with orientation data 271 associated with the image(s) of the query. Such orientation data 271 may be used to reduce the search space so that for each query only features with similar orientation may be retrieved as data 261. As an example, orientation data 271 may be used as an input to database 260 to reduce map local features 291 to quantized map local feature data 261 for use by second matching module 240. Additionally or alternatively, at a query time for a map local feature query 261*r* from a second matching module 240, image detailed features 221 may be provided along with candidate region data 231 associated with the image(s) of the query. Such candidate localization region data 231 may be determined by first matching module 230 and may be used to reduce the search space so that for each query only features with similar localization region(s) to that of data 231 may be retrieved as data 261. As an example, candidate region data 231 may be used as an input to database 260 to reduce map local features 291 to quantized map local feature data 261 for use by second matching module 240. In some embodiments, data 261 can be extracted at runtime or pre-computed and cached (e.g., if the probable trajectory is known (e.g., using a trajectory planner)). For example, if a mobile subsystem is using a trajectory that may be determined or accessible by the LPSMS, the LPSMS may be configured to pre-compute a map for the trajectory that the mobile subsystem may likely assume in the future. Data 261 may include the particular queried map detailed features from the map combined with localization information.

Any suitable model (e.g., deep learning model) or machine learning engine may be developed and/or generated for use in providing any suitable functionality of the LPSMS (e.g., extractor module 220, extractor module 290, matcher module 230, matcher module 240, and/or the like). For example, the machine learning engine may include any suitable neural network (e.g., an artificial neural network) or deep learning model that may be initially configured, trained on one or more sets of input data from any suitable sources with known or preferred associated output(s), and then used to predict a value for one or more desired output type(s) based on another set of input data.

A neural network or neuronal network or artificial neural network may be hardware-based, software-based, or any combination thereof, such as any suitable model (e.g., an analytical model, a computational model, etc.), which, in some embodiments, may include one or more sets or matrices of weights (e.g., adaptive weights, which may be numerical parameters that may be tuned by one or more learning algorithms or training methods or other suitable processes) and/or may be capable of approximating one or more functions (e.g., non-linear functions or transfer functions) of its inputs. The weights may be connection strengths between neurons of the network, which may be activated during training and/or prediction. A neural network may generally be a system of interconnected neurons that can compute values from inputs and/or that may be capable of machine learning and/or pattern recognition (e.g., due to an adaptive nature). A neural network may use any suitable machine learning techniques to optimize a training process. The neural network may be used to estimate or approximate functions that can depend on a large number of inputs and that may be generally unknown. The neural network may generally be a system of interconnected "neurons" that may exchange messages between each other, where the connections may have numeric weights (e.g., initially configured with initial weight values) that can be tuned based on experience, making the neural network adaptive to inputs and capable of learning (e.g., learning pattern recognition). A suitable optimization or training process may be operative to modify a set of initially configured weights assigned to the output of one, some, or all neurons from the input(s) and/or hidden layer(s). A non-linear transfer function may be used to couple any two portions of any two layers of neurons, including an input layer, one or more hidden layers, and an output (e.g., an input to a hidden layer, a hidden layer to an output, etc.).

Different input neurons of the neural network may be associated with respective different data categories or types of images and/or map renders and/or image features and/or map features and may be activated by image data (e.g., data 211), LPS data (e.g., data 202*a*/renderings 281), image feature data 223 (e.g., data 221 and/or data 222), map feature data 293 (e.g., data 291 and/or data 292), orientation data (e.g., inertial data 271), candidate regions (e.g., region data 231), and/or the like may be associated with one or more particular respective input neurons of the neural network and data for the particular type may be operative to activate the associated input neuron(s). The weight assigned to the output of each neuron may be initially configured using any suitable determinations that may be made by a custodian or processor of a model based on the data available to that custodian.

The initial configuring of a learning engine or model (e.g., the initial weighting and arranging of neurons of a neural network of the learning engine) may be done using any suitable data accessible to a custodian of the model, such as data associated with the configuration of other learning engines of system 1, data assumed or inferred by the model custodian using any suitable guidance, and/or the like. For example, a model custodian may be operative to capture any suitable initial background data in any suitable manner, which may be enabled by any suitable user interface provided to an appropriate subsystem or device accessible to one, some, or each entity (e.g., a model app or website). The model custodian may provide a data collection portal for enabling any suitable entity to provide initial background data. The data may be uploaded in bulk or manually entered in any suitable manner.

A model custodian may receive not only input data but also training output data from any suitable source(s). A learning engine or model may be trained using the received input data (e.g., as inputs of a neural network of the learning engine) and using the received training output data (e.g., as an output of the neural network of the learning engine). Any suitable training methods or algorithms (e.g., learning algorithms) may be used to train the neural network of the learning engine, including, but not limited to, Back Propagation, Resilient Propagation, Genetic Algorithms, Simulated Annealing, Levenberg, Nelder-Meade, and/or the like. Such training methods may be used individually and/or in different combinations to get the best performance from a neural network. A loop (e.g., a receipt and train loop) of receiving input data and associated output data for that input data and then training the model using the received input data and output data may be repeated any suitable number of times for the same learning engine for more effectively training the learning engine, where the received input data and associated output data of different receipt and train loops may be for different sets of inputs or the same sets (e.g., at different times) and/or may be received from the same source or from different sources (e.g., a first receipt and train loop may include receiving input data and associated output data from a first source for a first environment, while a second receipt and train loop may include receiving input data and associated output data from a second source with respect to that same first environment, while a third receipt and train loop may include receiving input data and associated output data from a third source for a second environment, while a fourth receipt and train loop may include receiving input data and associated output data from a fourth source for the second environment, and/or the like), while the training of different receipt and train loops may be done for the same learning engine using whatever input data and associated output data was received for the particular receipt and train loop. The number and/or type(s) of the one or more input data categories for which input data may be received for one receipt and train loop may be the same or different in any way(s) than the number and/or type(s) of the one or more input data categories for which input data may be received for a second receipt and train loop.

A trained model may then receive input data from any suitable source using any suitable methods for use by the model. The trained model may then use this new input data to generate output data using the learning engine or model. For example, the new input data may be utilized as input(s) to the neural network of the learning engine similarly to how other input data accessed for a receipt and train loop may be utilized as input(s) to the neural network of the learning engine at a training portion of the receipt and train loop, and such utilization of the learning engine with respect to the new input data may result in the neural network providing an output indicative of data that may represent the learning engine's predicted or estimated result.

The processing power and speed of the LPSMS and its various models may be configured to determine continuously an updated localization of a mobile subsystem and present associated information or otherwise adjust a managed element based on the determined localization automatically and instantaneously or substantially instantaneously based on any new received image and/or inertial data that may be generated by the mobile subsystem, such that localization of the mobile subsystem may run quickly and smoothly. This may enable the mobile subsystem to operate as effectively and as efficiently as possible despite any limited or denied navigation network communication.

A feature extractor model of LPSMS 201 (e.g., one or more of models 220, 220*a*, 220*b*, 220*c*, 220*ca*, 220*cb*, 290, 290*a*, 290*b*, 290*c*, 290*ca*, 290*cb*, and/or the like) may be generated and trained using any suitable techniques for extracting similar features from both images of mobile subsystem image data (e.g., data 211) and map rendered images of map subsystem map data (e.g., data 202*a*). For example, as shown by FIG. 2C, a feature extractor model training system 1' may be utilized to train any suitable feature extractor model 224 that may then be provided as any suitable feature extractor model(s) of LPSMS 201. System 1' may utilize any suitable training mobile subsystem(s) 100' and any suitable LPS database(s) 202 for obtaining any suitable training data 263'. For example, as shown, each training mobile subsystem 100' may be similar to any suitable mobile subsystem 100 of FIG. 1, and may include any suitable one or more image sensor(s) 210' that may be operative to generate any suitable image data 211' (e.g., mobile camera image data) that may be indicative of one or more images captured by subsystem 100' (e.g., for use as a portion of training data 263'), one or more inertial sensor(s) 270' that may be operative to generate any suitable inertial data 271' (e.g., compass data) that may be indicative of any suitable orientation of subsystem 100' and/or of its one or more image sensors 210' when one or more images of data 211' were captured (e.g., for use as a portion of training data 263'), and one or more location sensor(s) 264' that may be operative to generate any suitable location data 265' (e.g., GPS data) that may be indicative of any suitable location of subsystem 100' and/or of its one or more image sensors 210' when one or more images of data 211' were captured (e.g., for use as a portion of training data 263'). A training mobile subsystem 100' may traverse an environment while capturing images and also capturing its location and orientation when each image is captured for enabling such data to be provided to training system 1'. In addition to training mobile subsystem data 211', 271', and 265', training data 263' may also include any suitable LPS data 202*a* from any suitable LPS database(s) 202.

Feature extractor model training system 1' may include a map sampler module 280' that may be configured to render a large number of different views of a map (e.g., of LPS data 204*a* and/or of LPS data 206*a*). For example, LPS data 204*a* and/or LPS data 206*a* may provide reference map data as input that may be processed by map sampler module 280' (e.g., by grid sampling on a map) to generate as output a set of map renderings data 281' that may be consumed by map feature extractor model 224 similarly to how it may consume third reference map or LPS data 208*a*. In addition to generating LPS map rendering data 281' that may be indicative of one or more georeferenced map rendered images (e.g., from LPS data 204*a* and/or LPS data 206*a* and/or as LPS data 208*a* (e.g., as georeferenced image data)) from LPS data 202*a*, map sampler module 280' may generate such LPS map rendering data 281' from LPS data 202*a* that may be georeferenced to the particular orientation of orientation data 271' and particular location of location data 265' of particular image data 211', such that both that particular image data 211' and that particular LPS map rendering data 281' associated with the same orientation and location may be received as inputs by feature extractor model 224. Therefore, LPS data 202*a* of map databases 202 may be georeferenced for both location and orientation such that map sampler module 281' may be configured to render map images from georeferenced maps for the same location and the same orientation as that of the mobile subsystem when capturing the mobile subsystem image(s). Therefore, map renderer 280' may be operative to process the location and orientation information of a mobile subsystem image (e.g., data 265' and 271' (e.g., GPS and compass information)) along with any available map LPS data 202*a* to produce a georeferenced map rendered image (e.g., data 281') that is similar to the mobile subsystem image (e.g., data 211' (e.g., captured camera image)) due to their similar associated location and orientation. Map data 202*a* and map rendered data 281' (e.g., map rendered images) may have a different (e.g., lower) resolution than mobile subsystem image data 211' (e.g., map rendered images may be captured by and/or Google Earth satellite while mobile image data may be captured by camera(s) much closer to the environment being captured).

Feature extractor model 224 may be any suitable model (e.g., machine learning (e.g., deep learning) model) that may be configured to extract one or more types of feature from each one of the mobile subsystem image (e.g., of data 211') and the similar map rendered image (e.g., of data 281'). For example, model 224 may be configured to extract at least a first type of feature as an image feature vector 223*i* from the mobile subsystem image of image data 211' and at least the first type of feature as a map feature vector 223*m* from the map rendered image of data 281'. Therefore, each one of outputs 223*i* and 223*m* from model 224 may be a vector or a set of vectors, such that feature matching module may be configured to determine correspondence and/or matching between two vectors or two sets of vectors. The type of extracted feature for generating a feature vector set 223*s* that may include an image feature vector 223*i* and an associated map feature vector 223*m* may be any suitable type of feature, including, but not limited to, local/detailed point feature (e.g., as may be similar to that of data 221*a*/291*a*), local/detailed edge feature (e.g., as may be similar to that of data 221*b*/291*b*), global point feature (e.g., as may be similar to that of data 222*a*/292*a*), global edge feature (e.g., as may be similar to that of data 222*b*/292*b*), and/or the like. Model 224 may be configured to determine (e.g., automatically) the feature(s) and/or feature type(s) (e.g., the best feature(s)/feature type(s)) to be extracted from an image set of the training data and/or a custodian of the model may make such a determination at least partially manually.

Feature extractor model training system 1' may include a feature matching module 226 that may be configured to receive a set 223*s* of image and map feature vectors 223*i* and 223*m* of a particular feature as extracted by model 224. Feature matching module 226 may be any suitable module that may be configured to compare an image feature vector 223*i* and its associated map feature vector 223*m* of an aligned vector set 223*s* for a particular feature and then output a matching error metric 225 indicative of the difference(s) between the image feature vector 223*i* and its associated map feature vector 223*m* of the aligned vector set 223*s* (e.g., using cosine similarity or any other suitable type of similarity determination).

Feature extractor model training system 1' may include an optimizer module 228 that may be configured to receive a matching error metric 225 for a particular feature vector set 223*s* of image and map feature vectors 223*i* and 223*m* of a particular feature as extracted by model 224. Optimizer module 228 may be any suitable module that may be configured to run a procedure (e.g., a machine learning training and/or optimization procedure) based on any suitable data (e.g., based on matching error metric 225 and/or its associated aligned vector set 223*s* and/or any suitable characteristic information 223*c* about the current state of model 224) for determining one or more parameters (e.g., weights or weight values of neuron(s) and/or neuron connection(s)) of feature extractor model 224 that may be operative to be adjusted to reduce or minimize matching error metric 225 of a particular feature for a particular feature vector set to be extracted by model 224. Module 228 may be operative to generate any suitable model parameter optimization data 227 based on such a procedure that may then be provided to model 224, where model parameter optimization data 227 may be configured to instruct model 224 to train model 224 to reduce the matching error between feature vectors of an aligned vector set for an extracted feature (e.g., to instruct model 224 to adjust one or more model parameters based on the procedure run by optimizer module 228). Optimizer module 228 may be configured as any suitable algorithm(s) and/or process(es) that may be based on gradient descent or otherwise and that may reduce or minimize a reprojection error of feature matching during training, and may be responsible for optimizing the weights of the feature extractor model 224 (e.g., to reduce or minimize loss). As the loss may be the reprojection error of feature matching, if the loss is minimal (e.g., local minimal) then system 1' may have found an optimal set of matches between the features and consequently may have found the best representation of feature vector that may allow such matches (e.g., given that the system may know the association between two features due to knowing position/orientation of both image and map renders).

Figure 9:
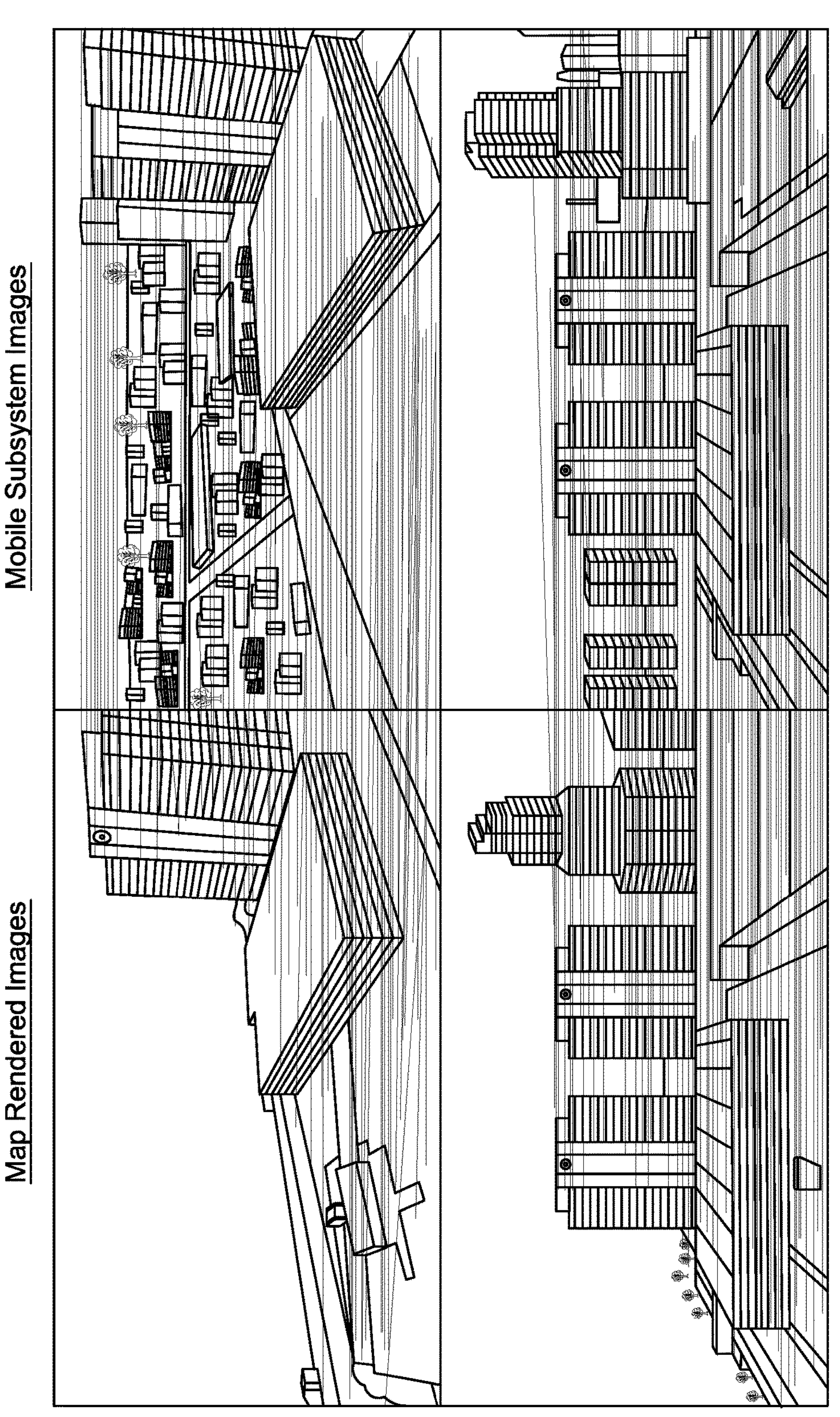
FIG. 9 illustrates exemplary evidence of feature point matching, in accordance with one or more implementations.
Figure 10:
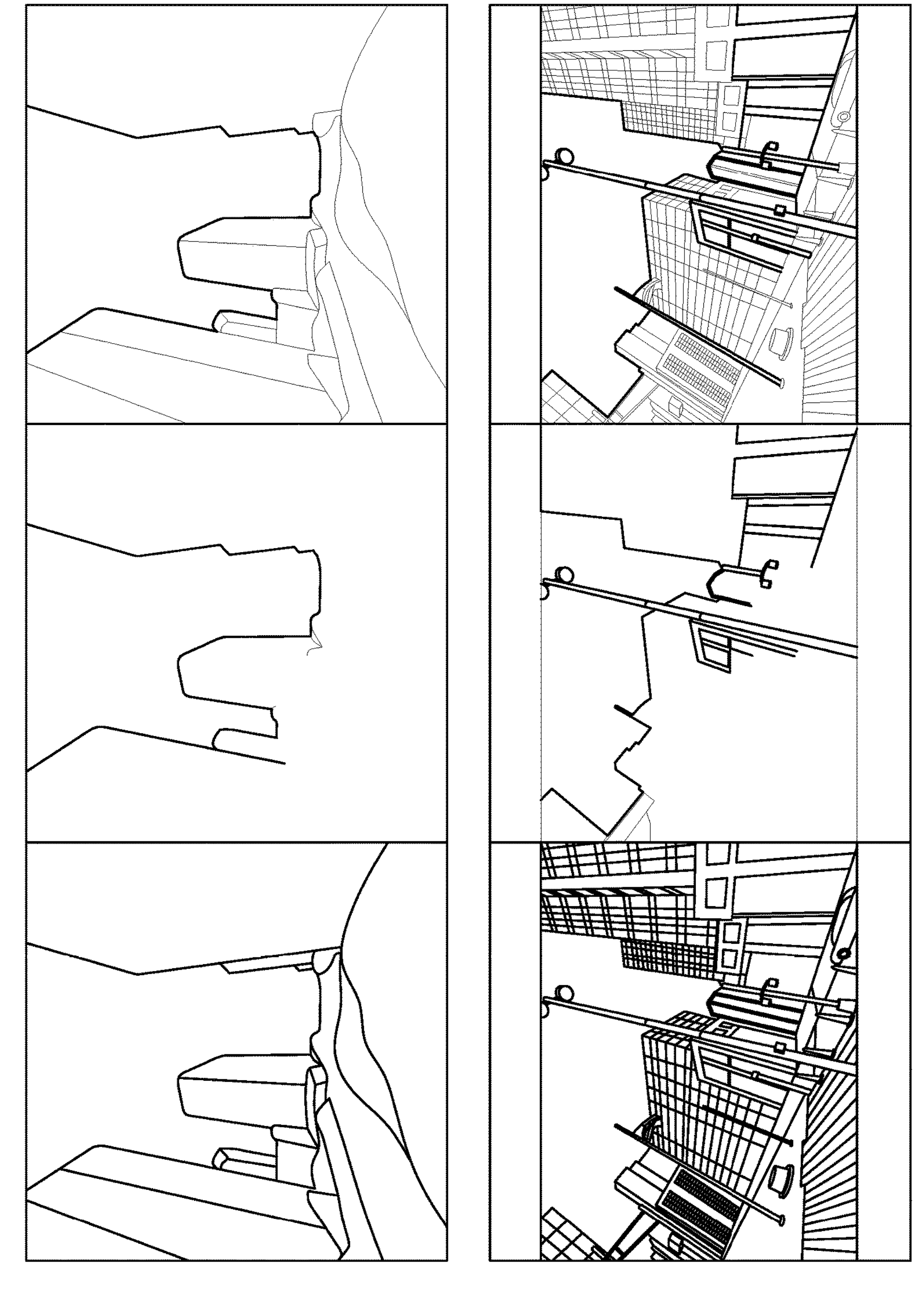
FIG. 10 illustrates exemplary evidence of semantic edges extraction, in accordance with one or more implementations.

Although not shown in FIG. 2C, prior to being consumed by model 224, data 211' and data 281' may be aligned (e.g., by any suitable alignment module) to remove any distortion. Such alignment may be utilized to remove any lens distortion and/or to project an image to a set of common camera parameters. Such alignment may make the pipeline invariant to the particularities of the camera(s) used (e.g., different image sizes, different focal distances, etc.). As shown by exemplary evidence 900 of FIG. 9, feature point matching may be made between various point features of two different sets of a map rendered image (e.g., of data 281') and a mobile subsystem image (e.g., of data 211'). As shown by exemplary evidence 1000 of FIG. 10, semantic edges extraction may be made from map rendered images (e.g., of data 281') and from mobile subsystem images (e.g., of data 211').

The use of georeference in training may enable the rendering of images of the map taken from the same position/orientation as camera image(s) (e.g., at sampler module 280').

It is understood that any number of features of a particular type of feature may be extracted from a mobile subsystem image (e.g., of data 211') and an associated similar map rendered image (e.g., of data 281') by model 224, where each one of such extracted features may result in a unique feature vector set 223*s* of an image feature vector 223*i* and a map feature vector 223*m* to be used for matching and optimizing for improving the training of a model 224. Different iterations of feature extractor model training system 1' may be utilized for training different models 224 for different types of feature (e.g., one for local/detailed point features (e.g., as may be similar to that of data 221*a*/291*a*) or different ones for different types of such local/detailed point features, one for local/detailed edge features (e.g., as may be similar to that of data 221*b*/291*b*) or different ones for different types of such local/detailed edge features, one for global point features (e.g., as may be similar to that of data 222*a*/292*a*) or different ones for different types of such local/detailed point features, one for global edge features (e.g., as may be similar to that of data 221*b*/292*b*) or different ones for different types of such local/detailed point features, and/or the like. For example, at least one iteration of feature extractor model training system 1' may be used for training a first type of model 224 that may be used for model 220 and model 290 of LPSMS 201. As another example, at least one iteration of feature extractor model training system 1' may be used for training a first type of model 224 that may be used for model 220*a* and model 290*a* of LPSMS 201, while at least another iteration of feature extractor model training system 1' may be used for training a second type of model 224 that may be used for model 220*b* and model 290*b* of LPSMS 201, while at least another iteration of feature extractor model training system 1' may be used for training a third type of model 224 that may be used for model 220*ca* and model 290*ca* of LPSMS 201, while at least another iteration of feature extractor model training system 1' may be used for training a fourth type of model 224 that may be used for model 220*cb* and model 290*cb* of LPSMS 201. Such training may involve comparing feature vector descriptors extracted from a map and corresponding feature vector descriptors extracted from an image. After extraction (e.g., via an extractor model 224 being trained), a matching module may be configured to determine correspondences between extracted image feature vector descriptors and map feature vector descriptors (e.g., which feature from map corresponds to which feature from image) by utilizing any suitable reprojection function that may be configured to take as one input position/orientation information with respect to the image sensor(s) that captured the image and as another input 3D information extracted from the map. The extractor model may be trained to output feature descriptors and not to perform any matching, so when the model is run it may provide feature vector descriptors that need to be matched. While training an extractor model, correct matches may be identified and provided so that the model can learn from correct associations (e.g., a matching module may use reprojection to identify correct matches because georeferenced pose information associated with the image may be available during training (e.g., information that may not be available during run time of an extractor model during use of the LPSMS by a navigation-denied mobile subsystem). Therefore, relative pose information between image and map may be used by a matching module to determine correspondence, and when a good correspondence between vectors is determined, then the matching module may be configured to compute error by comparing the vectors (e.g., error may be any suitable difference between the image and map vector descriptors) and that error may then be used to optimize the feature extractor model. Minimizing loss during training a model to extract similar features may result in the features extracted by the trained model being similar during operation of the model by an LPSMS for localizing a mobile subsystem.

Different types of training mobile subsystem 100' may be used by training system 1' (e.g., a drone, a land vehicle, a water vehicle, a wearable subsystem, and/or the like with any suitable type(s) and/or arrangement(s) of image sensor(s) and/or orientation sensor(s) and/or location sensor(s)), as such different types of mobile subsystem may also be used as a mobile subsystem 100 for utilizing LPSMS 201 for localizing subsystem 100 when navigation-denied. Similarly, different types of LPS database(s) may be used by both training system 1' and LPSMS 201 (e.g., maps generated by satellite, drone, land vehicle, water vehicle, wearable map subsystem, and/or the like). A single feature extraction model 224 may be trained by system 1' using various types of training mobile subsystems 100' and various types of LPS databases. Alternatively, a single feature extraction model 224 may be trained by system 1' using a particular type of training mobile subsystem 100' and a particular type of LPS database (e.g., a drone mobile subsystem and a map database generated by satellite map subsystem(s)). When different models 224 may be trained on data from respective different types of training mobile subsystems and different types of map data, all such models may be made available to LPSMS 201 and the mobile subsystem 100 may be configured to utilize a particular one or more of such models based on the type of that mobile subsystem 100 (e.g., an aerial drone mobile subsystem 100 may choose to utilize a feature extractor model of LPSMS 201 that was trained using data 211'/271'/265' from an aerial drone mobile subsystem 100' rather than a feature extractor model that was trained using such data from a land based vehicle, even though both types of models may be made available to that mobile subsystem 100). Alternatively, only certain models trained by certain data may be provided on an LPSMS 201 of a certain type of mobile subsystem 100. Additionally or alternatively, feature database 250 and/or feature database 260 provided to an LPSMS 201 of a particular type of mobile subsystem 100 may be populated based on LPS data from only a particular type or types of LPS database (e.g., a drone mobile subsystem may only be provided by an LPSMS 201 with feature databases populated using LPS data from LPS databases created by satellite map subsystems or aerial drone map subsystems and not by land based vehicle map subsystems), or a feature database of a particular type of mobile subsystem 100 may be populated based on all available LPS data from all available types of LPS database but the mobile subsystem 100 may be operative to filter the features of the database to be used for a localization process to the features populated using LPS data from LPS database(s) associated with the type of mobile subsystem 100 or its current use case (e.g., an aerial drone mobile subsystem 100 will filter the database to only provide features populated using LPS data from LPS databases created by satellite map subsystems or aerial drone map subsystems and not by land based vehicle map subsystems, even though all may be available to that mobile subsystem 100).

Once map feature databases 250 and 260 have been populated (e.g., by map feature extractor 290), localization determiner 207 may be ready for use by LPSMS 201 in conjunction with image feature extractor 220, first stage matching module 230, and second stage matching module 240 in order to localize mobile subsystem 100. First stage matching module 230 may be any suitable module that may be configured to perform any suitable matching between any suitable image global feature(s) of image global feature data 222 extracted by module 220 from image data 211 captured by mobile subsystem 100 and any suitable map global feature(s) of map global feature data 251 obtained from map global feature database 250. First stage matching module 230 may be configured to carry out any suitable matching between the image global feature(s) and the map global feature(s), including, but not limited to, coarse matching, similarity search (e.g., using FAISS), fast approximate nearest neighbor matching, and/or the like. The matching may determine a similarity metric between the image and map global feature(s) of any suitable type (e.g., cosine similarity, chamfer distance similarity, or any other distance metric that can be applied to the global feature encoding). Any suitable number of map global feature(s) determined to result in a similarity metric meeting at least a particular threshold similarity metric or the best 10 or any other suitable number of map global feature(s) that result in the best similarity metrics may be selected to be utilized for defining candidate region data 231. Such candidate region data 231 may be indicative of the georeferenced region that may contain the georeferenced location associated with each of the selected map global feature(s). For example, for each image global feature being matched, candidate region data 231 may be generated that may be delimited in any suitable manner (e.g., as location x_min, location x_max, location y_min, location y_max, location z_min, and location z_max) for defining a localization region (e.g., GPS region) that may be analyzed for refinement using second stage matching module 240. A candidate region may be generated for a combined set of image global features. The size of the region may vary according to the confidence of matching and/or uniqueness of the scene. Uniqueness may be given by how similar a given region is to the features in the database. If a global feature is determined to be similar to a lot of different regions, then it may have low uniqueness. For example, if a mobile subsystem is located in the middle of the woods or in the middle of the ocean, the captured scene will most likely not be very unique as compared to the uniqueness of a scene that may be captured by a mobile subsystem located in front of the Statue of Liberty (e.g., as there may not be a large number of regions represented in the map database(s) that are similar to the surroundings of the Statue of Liberty). Inertial data 271 may be utilized in any suitable manner by this first stage matching such that the rendered map data from which the map global feature(s) of map global feature data 251 obtained from map global feature database 250 may be extracted is associated with a similar orientation to the image data from which the image global feature(s) of image global feature data 222 was extracted (e.g., to enable more effective and efficient first matching (e.g., on only a data subset 251 of data 292 of database 250)).

Second stage matching module 240 may be any suitable module that may be configured to perform any suitable matching (e.g., pose refinement) between any suitable image detailed feature(s) of image detailed feature data 221 extracted by module 220 from image data 211 captured by mobile subsystem 100 and any suitable map detailed feature(s) of map detailed feature data 261 obtained from map local feature database 260. Second stage matching module 240 may be configured to carry out any suitable matching between the image detailed feature(s) and the map detailed feature(s), including, but not limited to, coarse matching, similarity search (e.g., using FAISS), fast approximate nearest neighbor matching, and/or the like. The matching may determine a similarity metric between the image and map detailed feature(s) of any suitable type (e.g., cosine similarity, chamfer distance similarity, or any other distance metric that can be applied to the global feature encoding). Any suitable number of map detailed feature(s) determined to result in a similarity metric meeting at least a particular threshold similarity metric or the best 1 or any other suitable number of map detailed feature(s) that result in the best similarity metrics may be selected to be utilized for defining estimated pose data 241 (e.g., the best match). Inertial data 271 may be utilized in any suitable manner by this second stage matching such that the rendered map data from which the map detailed feature(s) of map detailed feature data 261 obtained from map local feature database 260 may be extracted is associated with a similar orientation to the image data from which the image detailed feature(s) of image detailed feature data 221 was extracted (e.g., to enable more effective and efficient second stage matching (e.g., on only a data subset 261 of data 291 of database 260)). Moreover, additionally or alternatively, candidate region data 231 from first stage matching module 230 may be utilized in any suitable manner by this second stage matching such that the georeferenced rendered map data from which the map detailed feature(s) of map detailed feature data 261 obtained from map local feature database 260 may be extracted is associated with a location within the localization region (e.g., GPS region) defined by candidate region data 231 (e.g., to enable more effective and efficient second stage matching (e.g., on only a data subset 261 of data 291 of database 260)).

Second stage matching (e.g., as may also be referred to as pose refinement) of second stage matching module 240 may take as input the detailed image features of data 221, candidate regions of data 231, and access a subset of map detailed features of data 261 that may be sampled at a higher spatial resolution from a local database of features 260 than that of the first stage matching of first stage matching module 230. These features of data 261 may (e.g., already) be determined to have the same or similar orientation as the orientation identified by inertial data 271. For computing the matching, a correlation score function between the image detailed feature(s) of data 221 and the map detailed feature(s) of data 261 may be applied, where the correlation function may be configured to vary according to the type of feature used. Once the matching is done, an optimization procedure may be used by second stage matching module to find the relative pose transformation from the best match feature in the local database with the query image extracted feature of data 221. The relative pose may be composed with the absolute feature pose to return the estimated camera pose in a georeferenced frame and provided as pose data 241 by second stage matching module 240. The candidate region(s) of data 231 may be the region(s) where to perform the search for such features of data 261. In some embodiments, for matching image point features 221*a*, second stage matching of second stage matching module 240 may be carried out by minimizing the reprojection error between the corresponding 2D point coordinates and the 3D corresponding coordinates of the map data extracted by map feature extractor 290. In some embodiments, for matching image semantic edges features 221*b*, second stage matching of second stage matching module 240 may be carried out by minimizing the direct distance between the contours in the image with the objective of finding the rigid body transformation that may best align the semantic edges extracted from image data 211 and the semantic edges of the map data extracted by map feature extractor 290. In some embodiments, pose data 241 that may be provided as output of second stage matching module 240 may be indicative of the estimated pose(s) of the image sensor(s) 210 of mobile subsystem 100 with respect to the georeferenced frame (e.g., world frame), where this may be enabled by a transformation between image sensor frame to world frame (e.g., by solving a Perspective-n-Point ("PnP") problem). Transformation between image sensor and pose may be a 4×4 matrix or any other suitable matrix that may take from image sensor (e.g., camera) coordinate frame to world coordinate frame. The world coordinate frame may, for example, be represented by UTM coordinates, where units may be meters.

In some embodiments, second stage matching of second stage matching module 240 may be enabled by Monte Carlo-based sampling, whereby using an initial 6 DoF pose on the NED reference frame, random 6 DoF poses (e.g., particles) may be sampled from a gaussian distribution centered on the initial pose, and the sampled poses may be propagated using the 6 DoF pose estimated by an odometry system, such as a VIO system. Such a manner of performing the detailed matching of second stage matching module may maintain multiple state estimations. A particle may receive a weight based on a likelihood function (e.g., a predefined function) that may be operative to measure how probable or likely each sample is to be correct given an observation. Such a likelihood function may be computed using a correlation score between features of data 221 and of data 261. This may enable correlation of the skyline of an observed image with the skyline of a map. After the weight may be defined, an importance based sampling algorithm may be used to sample particles that may represent more likely trajectories that may be given by higher likelihood scores.

In some embodiments, second stage matching of second stage matching module 240 may be enhanced by any suitable non-linear fusion that may be configured to receive any suitable odometry measures from VIO or otherwise and a latitude and longitude coordinate as may be defined by pose data 241 from second stage matching module 240 (e.g., as may be converted from UTM to latitude, longitude). This may create a global coordinate frame and may transform the latitude and longitude coordinate to a translation vector on the global coordinate frame. Once it receives a latitude and longitude coordinate, a non-linear function may be optimized to reduce the error between the 6 DoF pose on the local coordinate frame and the 6 DoF pose on the global coordinate. Therefore, this non-linear fusion may be operative to receive pose data 241 from second stage matching module 240 and combine such a pose with any suitable visual inertial slam measurement and/or ARHS measurement to produce a refined pose.

Figure 2D:
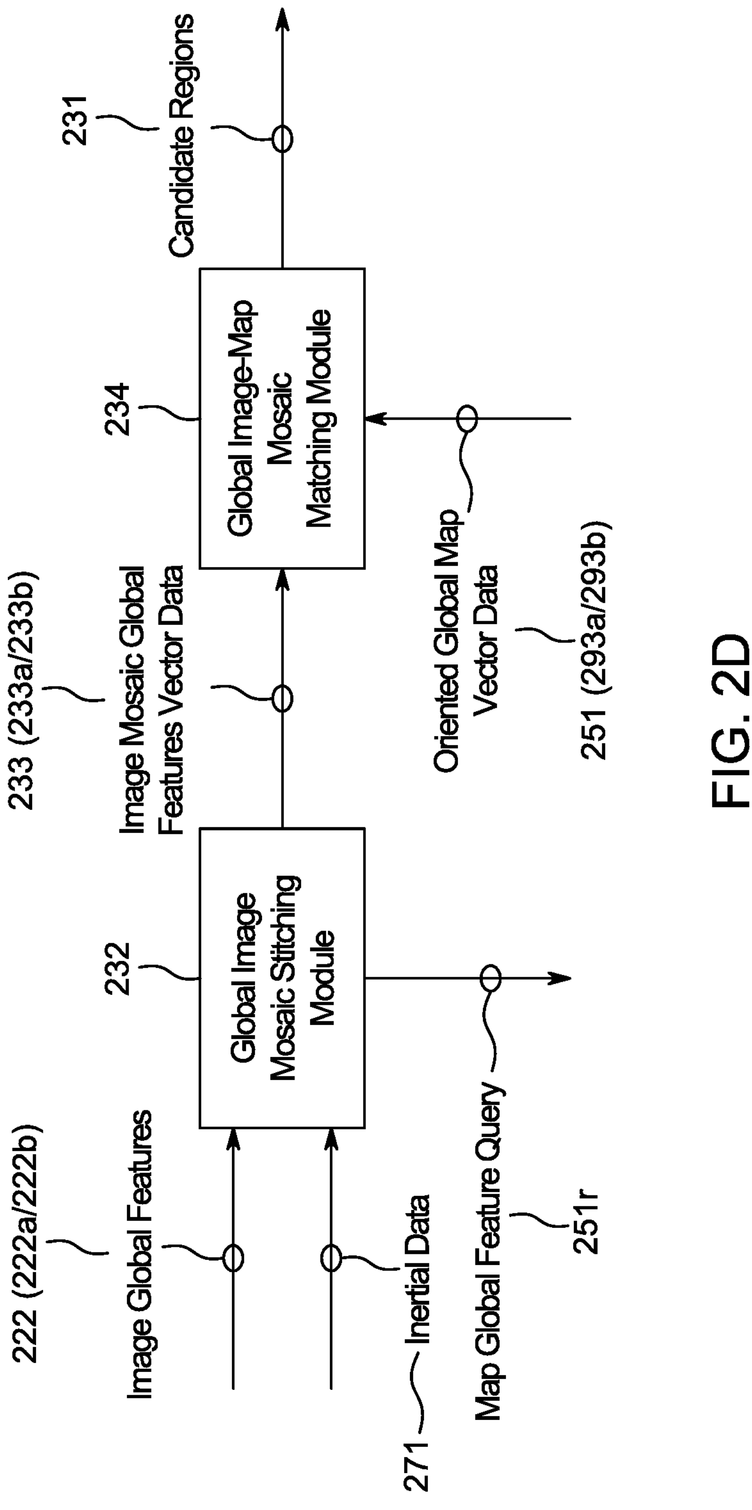
FIG. 2D is a schematic view of a portion of the system of FIG. 1, in accordance with one or more implementations.

Inertial data 271 of mobile subsystem 100 at the moment of capture of image data 211 may be utilized in any suitable manner by LPSMS 201 for enabling effective and efficient matching of global image features extracted from such image data with global map features of database 250 (e.g., such that the rendered map data from which the map feature(s) of map feature data 251 obtained from map feature database 250 may be extracted can be associated with a similar orientation to the image data from which the image feature(s) of image feature data 222 was extracted (e.g., to enable more effective and efficient first stage matching (e.g., on only a data subset 251 of data 292 of database 250))). In some embodiments, as shown in FIG. 2D, the first stage matching of first stage matching module 230 may include a global image mosaic stitching module 232 and a global image-map mosaic matching module 234. Global image mosaic stitching module 232 may be any suitable module that may be configured to receive as input any suitable image global features of image global feature data 222 (e.g., one or more global image point features of data 222*a* and/or one or more global image edges features of data 222*b*) as extracted from image(s) of image data 211 and any suitable inertial data 271 associated with the capture of such image(s). In response to receiving such inputs, global image mosaic stitching module 232 may be configured to run any suitable algorithm(s) for stitching together all images captured at substantially the same moment (e.g., four images captured at the same moment from an array of four particularly oriented image sensors, respectively, of a mobile subsystem) into a mosaic with any suitable orientation that may be defined in any suitable (e.g., arbitrary) reference frame (e.g., NED). While an actual mosaic (e.g., for presentation) may be generated using actual image data 211, module 232 may only use extracted feature vector data 222 and inertial data 271 to generate its output 251*r* and/or output 233.

For example, module 232 may utilize any suitable panorama projective model to generate a stitched mosaic image that may be referenced according to a georeferenced frame, where such a georeferenced mosaic may be defined by any suitable global image mosaic vector data 233 that may be output by module 232 and provided to mosaic matching module 234. For example, module 232 may receive and process one or more camera images and associated orientation data output by an AHRS to generate a panorama image (e.g., stitched image or image mosaic or stitched mosaic) that may be oriented with the NED reference frame. This may combine spatially all suitable features. In some embodiments, module 232 may combine the image global feature vectors of each image of the mosaic into one or more mosaic global feature vectors of the mosaic that may conserve the absolute orientation with respect to the reference frame (e.g., NED frame). For example, if there are four images being stitched for the mosaic, and each image has its own global image point features vector of data 222*a* and its own global image edges features vector of data 222*b*, then module 232 may generate image mosaic global features vector data 233 that may include a global image mosaic point features vector 233*a* (e.g., a combination of the global image point features vectors of the four images) and a global image mosaic edges features vector 233*b* (e.g., a combination of the global image edges features vectors of the four images), each of which may conserve the absolute orientation with respect to the reference frame. Therefore, while, in some embodiments, matching module 230 may process a set (e.g., a pair) of vectors per image (e.g., each with its own orientation), in other embodiments, matching module 230 (e.g., module 234) may process a set (e.g., a pair) of vectors per mosaic (e.g., with a single orientation). In some embodiments, module 232 may be configured to determine a confidence on how to combine images into a mosaic (e.g., based on processed confidence in/accuracy of any suitable heading estimation data), such that module 232 may determine a range of N possible mosaic orientation estimations, whereby module 232 may generate N sets of vector data 233, one for each possible orientation.

In addition to generating any suitable image mosaic global features vector data 233, global image mosaic stitching module 232 may also generate any suitable map global feature query 251*r* for requesting oriented global map mosaic vector data with localization 251 from map global feature database 250. Query 251*r* may include data indicative of the absolute orientation(s) with respect to the reference frame that has been determined for the mosaic(s) generated by module 232. Such mosaic orientation data of query 251*r* may enable module 230 to provide orientation information that may be used to reduce the search space so that for each query only features with similar orientation may be retrieved as data 251 from database 250 for the matching to be carried out by module 230. Database 250 may be configured to receive and process such a query 251*r* for identifying the map global vector data associated with the orientation(s) of the query such that only that identified map global vector data and not all map global vector data of database 250 may be returned to module 230 (e.g., to module 234) as oriented global map vector data 251. In some embodiments, like module 232 with respect to images and image global features, database 250 may be configured to generate its own map mosaic global features vector data for use as data 251 (e.g., a global map mosaic point features vector 293*a* (e.g., a combination of any global map point features vectors of map renders of a map mosaic) and/or a global map mosaic edges features vector 293*b* (e.g., a combination of any global map edges features vectors of map renders of a map mosaic), each of which may conserve the absolute orientation with respect to any suitable reference frame of a generated map mosaic). For example, database 250 may be configured to be able to generate a map mosaic in any/all orientations and then return one or more based on orientation that may be identified by query 251*r*.

Image-map matching module 234 may be configured to perform any suitable matching between any suitable image global feature(s) of image global feature data 222 extracted by module 220 from image data 211 captured by mobile subsystem 100 (e.g., image mosaic global features of vector data 233 (e.g., global image mosaic point features vector

233*a* and/or global image mosaic edges features vector 233*b*)) with any suitable map global feature(s) of map global feature data 251 obtained from map global feature database 250 (e.g., map mosaic global features of vector data 251 (e.g., global map mosaic point features vector 293*a* and/or global map mosaic edges features vector 293*b*)) for defining any suitable candidate region data 231. In some embodiments, module 234 may include a first matching module for a first subprocess for matching point feature vectors (e.g., vectors 233*a* and 293*a*) and a second matching module for a second subprocess for matching edges feature vectors (e.g., vectors 233*b* and 293*b*) or both matchings may be done by a single process or only points matching may be carried out or only edges matching may be carried out depending on the situation. If different possible mosaics were estimated, module 234 may go through matching the different estimated image mosaics with the map mosaics of similar orientation (e.g., starting with the mosaic of most confidence (e.g., in heading estimation)). Matching may attempt to match image features with map features of a first resolution (e.g., features extracted from a map of a first (e.g., higher) resolution) before attempting to match image features with map features of a second resolution (e.g., features extracted from a map of a second (e.g., lower) resolution), whereby the second attempt may only be conducted if the first attempt does not reveal matches meeting a certain requirement (e.g., N matches with a similarity metric above a particular threshold). In some embodiments, query 251*r* may be configured to identify a particular portion of database 250 to pull data 251 from based on any suitable factors in addition to or as an alternative to orientation. For example, based on any suitable characteristic(s) of the LPSMS (e.g., based on the type of mobile subsystem being localized), query 251*r* may identify (e.g., heuristically) whether global map mosaic point features and/or global map mosaic edge features should be returned by data 251 (e.g., if mobile subsystem 100 is a ground vehicle (e.g., a car or user wearable that travels on the earth), then matching extracted edges vectors may be more useful for localization than matching extracted points vectors; if mobile subsystem 100 is an aerial vehicle (e.g., a drone that flies above the earth), then matching extracted point vectors may be more useful for localization than matching extracted edges vectors; etc.). However, if both points and edges may be useful, the matching may identify the best set of matches that are the closest. Additionally or alternatively, based on any suitable characteristic(s) of the LPSMS (e.g., based on the type of mobile subsystem being localized), query 251*r* may identify (e.g., heuristically) which type of map database sourced map features ought to be returned by data 251 (e.g., if mobile subsystem 100 is a ground vehicle, then matching map vectors extracted from map data of a street view map database (e.g., georeferenced imagery database) 208*a* may be more useful for localization than matching map vectors extracted from map data of a Vermeer or Vricon 3D database 204*a*/206*a*; if mobile subsystem 100 is an aerial vehicle, then matching map vectors extracted from map data of a Vermeer or Vricon 3D database 204*a*/206*a* may be more useful for localization than matching map vectors extracted from map data of a street view map database (e.g., georeferenced imagery database) 208*a*; etc.). In some embodiments, multiple types of map data may be returned but one type may be prioritized for matching over another at module 230 based on preference given the localization situation. Database 250 may be cumulative of all types of features extracted from all types of maps but such feature data may be filtered in any suitable manner(s) based on query 251*r* before returning any suitable data 251 for the first stage matching.

Figure 2E:
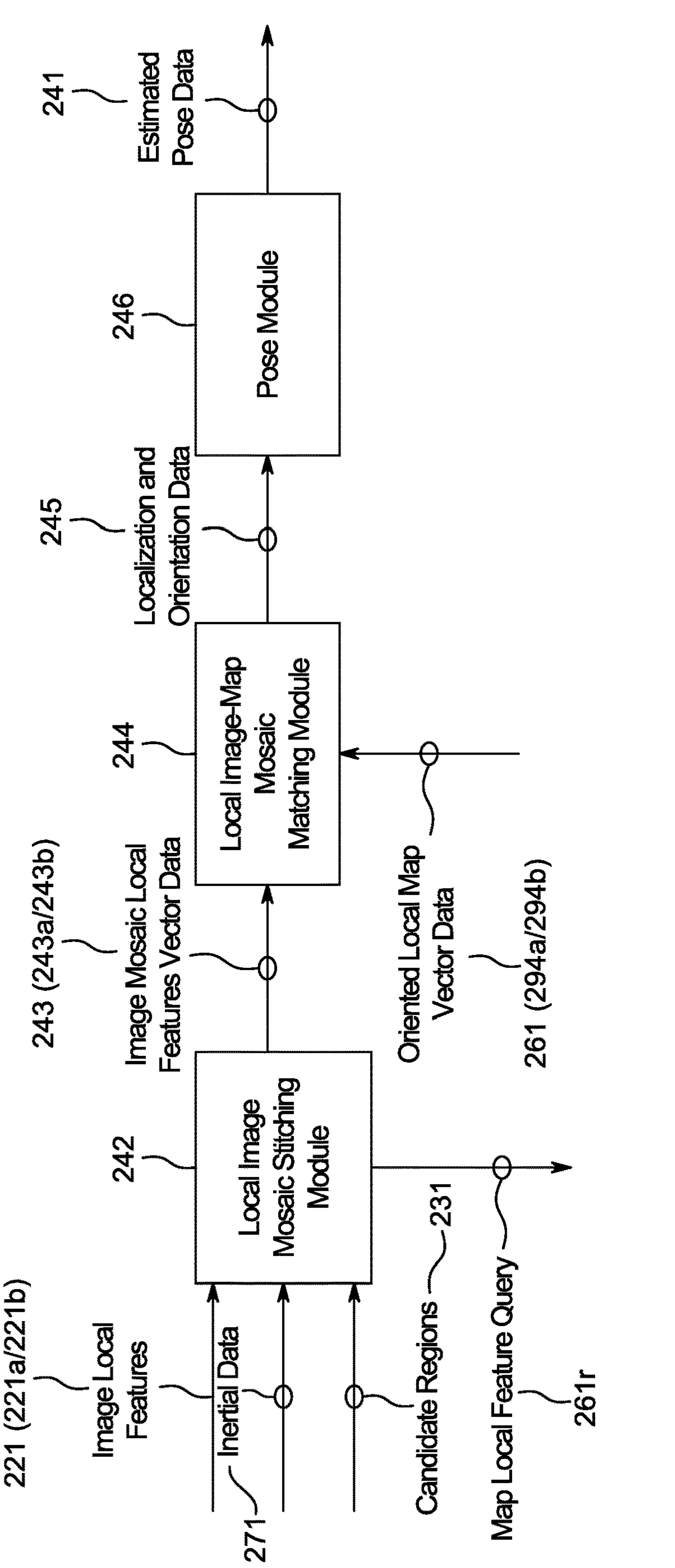
FIG. 2E is a schematic view of a portion of the system of FIG. 1, in accordance with one or more implementations.

Inertial data 271 of mobile subsystem 100 at the moment of capture of image data 211 may additionally or alternatively be utilized in any suitable manner by LPSMS 201 for enabling effective and efficient matching of local image features extracted from image data with local map features of database 260 (e.g., such that the rendered map data from which the map feature(s) of map feature data 261 obtained from map feature database 260 may be extracted can be associated with a similar orientation to the image data from which the image feature(s) of image feature data 221 was extracted (e.g., to enable more effective and efficient second stage matching (e.g., on only a data subset 261 of data 291 of database 260))). In some embodiments, as shown in FIG. 2E, the second stage matching of second stage matching module 240 may include a local image mosaic stitching module 242 and a second image-map mosaic matching module 244 and a localization module 246. Local image mosaic stitching module 242 may be any suitable module that may be configured to receive as input any suitable image local features of image local feature data 221 (e.g., one or more local image point features of data 221*a* and/or one or more local image edges features of data 221*b*) as extracted from image(s) of image data 211 and any suitable inertial data 271 associated with the capture of such image(s). In response to receiving such inputs, local image mosaic stitching module 242 may be configured to run any suitable algorithm(s) for stitching together all images captured at substantially the same moment (e.g., four images captured at the same moment from an array of four particularly oriented image sensors, respectively, of a mobile subsystem) into a mosaic with any suitable orientation that may be defined in any suitable (e.g., arbitrary) reference frame (e.g., NED). While an actual mosaic (e.g., for presentation) may be generated using actual image data 211, module 242 may only use extracted feature vector data 221 and inertial data 271 and/or candidate region data 231 to generate its output 261*r* and/or output 243.

For example, module 242 may utilize any suitable panorama projective model to generate a stitched mosaic image that may be referenced according to a georeferenced frame, where such a georeferenced mosaic may be defined by any suitable local image mosaic vector data 243 that may be output by module 242 and provided to local mosaic matching module 244. For example, module 242 may receive and process one or more camera images and associated orientation data output by an AHRS to generate a panorama image (e.g., stitched image or image mosaic or stitched mosaic) that may be oriented with the NED reference frame. This may combine spatially all suitable features. In some embodiments, module 242 may combine the image local feature vectors of each image of the mosaic into one or more mosaic local feature vectors of the mosaic that may conserve the absolute orientation with respect to the reference frame (e.g., NED frame). For example, if there are four images being stitched for the mosaic, and each image has its own local image point features vector(s) of data 221*a* and its own local image edges features vector(s) of data 221*b*, then module 242 may generate image mosaic local features vector data 243 that may include one or more local image mosaic point features vectors 243*a* (e.g., a combination of the local image point features vectors of the four images or multiple combinations of different local image point features vectors of the four images) and a local image mosaic edges features vector 243*b* (e.g., a combination of the local image edges features vectors of the four images or multiple combinations of different local image edges features vectors of the four images), each of which may conserve the absolute orientation with respect to the reference frame. Therefore, while, in some embodiments, matching module 240 may process a set of vectors per image (e.g., each with its own orientation), in other embodiments, matching module 240 (e.g., module 244) may process a set of vectors per mosaic (e.g., with a single orientation). In some embodiments, module 242 may be configured to determine a confidence on how to combine images into a mosaic (e.g., based on processed confidence in/accuracy of any suitable heading estimation data), such that module 242 may determine a range of N possible mosaic orientation estimations, whereby module 242 may generate N sets of vector data 243, one for each possible orientation.

In addition to generating any suitable image mosaic local features vector data 243, local image mosaic stitching module 242 may also generate any suitable map local feature query 261*r* for requesting oriented local map mosaic vector data with localization 261 from map local feature database 260. Query 261*r* may include data indicative of the absolute orientation(s) with respect to the reference frame that has been determined for the mosaic(s) generated by module 242. Such mosaic orientation data of query 261*r* may enable module 240 to provide orientation information that may be used to reduce the search space so that for each query only features with similar orientation may be retrieved as data 261 from database 260 for the matching to be carried out by module 240. Database 260 may be configured to receive and process such a query 261*r* for identifying the map local vector data associated with the orientation(s) of the query such that only that identified map local vector data and not all map local vector data of database 260 may be returned to module 240 (e.g., to module 244) as oriented local map vector data 261. In some embodiments, like module 242 with respect to images and image local features, database 260 may be configured to generate its own map mosaic local features vector data for use as data 261 (e.g., a local map mosaic point features vector 294*a* (e.g., a combination of any local map point features vectors of map renders of a map mosaic) and a local map mosaic edges features vector 294*b* (e.g., a combination of any local map edges features vectors of map renders of a map mosaic), each of which may conserve the absolute orientation with respect to any suitable reference frame of a generated map mosaic). For example, database 260 may be configured to be able to generate a map mosaic in any/all orientations and then return one or more based on orientation that may be identified by query 261*r*.

Image-map matching module 244 may be configured to perform any suitable matching between any suitable image local feature(s) of image local feature data 221 extracted by module 220 from image data 211 captured by mobile subsystem 100 (e.g., image mosaic local features of vector data 243 (e.g., local image mosaic point features vector 243*a* and/or local image mosaic edges features vector 243*b*)) with any suitable map local feature(s) of map local feature data 261 obtained from map local feature database 260 (e.g., map mosaic local features of vector data 261 (e.g., local map mosaic point features vector(s) 294*a* and/or local map mosaic edges features vector(s) 294*b*)) for defining any localization data 245. In some embodiments, module 244 may include a first matching module for a first subprocess for matching point feature vectors (e.g., vectors 243*a* and 294*a*) and a second matching module for a second subprocess for matching edges feature vectors (e.g., vectors 243*b* and 294*b*) or both matchings may be done by a single process or only points matching may be carried out or only edges matching may be carried out depending on the situation. If different possible mosaics were estimated, module 244 may go through matching the different estimated image mosaics with the map mosaics of similar orientation (e.g., starting with the mosaic of most confidence (e.g., in heading estimation)). Matching may attempt to match image features with map features of a first resolution (e.g., features extracted from a map of a first (e.g., higher) resolution) before attempting to match image features with map features of a second resolution (e.g., features extracted from a map of a second (e.g., lower) resolution), whereby the second attempt may only be conducted if the first attempt does not reveal matches meeting a certain requirement (e.g., N matches with a similarity metric above a particular threshold). In some embodiments, query 261*r* may be configured to identify a particular portion of database 260 to pull data 261 from based on any suitable factors in addition to or as an alternative to orientation. For example, based on any suitable characteristic(s) of the LPSMS (e.g., based on the type of mobile subsystem being localized), query 261*r* may identify (e.g., heuristically) whether local map mosaic point features and/or local map mosaic edge features should be returned by data 261 (e.g., if mobile subsystem 100 is a ground vehicle, then matching extracted edges vectors may be more useful for localization than matching extracted points vectors; if mobile subsystem 100 is an aerial vehicle, then matching extracted point vectors may be more useful for localization than matching extracted edges vectors; etc.). However, if both points and edges may be useful, the matching may identify the best set of matches that are the closest. Additionally or alternatively, based on any suitable characteristic(s) of the LPSMS (e.g., based on the type of mobile subsystem being localized), query 261*r* may identify (e.g., heuristically) which type of map database sourced map features ought to be returned by data 261 (e.g., if mobile subsystem 100 is a ground vehicle, then matching map vectors extracted from map data of a street view map database (e.g., georeferenced imagery database) 208*a* may be more useful for localization than matching map vectors extracted from map data of a Vermeer or Vricon 3D database 204*a*/206*a*; if mobile subsystem 100 is an aerial vehicle, then matching map vectors extracted from map data of a Vermeer or Vricon 3D database 204*a*/206*a* may be more useful for localization than matching map vectors extracted from map data of a street view map database (e.g., georeferenced imagery database) 208*a*; etc.). In some embodiments, multiple types of map data may be returned but one type may be prioritized for matching over another at module 240 based on preference given the localization situation. Database 260 may be cumulative of all types of features extracted from all types of maps but such feature data may be filtered in any suitable manner(s) based on query 261*r* before returning any suitable data 261 for the first stage matching.

Query 261*r* may also include information indicative of candidate region data 231, as may be received from module 230 at module 240 (e.g., at module 242). For example, at a query time for a map local feature query 261*r* from module 242, query 261*r* may be configured to include any suitable data indicative of the candidate region(s) of data 231 associated with the image(s)/mosaic of the query. Such candidate region data 231 may be determined by first matching module 230 and may be used to by query 261*r* to reduce the search space so that for each query only map features associated with a georeferenced location that is within the localization region(s) identified by candidate region data 231 may be retrieved as data 261. As an example, candidate region data 231 may be used as an input to database 260 to reduce map local features 291 to quantized map local feature data 261 based on location(s) of data 231 for use by second matching module 240 (e.g., module 244). The number of local/detailed map feature(s) (e.g., vectors) of database 260 (e.g., per rendered map image and/or per map mosaic) may be significantly greater than the number of global map feature(s) (e.g., vectors) of database 250 (e.g., per rendered map image and/or per map mosaic), for example, due to multiple detailed map point feature vectors possibly being provided in database 260 while a combined single global map point feature vector may be provided in database 250 for the same map image/map mosaic. Therefore, this filtering of global map features based on candidate localization region data 231 from the first stage matching prior to carrying out the second stage matching may drastically reduce the processing time and/or power required by LPSMS 201 to facilitate localization of mobile subsystem 100, thereby providing for an efficient and effective localization process that may be automatic and continuous and substantially real-time.

A best match may be determined by module 244 between the image local feature(s) of data 243 (e.g., as may be provided by module 242 and/or extractor model 220) and the map local feature(s) of data 261 (e.g., as may be provided by database 260 in response to any suitable filter(s) that may be defined by query 261*r* (e.g., orientation filter(s), candidate localization region filter(s), map database type filter(s), map feature type filter(s), and/or the like)). The georeferenced location(s) (e.g., GPS coordinates) of the map data associated with the map local feature(s) that best matched with the image local feature(s) at module 244 may be determined by module 244 and included as a localization portion of localization and orientation data 245 that may be output by module 244 and received by pose module 246. Additionally, the full pose orientation of the map data associated with the map local feature(s) that best matched with the image local feature(s) at module 244 may be determined by module 244 and included as an orientation portion of localization and orientation data 245 that may be output by module 244 and received by pose module 246. Pose module 246 may be any suitable module that may be configured to process data 245 in order to determine or estimate the position and orientation of mobile subsystem 100 that may be identified by any suitable estimated pose data 241 to be output by module 246 (e.g., by module 240). This localization of mobile subsystem 100 may include the localization portion of data 245 and estimated orientation pose(s) of image sensor(s) 210 of mobile subsystem 100 with respect to the georeferenced frame (e.g., world frame), where this may be enabled by module 246 carrying out any suitable transformation between image sensor frame and world frame (e.g., by solving a Perspective-n-Point ("PnP") problem). In some embodiments, inertial data 271 may also be received and processed by module 246 (e.g., in order to run a PnP transform for determining orientation pose). Therefore, localization of a mobile subsystem 100 by LPSMS 201 may be totally passive, may not be spoofed, may not be jammed, and may not use any network connection, but rather may use pre-stored on-board data (e.g., database(s) 250 and 260) and data generated on-board the mobile subsystem when it is to be localized (e.g., image sensor data and inertial data). This may be an effective and efficient and secure alternative to GPS.

The concepts described herein with respect to an LPSMS for localizing and/or estimating a pose of a mobile subsystem can be used in any suitable applications. An exemplary application may be referred to herein as street view VPS, where the system may locate an image captured from one or more calibrated cameras using street-view-like georeferenced map imagery (e.g., from map database 208) and 3D map data (e.g., from map database 204 and/or from map database 206) as reference (e.g., based on map availability and/or resolution and/or otherwise (e.g., georeferenced map imagery may be preferred over map data if available in some embodiments)). A pipeline for street view VPS may include at least the following two operations: (1) create/pre-process map feature databases (e.g., databases 250 and 260), where the features stored may be used to localize a query (in street view VPS, where georeferenced map imagery may be available (e.g., data 208*a* of database 208), the most useful map features to be extracted for use in defining the map feature databases may be point features (e.g., more so than edge features), but edge features may additionally or alternatively be used); and (2) query image localization and camera pose estimation (e.g., data 241 determination).

Figure 3:
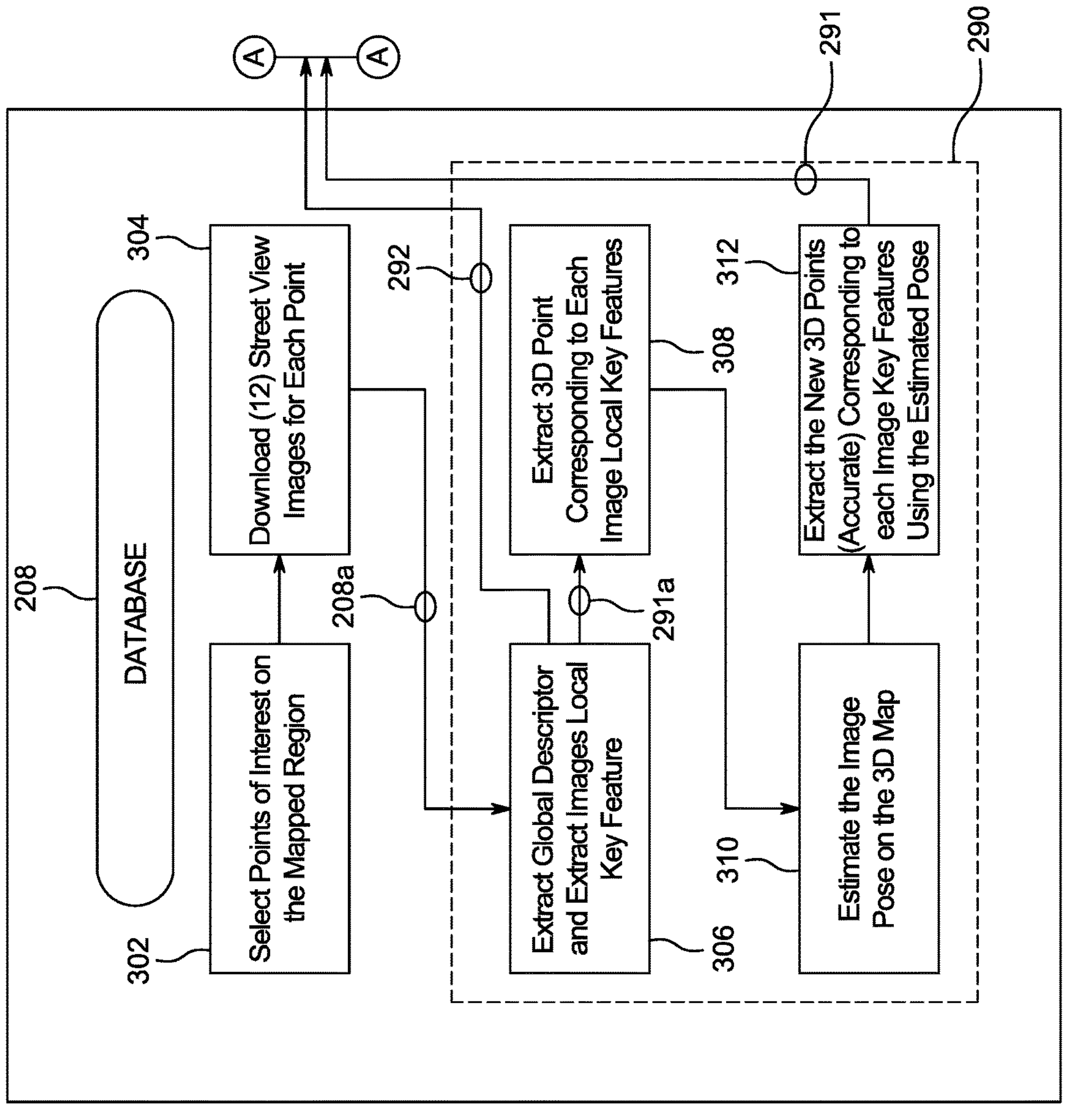
FIGS. 3-7 are exemplary illustrations of various systems/processes for providing localization processing services of the disclosure, in accordance with one or more implementations.
Figure 3:
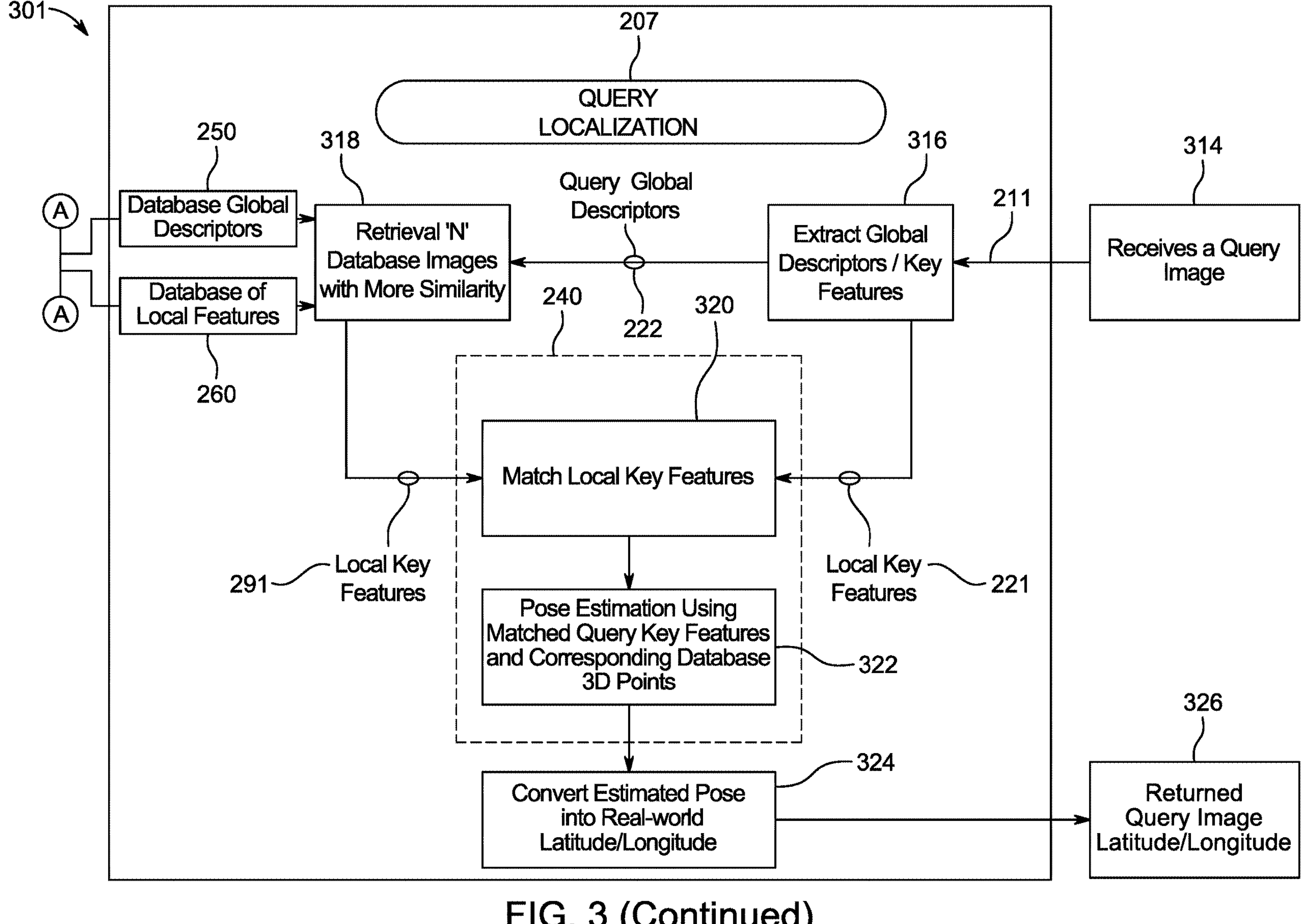

Map databases 202 may include a 3D map (e.g., database 204 and/or database 206) and georeferenced image map data (e.g., database 208) of the environment in which a mobile subsystem may be localized. To create extracted map features from georeferenced image map data (e.g., database 208), points of interest (e.g., latitude and longitude coordinates) of a mapped region may be selected (e.g., at operation 302 of system process 301 of FIG. 3) and any suitable number (e.g., 12) of images for each coordinate may be acquired (e.g., at operation 304) to get a 360 degree view of each point (e.g., to generate data 208*a* of georeferenced image map database 208 (e.g., a Google Street View Database) or any other suitable georeferenced imagery database that may be accessed by extractor model 290). Global descriptor(s) and local key point feature(s) may be extracted from such data (e.g., at operation 306) using feature extraction deep learning model(s) that may be used to provide extracted global map image features as data 292 to a database of global descriptors (e.g., database 250) and to provide data 291*a* for extracting their corresponding 3D point(s) on the map (e.g., map database 204 and/or 206) corresponding to each image local key feature (e.g., at operation 308). After such extraction, an image pose may be estimated on the 3D map (e.g., at operation 310) and new 3D points (accurate) corresponding to each image key feature(s) may be extracted using the estimated pose (e.g., at operation 312) using feature extraction deep learning model(s) that may be used to provide data 291 to a database of local descriptors (e.g., database 260) (e.g., extractor model 290 may also perform alignment refinement between georeferenced imagery 208*a* and the reference map, and the extracted points in world coordinates and the georeferenced pose related to the georeferenced images may be saved in the local database).

Query image localization and camera pose estimation of determiner 207 may then occur for this VPS application once the pre-processed feature databases are ready (e.g., databases 250 and 260). A query image (e.g., of data 211) may be received by the determiner (e.g., at operation 314) and global image descriptors as data 222 and local key image features as data 221 may be extracted therefrom (e.g., at operation 316). Any suitable number N database images may be retrieved with more similarity to global image descriptors (e.g., using first stage matching) and then associated local image descriptors may be provided (e.g., as data 291) from the map feature database(s) to a second stage matcher (e.g., module 240). Local key features may be matched (e.g., at operation 320) and then pose estimation may be carried out using matched query key features and corresponding database 3D points (e.g., at operation 322), and then the estimated pose may be converted into real world latitude/longitude (e.g., at operation 324) such that a query image latitude/longitude may be returned (e.g., at operation 326). For example, the localization may be done first by matching the query global features (e.g., data 222) with the map global features (e.g., data 292) using the first stage matching module 230, resulting in candidate regions that may be used to filter or limit map detailed features. Then, the second stage matching module 240 may be used to match the detailed image features (e.g., data 221) with the filtered map detailed features in order to determine point feature correspondences (e.g., given that in this application only point features may be needed). The corresponding matched points may then be refined by the optimization procedure(s) of module 240 and the output may be the query camera pose.

Another exemplary application may be referred to herein as helmet VPS, where the system may locate an image captured from one or more calibrated cameras (e.g., as may be worn on a user (e.g., on a user's head supported by helmet, etc.) or in any suitable manner with or without attachment to a user) using dense 3D map data (e.g., map database 204 and/or map database 206) as reference. A pipeline for helmet VPS may include at least the following two operations: (1) create/pre-process map feature databases (e.g., databases 250 and 260), where the features stored may be used to localize a query (in helmet VPS, where there may be no previous imagery of the area used for localization (e.g., no georeferenced map imagery (e.g., no database 208*a* of database 208)), so the most useful map features to be extracted for use in defining the map feature database(s) may be based on the semantic edges (e.g., data 291*b* and data 292*b*), where these features may be independent of whether or not light changes, and can be extracted directly from the 3D map databases (e.g., database 204 and/or database 206) that may have global coverage, thereby enabling camera localization anywhere on earth); and (2) query image localization and camera pose estimation (e.g., data 241 determination).

Map databases 202 may include a 3D map (e.g., database 204 and/or database 206 (e.g., Maxar 3D map satellite imagery for global coverage)) but not georeferenced image map data (e.g., database 208) of the environment in which a mobile subsystem may be localized. Renderings of a 3D map may be extracted from a from a map sampler (e.g., module 280) and fed into a map feature extractor (e.g., model 290) that may extract local semantic edges feature(s) that may be used as detailed map features (e.g., as data 291*b*) and global semantic edges feature(s) that may be used as map global features (e.g., as data 292*b*). These features (e.g., for use as data 291 and 292) may be extracted directly from the map by rendering the semantic objects and extracting their edges directly from the rendered image. The 3D coordinates of the edges may also be extracted from the map and processed in order to be stored in the map global feature database (e.g., database 250) and a map local feature database (e.g., database 260) along with its corresponding pose.

Figure 4:
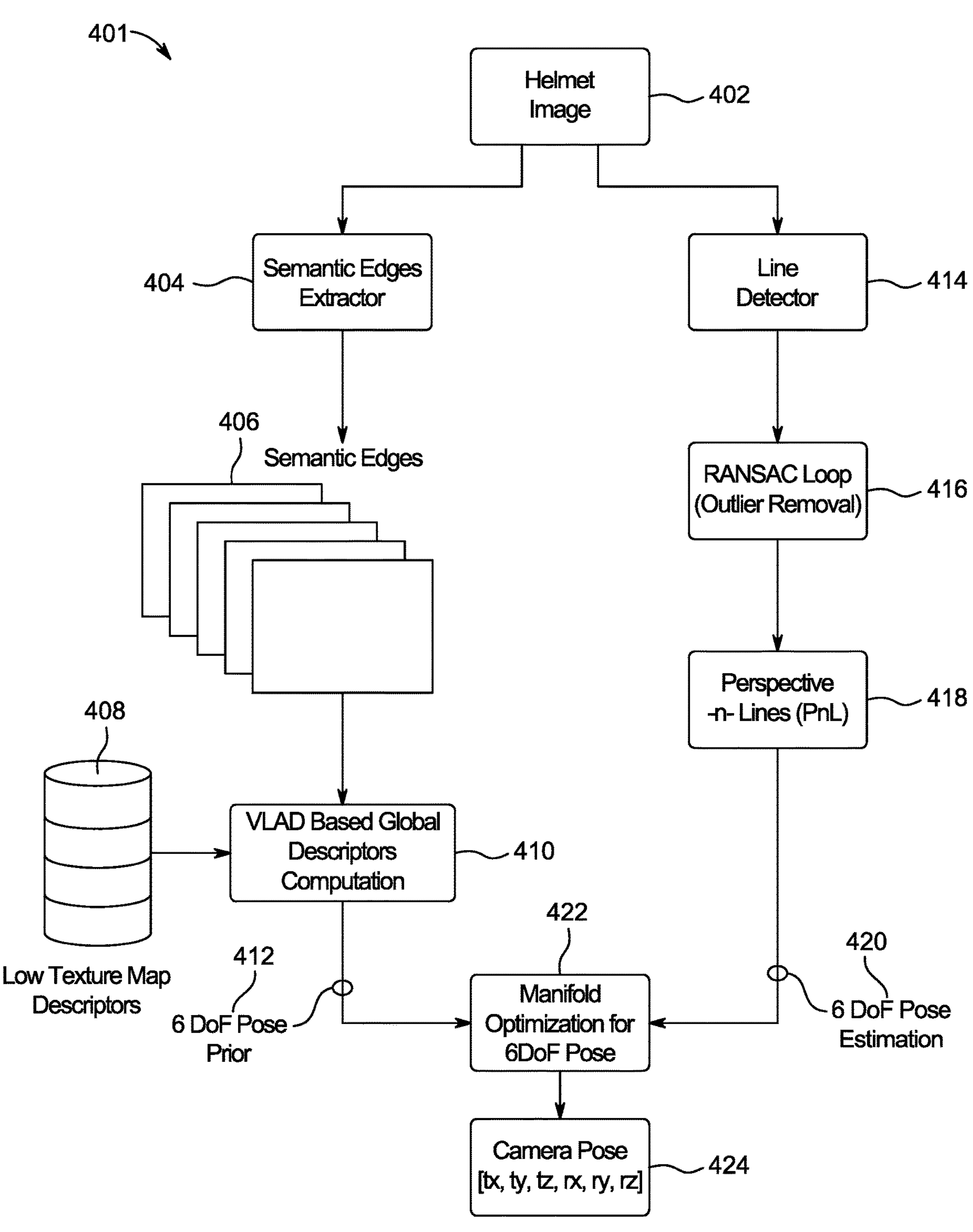

Query image localization and camera pose estimation of determiner 207 may then occur for this helmet VPS application once the pre-processed feature databases are ready (e.g., databases 250 and 260). Localization may be done first by matching the query global features (e.g., data 222) with the map global features (e.g., data 292) using first stage matching (e.g., module 230), resulting in localized candidate regions. Next, second stage matching (e.g., module 240) may be used to match query detailed image features (e.g., of data 221) with the map detailed features (e.g., feature data 291*b* of data 291) in order to determine semantic edges similarity between the query detailed features and the map local database of features (e.g., of database 260). Once likely candidates have been determined, a non-linear optimization procedure described (e.g., of module 240) may then be applied for determining the pose that may best align the semantic edges of the query image with the second stage matching correspondent to the map local features. The second stage matching may be used to match the detailed image features with the filtered map detailed features in order to determine semantic edges feature correspondences (e.g., given that in this application only semantic edges may be needed). The corresponding matched semantic edges may then be refined by the optimization procedure(s) of the second matching (e.g., module 240) and the output may be the query camera pose. This, for example, may be shown, in some embodiments, by system process 401 of FIG. 4, where a query (e.g., helmet) image may be obtained at operation 402, a semantic edges extractor 404 may be used to extract semantic edges 406, whereby VLAD based global descriptors computation may occur at operation 410 based on edges 406 and low texture map descriptors 408 for determining 6 DoF pose prior 412, which may be used in conjunction with 6 DoF pose estimation 420 by manifold optimization for 6 DoF pose operation 422 to generate a camera pose 424 (e.g., tx, ty, tz, rx, ry, rz), where 6 DoF pose estimation 420 may be generated by any suitable perspective-n-lines ("PnL") operation 418, an earlier RANSAC loop (e.g., outlier removal) operation 416, and an earlier line detector operation 414 on query image 402.

Figure 5:
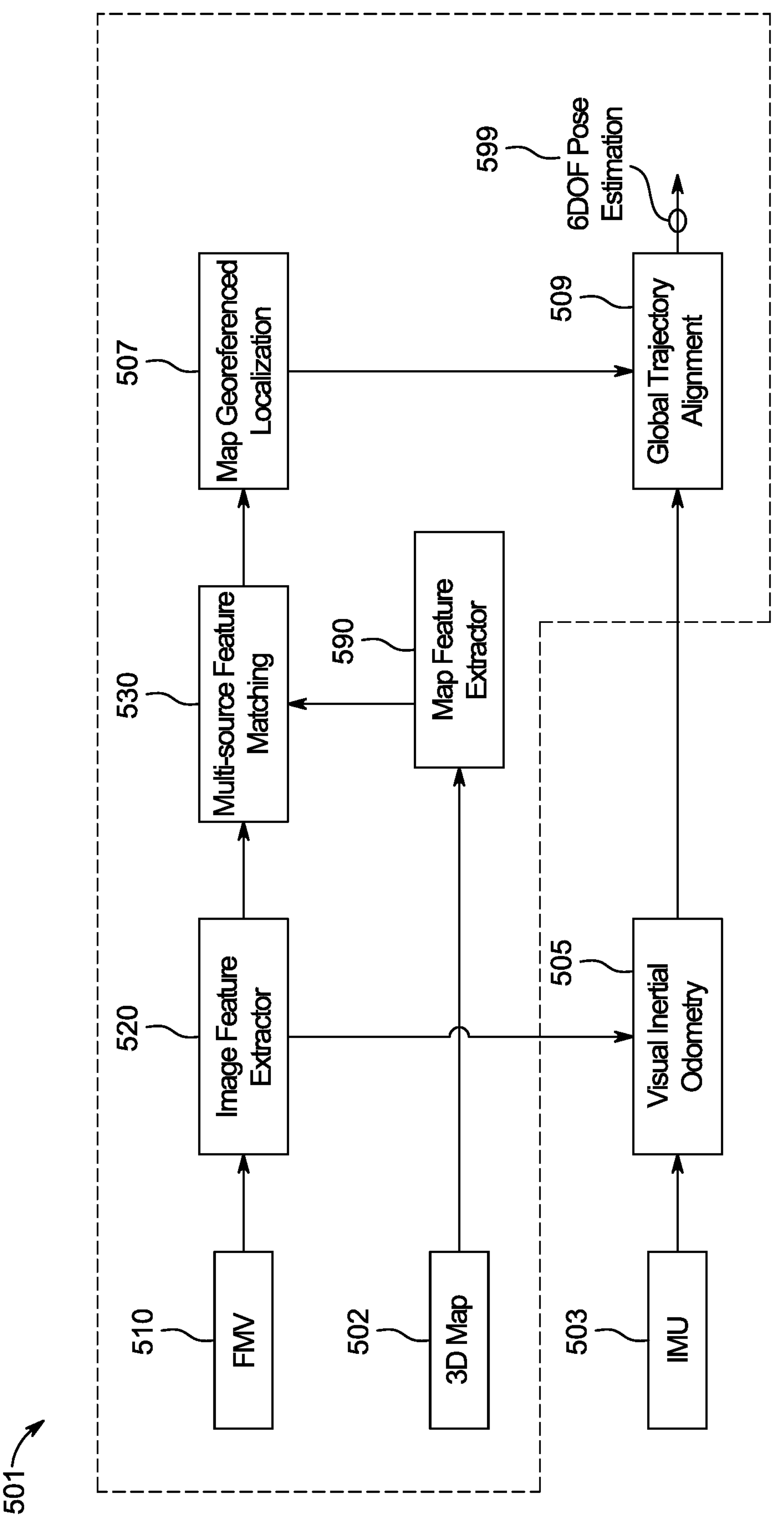

Another exemplary application may be referred to herein as aerial imagery VPS, where the system may locate an image captured from one or more calibrated cameras (e.g., on an aerial drone) using 3D map data (e.g., from map database 204 and/or from map database 206) as reference. This, for example, may be shown, in some embodiments, by system process 501 of FIG. 5, where query image(s) (e.g., full motion video frame images) 510 captured by image sensor(s) of a mobile subsystem may be obtained and processed by an image feature extractor 520 to provide extracted image features to a multi-source/stage feature matching module 530, which may also receive map features extracted from a 3D map 502 by a map feature extractor 590. Module 530 may process the extracted image features in conjunction with the extracted map features to determine a map georeferenced localization 507 of the image sensor(s) of the query image(s). Orientation data from an IMU 503 of the mobile subsystem at the time of query image capture may be provided to virtual inertial odometry 505 for processing in conjunction with any suitable extracted image features for providing mobile device orientation data that may be processed in conjunction with the determined map georeferenced localization 507 of the image sensor(s) of the query image(s) by a global trajectory alignment module 509 for determining a 6 DoF estimation 599 of the image sensor(s) of the query image(s). In some embodiments, process 501 may determine alignment by using any suitable non-linear optimization based on a pose-graph formulation. The outputs of localization 507 and odometry 505 may be inserted as constraints in such a graph and the final solution 599 may represent the best alignment of localization 507 and odometry 505. The best alignment may be the alignment that may minimize or best reduce the alignment error in the optimization problem that may be built and solved by module 509. Output 599 may be georeferenced position and orientation.

Another exemplary application may be referred to herein as mobile localization VPS, where the system may locate a 360 degree image generated from a video recorded (e.g., using a smartphone with any suitable plug-in (e.g., an Android Team Awareness Kit ("ATAK") plug-in or mobile application and mapping engine) that may provide situational, location, and/or communication tools to the smartphone). The 360° image may be compared with a database created using dense 3D map data (e.g., map data 204*a* of database 204 and/or map data 206*a* of database 206) as reference. The mobile subsystem may preferably be a device or a device with one or more image sensors that can be manipulated (e.g., by a user) in order to get a 360 degree coverage of a scene (e.g., any suitable robotic arm or pan-tilt device may be utilized). A pipeline for mobile localization VPS may include at least the following three operations: (1) create/pre-process map feature databases (e.g., databases 250 and 260), where the features stored may be used to localize a query (in mobile localization VPS, where there may be no previous imagery of the area used for localization (e.g., no georeferenced map imagery (e.g., no database 208*a* of database 208)), so the most useful map features to be extracted for use in defining the map feature database(s) may be based on the semantic edges (e.g., data 291*b* and data 292*b*), where these features may be independent of whether or not light changes, and can be extracted directly from the 3D map databases (e.g., database 204 and/or database 206) that may have global coverage, thereby enabling camera localization anywhere on earth); (2) 360° query image generation (e.g., conversion of a video recorded by a smartphone (e.g., using the ATAK) into a 360° image); and (3) 360° query image localization and camera pose estimation (e.g., data 241 determination).

Figure 6:
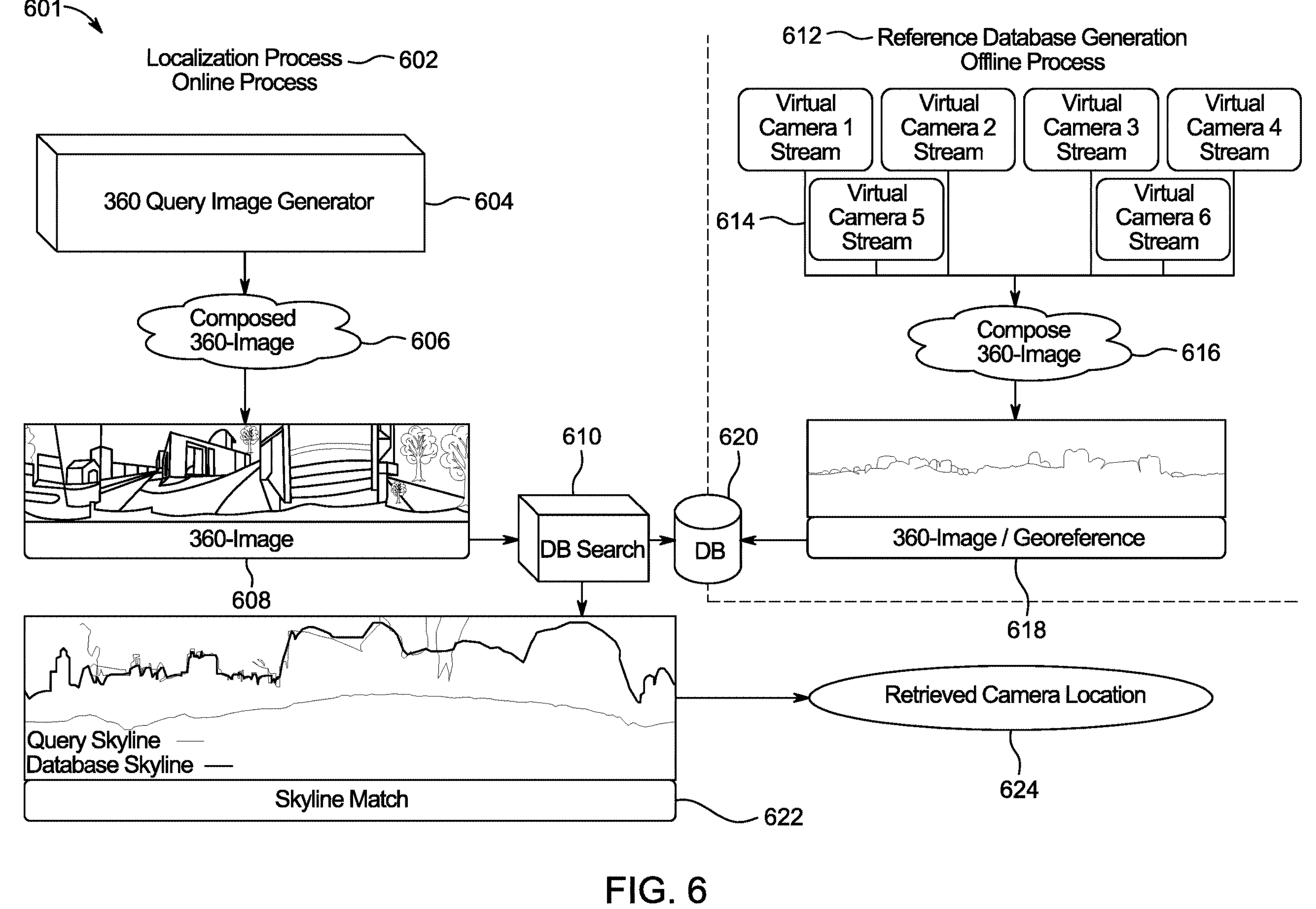

Map databases 202 may include a 3D map (e.g., database 204 and/or database 206 (e.g., Maxar 3D map satellite imagery for global coverage)) but not georeferenced image map data (e.g., database 208) of the environment in which a mobile subsystem may be localized. Renderings of a 3D map may be extracted from a from a map sampler (e.g., module 280) and fed into a map feature extractor (e.g., model 290) that may extract local semantic edges feature(s) that may be used as detailed map features (e.g., as data 291*b*) and global semantic edges feature(s) that may be used as map global features (e.g., as data 292*b*). These features (e.g., for use as data 291 and 292) may be extracted directly from the map by rendering the semantic objects and extracting their edges directly from the rendered image. Also, the pose with its corresponding latitude-longitude for each rendered view may be stored in the local features map database (e.g., database 260). The 3D coordinates of the edges may also be extracted from the map and processed in order to be stored in the map global feature database (e.g., database 250) and a map local feature database (e.g., database 260) along with its corresponding pose. For example, as shown by system process 601 of FIG. 6, during a reference database generation subprocess 612 (e.g., an offline process), one or more virtual camera streams 614 may be used to compose a 360 degree image 616 (e.g., map of database) that may be georeferenced and from which semantic edges features may be extracted at operation 618 and stored in a map feature database 620.

Query generation may then occur during a localization process 602 (e.g., an online process). For example, using a smartphone device with a calibrated camera and with an ATAK plugin, a video may be recorded by rotating the smartphone 360° on the Z axis at operation 604 to compose a query 360 degree image. The frames of the query video may have their image features extracted at operation 608 and matched to compute the extrinsic parameter of each frame via a database search 610 to identify a closest semantic edges (e.g., skyline) match at operation 622. Finally, using the relative transformation between the frames, a 360° image may be generated and geo oriented (e.g., using the smartphone's AHRS) at operation 624.

With the pre-processed map feature databases, the localization may be carried out by matching the detailed 360° query image features with the map detailed features in order to determine semantic edges similarity between the query detailed features and the local database of map features. The top-N most similar database edge images may then be used to output the estimated camera pose in the world frame. As just one example of query localization results that have been achieved, a query dataset was generated in different places from a region of approximately 338,870 square meters with visible buildings and tested. From 44 query images, 7 had a localization error bigger than 10 meters in the top-15 recall, while 34 query images had an error smaller than 5 meters, totaling ~84% of the dataset.

Figure 7:
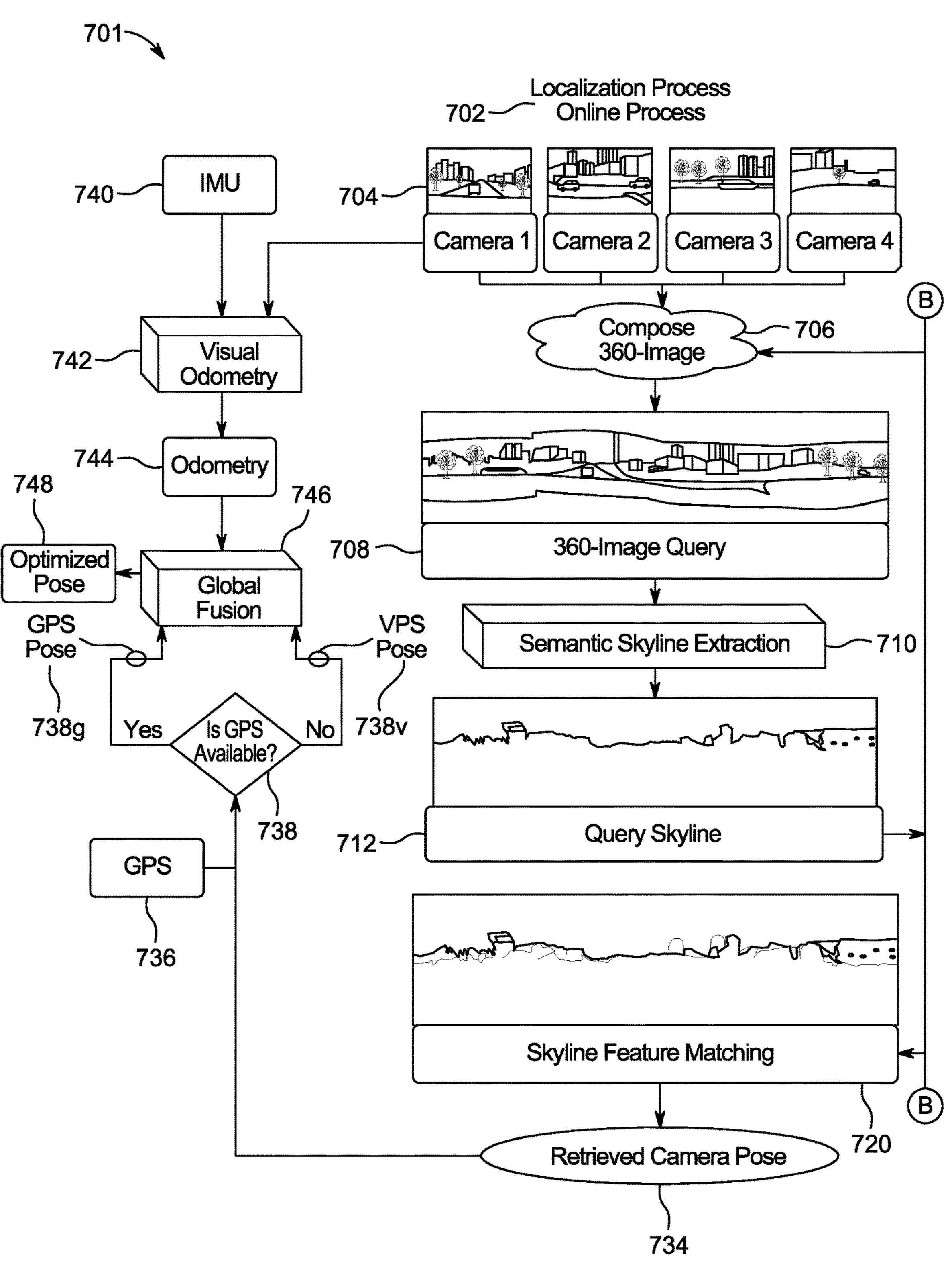
Figure 7:
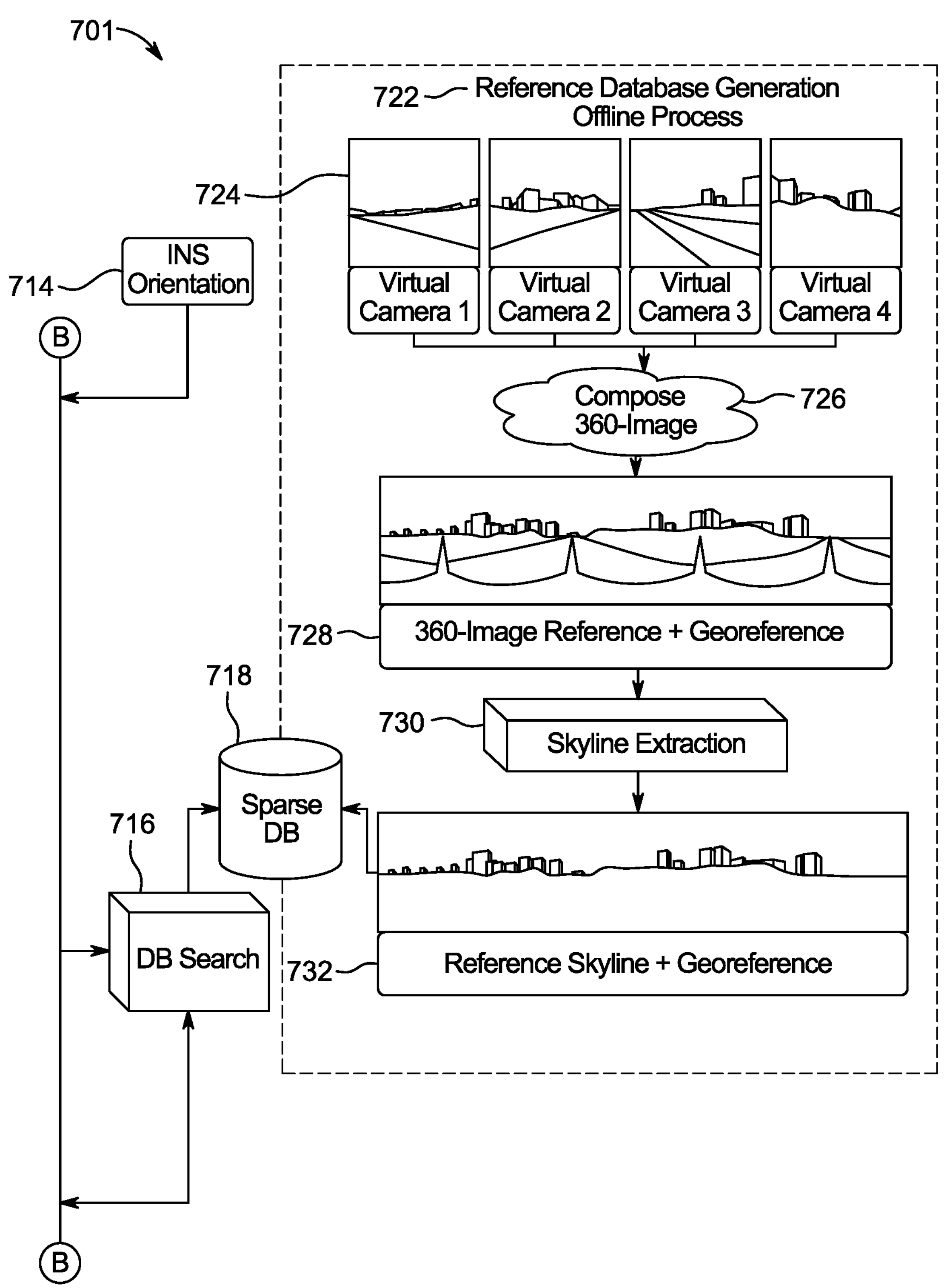

Another exemplary application may be referred to herein as vehicle localization VPS, where the system may be designed to provide position and orientation estimations when GPS signals are lost or otherwise denied at the vehicle (e.g., specifically in a ground vehicle). In such a scenario, as shown by system process 701 of FIG. 7, a system may be initialized with UPS 736, an IMU 740, and visual odometry 742. A global fusion algorithm or module 746 may be configured to receive any suitable odometry information 744 and GPS pose information 738*g* (e.g., if GPS is available (e.g., not denied)), or VPS pose information 738*v* (e.g., in GPS jamming scenarios). Module 746 may be configured to be responsible for performing any suitable sensor fusion between odometry 744 and the GPS/VPS coordinates from GPS pose information 738*g* and/or VPS pose information 738*v*. Module 746 may be configured to output an optimized pose coordinate 748 (e.g., latitude, longitude) at the end of the process.

A simultaneous localization and mapping ("SLAM") system may be configured to utilize one or more cameras 704 (e.g., of the ground vehicle) for video streaming along with readings from IMU 740 during a localization process 702 (e.g., an online process). This may be a monocular inertial system. Each camera may have any suitable frequency (e.g., 30 Hz) and the IMU may have any suitable frequency (e.g., 200 Hz). It may use an indirect method for pose estimation (e.g., it may be configured to detect features on the image and use the IMU to estimate the relative motion between frames). In the localization process, all camera streamings (e.g., all four camera streamings 704), and an inertial navigation system ("INS") orientation 714, which may be embedded in IMU hardware, to create a 360° image 706. Once a 360° image query 708 may be created based on image 706, a deep learning model may be employed to extract at operation 710 any suitable image features 712 (e.g., semantic edges (e.g., skylines)). In addition, any suitable post processing algorithm may be used to enhance the detected image (e.g., skyline) feature(s) to result in a query skyline 712. A 3D map feature database 718 may have been previously created during a reference database generation process 722 (e.g., an offline process) using any suitable image capture sensors (e.g., one or more (e.g., 4) virtual cameras) 724 to compose one or more 360° images 726 of the environment in which the vehicle is to be localized. All images 726 may be 360° referenced and georeferenced at operation 728 for any suitable map feature extraction (e.g., semantic edges (e.g., skyline) extraction) 730 for generating extracted map features (e.g., reference semantic edge(s) (e.g., skyline) and georeferenced (e.g., localization) data) 732 that may be stored in database 718 (e.g., a sparse matrix data structure that may be able to store a big volume of data and do the image search quickly). A database search 716 may be carried out to do matching between extracted image features 712 and extracted map features 732 of database 718 to identify matching features (e.g., matching semantic edges (e.g., skyline) feature(s)) 720, which may enable retrieval of a camera pose 734 of the image capture sensor(s) of the vehicle to be localized, where pose 734 may be utilized as at least a portion of VPS pose information 738*v*.

In an initial test case, such a VPS system may be initialized by driving the vehicle through an environment while its GPS (e.g., GPS 736) is functional. Then, a place may be chosen to simulate the GPS Jamming (e.g., GPS 736 may not be used, thereby not fusing GPS pose information 738*g* with the odometry data 744). At that point, the image-retrieval system may be used with the odometry data to compute the current (latitude, longitude) coordinate pose 748. An initial guess used on the image-retrieval system may be provided by the latest message sent by a global optimization module. In some embodiments, to evaluate the trajectory, 2D mean squared error ("MSE") may be used for error analysis. Image sensor(s) 704 may be any suitable number (e.g., 4) global shutter cameras (e.g., with 120 degrees of horizontal field-of-view). The system may utilize any suitable processing component(s), including, but not limited to, a Jetson NVIDIA AGX Xavier (e.g., an AI computer for autonomous machines that may be capable of delivering the performance of a GPU workstation in an embedded module (e.g., under 30 W)).

Pose coordinate 748 (e.g., a 6 DOF pose (e.g., position plus orientation)) may be utilized for presentation in any suitable manner (e.g., utilizing managed element 299). For example, this may be done in a visualization of its pose in a map or a render of its pose in a 3D map environment (e.g., for AI purposes).

Figure 8:
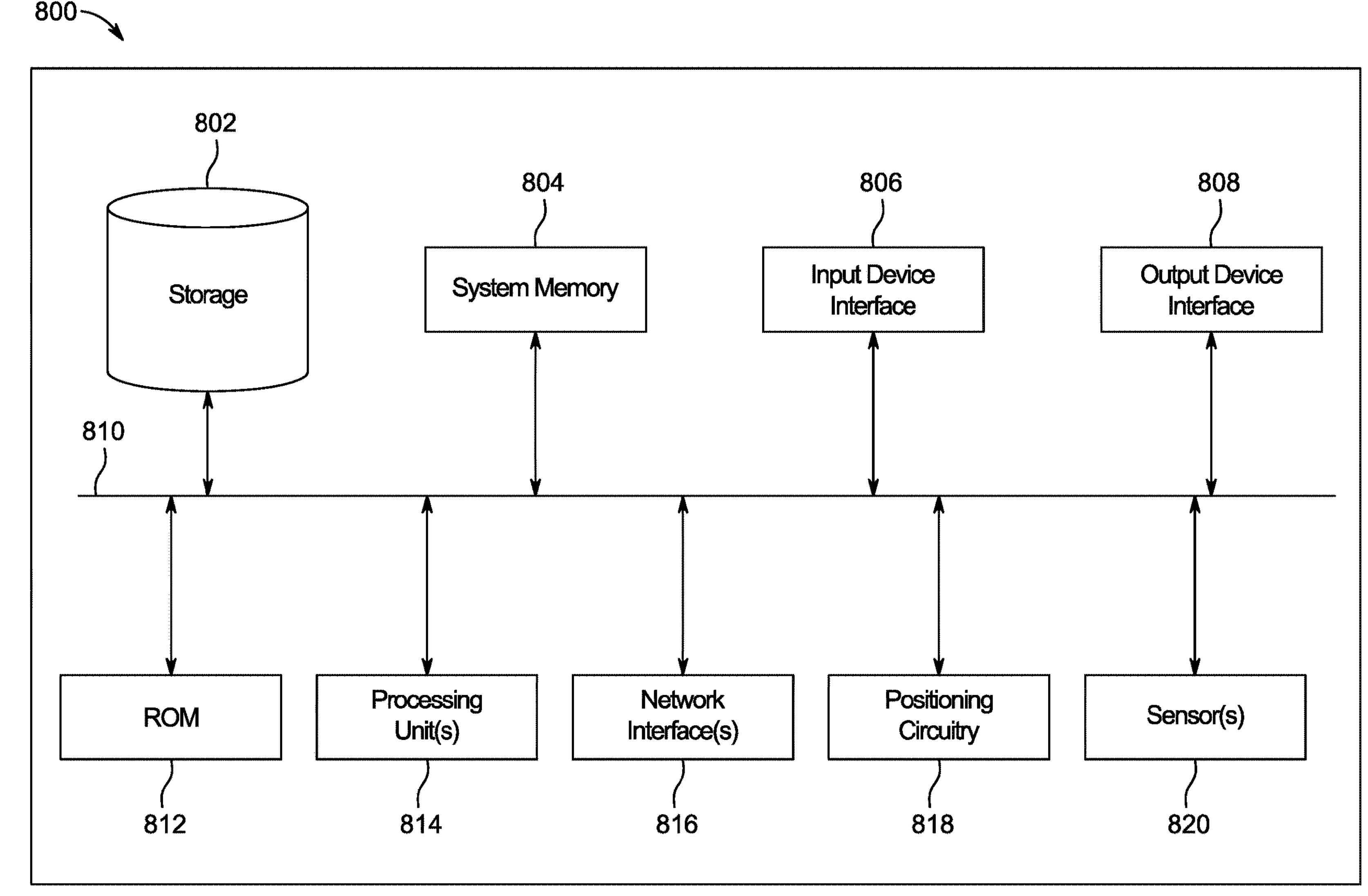
FIG. 8 illustrates an example electronic system with which aspects of the subject technology may be implemented, in accordance with one or more implementations.

FIG. 8 illustrates an electronic system 800 with which one or more implementations of the subject technology may be implemented. Electronic system 800 can be, and/or can be a part of, any of subsystems 100-106 for generating the features and processes described herein. Electronic system 800 may include various types of computer-readable media and interfaces for various other types of computer-readable media. Electronic system 800 may include a permanent storage device 802, a system memory 804 (and/or buffer), an input device interface 806, an output device interface 808, a bus 810, a ROM 812, one or more processing unit(s) 814, one or more network interface(s) 816, positioning circuitry 818, sensor(s) 820, and/or subsets and variations thereof.

Bus 810 may collectively represent all system, peripheral, and chipset buses that may communicatively couple or connect the numerous internal devices of electronic system 800. In one or more implementations, bus 810 may communicatively couple one or more processing unit(s) 814 with ROM 812, system memory 804, and permanent storage device 802. From these various memory units, one or more processing unit(s) 814 may retrieve instructions to execute and data to process in order to execute the processes of the subject disclosure. One or more processing unit(s) 814 can be a single processor or a multi-core processor in different implementations.

ROM 812 may store static data and instructions that may be needed by one or more processing unit(s) 814 and other modules of electronic system 800. Permanent storage device 802, on the other hand, may be a read-and-write memory device. Permanent storage device 802 may be a non-volatile memory unit that stores instructions and data even when electronic system 800 is off. In one or more implementations, a mass-storage device (e.g., a magnetic or optical disk and its corresponding disk drive) may be used as permanent storage device 802.

In one or more implementations, a removable storage device (e.g., a floppy disk, flash drive, and its corresponding disk drive) may be used as permanent storage device 802. Like permanent storage device 802, system memory 804 may be a read-and-write memory device. However, unlike permanent storage device 802, system memory 804 may be a volatile read-and-write memory, such as random access memory. System memory 804 may store any of the instructions and data that one or more processing unit(s) 814 may need at runtime. In one or more implementations, the processes of the subject disclosure may be stored in system memory 804, permanent storage device 802, and/or ROM 812. From these various memory units, one or more processing unit(s) 814 may retrieve instructions to execute and data to process in order to execute the processes of one or more implementations.

Bus 810 may also couple to input and output device interfaces 806 and 808. Input device interface 806 may enable a user to communicate information and select commands to electronic system 800. Input devices that may be used with input device interface 806 may include, for example, alphanumeric keyboards and pointing devices (also called "cursor control devices"). Output device interface 808 may enable, for example, the display of images generated by electronic system 800. Output devices that may be used with output device interface 808 may include, for example, printers and display devices, such as a liquid crystal display ("LCD"), a light emitting diode ("LED") display, an organic light emitting diode ("OLED") display, a flexible display, a flat panel display, a solid state display, a projector, or any other device for outputting information.

One or more implementations may include devices that function as both input and output devices, such as a touchscreen. In these implementations, feedback provided to a user can be any form of sensory feedback, such as visual feedback, auditory feedback, or tactile feedback; and input from a user can be received in any form, including acoustic, speech, or tactile input.

Bus 810 may also couple to positioning circuitry 818 and sensor(s) 820. Positioning circuitry 818 may be used in determining device location based on positioning technology. For example, positioning circuitry 818 may provide for one or more of GNSS positioning, wireless access point positioning, cellular phone signal positioning, Bluetooth signal positioning, image recognition positioning, an INS (e.g., via motion sensors such as an accelerometer and/or gyroscope), and/or localization system(s).

In one or more implementations, sensor(s) 820 may be utilized to detect movement, travel, and/or orientation of electronic system 800. For example, the sensor(s) may include an accelerometer, a rate gyroscope, and/or other motion-based sensor(s). Alternatively or in addition, sensor(s) 820 may include one or more audio sensors(s) and/or image-based sensor(s) for determining device position. In another example, sensor(s) 820 may include a barometer, which may be utilized to detect atmospheric pressure (e.g., corresponding to device altitude). In another example, sensor(s) 820 may include image sensor(s).

Finally, as shown in FIG. 8, bus 810 may also couple electronic system 800 to one or more networks and/or to one or more network nodes through one or more network interface(s) 816. In this manner, electronic system 800 can be a part of a network of computers (e.g., a LAN, a wide area network ("WAN")), or an Intranet, or a network of networks, such as the Internet. Any or all components of electronic system 800 can be used in conjunction with the subject disclosure.

For example, a method of localizing a mobile subsystem including an image sensor component, an orientation sensor component, a memory component, and a processing module communicatively coupled to the image sensor component, the orientation sensor component, and the memory component (e.g., mobile subsystem 100) is provided that may include storing, with the memory component, a map feature database (e.g., database 250 and/or database 260) including a plurality of map feature entries (e.g., data 293), wherein each map feature entry of the plurality of map feature entries is respectively associated with a rendered map image of a plurality of rendered map images (e.g., data 281) rendered from a georeferenced three-dimensional map (e.g., from data 204*a* of database 204) and each map feature entry of the plurality of map feature entries includes at least one map feature vector indicative of at least one map feature that has been extracted (e.g., by extractor 290) from the rendered map image associated with the map feature entry, and capturing, at a moment in time with the image sensor component (e.g., sensor(s) 210), an image (e.g., data 211), extracting, with the processing module (e.g., extractor 220), at least one captured image feature from the captured image, generating, with the processing module, at least one captured image feature vector (e.g., data 223) based on at least one of the at least one extracted captured image feature, comparing, with the processing module (e.g., at module 230 and/or module 240), the at least one captured image feature vector with at least one map feature vector from each map feature entry of at least a portion of the plurality of map feature entries of the stored map feature database, classifying, with the processing module, at least one particular map feature entry of the plurality of map feature entries as a matching map feature entry based on the comparing, and defining, with the processing module (e.g., at module 240), an estimated location of the mobile subsystem at the moment in time based on the classifying. The method may further include presenting, substantially in real-time with the capturing, the estimated location of the mobile subsystem to a user of the mobile subsystem (e.g., with managed element 299). In some embodiments, each map feature entry of the plurality of map feature entries may also include map orientation data indicative of a map orientation of the rendered map image associated with the map feature entry (e.g., map orientation data passed along by data 202*a*/281/293/251/261), and the method may further include capturing, at the moment in time with the orientation sensor component (e.g., sensor(s) 270), image orientation data (e.g., data 271) indicative of an image sensor orientation of the image sensor component, and identifying, with the processing module, a proper subset of the plurality of map feature entries based on the image sensor orientation of the captured image orientation data (e.g., an orientation filtered subset of data 292 as data 251), where the comparing may include comparing the at least one captured image feature vector with at least one map feature vector from each map feature entry of only the proper subset of the plurality of map feature entries (e.g., at module 230), wherein the map orientation indicated by the map orientation data of each map feature entry of the proper subset of map feature entries may be aligned with the image sensor orientation of the captured image orientation data, and/or wherein each map feature entry of the plurality of map feature entries may include map location data indicative of a map location of the rendered map image associated with the map feature entry (e.g., map location data passed along by data 202*a*/281/293/251/261) and the defining may include defining the estimated location of the mobile subsystem at the moment in time based on the map location data of each classified matching map feature entry. In some embodiments, each map feature entry of the plurality of map feature entries may include map location data indicative of a map location of the rendered map image associated with the map feature entry of the plurality of map feature entries (e.g., map location data passed along by data 202*a*/281/293/251/261), the storing may include storing, with the memory component, another map feature database including another plurality of map feature entries (e.g., database 260 as opposed to database 250), each map feature entry of the other plurality of map feature entries may be respectively associated with a rendered map image of the plurality of rendered map images rendered from the georeferenced three-dimensional map, each map feature entry of the other plurality of map feature entries may include at least one other map feature vector indicative of at least one other map feature that has been extracted from the rendered map image associated with the map feature entry of the other plurality of map feature entries (e.g., data 291), each map feature entry of the other plurality of map feature entries may include the map location data indicative of the map location of the rendered map image associated with the map feature entry of the other plurality of map feature entries, and, after the classifying but before the defining, the method may include identifying, with the processing module, a proper subset of the other plurality of map feature entries based on the map location data of at least one classified matching map feature entry (e.g., location filtering at module 230). In some embodiments, the defining may include defining the estimated location of the mobile subsystem at the moment in time based on the map location data of at least one map feature entry of the proper subset of the other plurality of map feature entries (e.g., at module 240). In some embodiments, the at least one captured image feature may be a local image feature and the at least one other captured image feature may be a global image feature. In some embodiments, the at least one extracted other captured image feature may be an image edges feature, and the at least one map feature vector of each map feature entry of the other plurality of map feature entries may be indicative of at least one map edges feature that has been extracted from the rendered map image associated with the map feature entry of the other plurality of map feature entries. In some embodiments, the method may include extracting, with the processing module, at least one other captured image feature from the captured image (e.g., data 221 as opposed to data 222), generating, with the processing module, at least one other captured image feature vector based on at least one of the at least one extracted other captured image feature, analyzing, with the processing module (e.g., at module 240), the at least one other captured image feature vector in comparison to at least one other map feature vector from each map feature entry of the proper subset of the other plurality of map feature entries of the stored other map feature database, and categorizing, with the processing module, at least one particular map feature entry of the proper subset of the other plurality of map feature entries as another matching map feature entry based on the analyzing, wherein the defining may include defining the estimated location of the mobile subsystem at the moment in time based on the categorizing. In some embodiments, the defining may include defining the estimated location of the mobile subsystem at the moment in time based on the map location data of each categorized other matching map feature entry (e.g., at module 240). In some embodiments, the at least one extracted captured image feature may be an image point feature and the at least one map feature vector of each map feature entry of the plurality of map feature entries may be indicative of at least one map point feature that has been extracted from the rendered map image associated with the map feature entry.

As another example, a method of localizing a mobile subsystem including an image sensor component, a memory component, and a processing module communicatively coupled to the image sensor component and the memory component is provided that may include storing, with the memory component, a global map feature database including a plurality of global map feature entries (e.g., database 250), wherein each global map feature entry of the plurality of global map feature entries includes a global map feature that has been extracted from a respective global map image that has been rendered from a first three-dimensional map and a global map location of the respective global map image, storing, with the memory component, a local map feature database including a plurality of local map feature entries (e.g., database 260), wherein each local map feature entry of the plurality of local map feature entries includes a local map feature that has been extracted from a respective local map image that has been rendered from a second three-dimensional map and a local map location of the respective local map image, capturing, at a moment in time with the image sensor component (e.g., sensor(s) 210), an image sensor image (e.g., data 211) of an environment of the mobile subsystem (e.g., subsystem 100), extracting, with the processing module, a global image feature (e.g., data 222) from the captured image sensor image, extracting, with the processing module, a local image feature (e.g., data 221) from the captured image sensor image, identifying, with the processing module, a proper subset of the plurality of global map feature entries based on a comparison of the global image feature with the global map feature of each of at least some entries of the plurality of global map feature entries (e.g., at module 230), defining, with the processing module, a geographic range (e.g., data 231) based on the global map location of each global map feature entry of the proper subset of the plurality of global map feature entries, identifying, with the processing module (e.g., at module 240), a proper subset of the plurality of local map feature entries based on a comparison of the geographic range with the local map location of each of at least some entries of the plurality of local map feature entries, and defining, with the processing module (e.g., at module 240), an estimated location (e.g., with data 241) of the mobile subsystem at the moment in time based on a comparison of the local image feature with the local map feature of each of at least some entries of the proper subset of the plurality of local map feature entries. In some embodiments, the first three-dimensional map may be the same as the second three-dimensional map (e.g., map 204 for both local and global extraction). Alternatively, in some other embodiments, the first three-dimensional map may be different than the second three-dimensional map (e.g., map 204 may be used for local extraction and map 206 may be used for global extraction).

As yet another example, a method of localizing a second mobile subsystem (e.g., mobile subsystem 100) using a first mobile subsystem (e.g., mobile subsystem 100'), a first three-dimensional map (e.g., map 204), and a training system (e.g., training system 1') is provided, wherein the first mobile subsystem includes a first image sensor component, a first orientation sensor component, and a first location sensor component, and wherein the second mobile subsystem includes a second image sensor component, a memory component, and a processing module communicatively coupled to the second image sensor component and the memory component, where the method may include, at each of a first plurality of moments in time when the first mobile subsystem travels about a first environment, capturing a mobile image (e.g., data 211') of the environment at that moment using the first image sensor component, a mobile orientation (e.g., data 271') of the first image sensor component at that moment using the first orientation sensor component, and a mobile location (e.g., data 265') of the first mobile subsystem at that moment using the first location sensor component, rendering, with a map sampler of the training system (e.g., module 280'), a plurality of rendered map images from the first three-dimensional map, wherein each rendered map image of the plurality of rendered map images is associated with a respective map location and a respective map orientation, defining, with the training system, a similar image set, wherein the similar image set includes a particular captured mobile image of the plurality of captured mobile images and a particular rendered map image of the plurality of rendered map images and the defining includes determining that the mobile orientation of the particular captured mobile image satisfies an orientation similarity comparison with the map orientation of the particular rendered map image and that the mobile location of the particular captured mobile image satisfies a location similarity comparison with the map location of the particular rendered map image (e.g., at module 280' for providing data 281' that is aligned with data 211'), extracting, with a feature extractor model of the training system (e.g., model 224), the following: an image feature from the particular captured mobile image of the similar image set (e.g., data **223*i*) and a map feature from the particular rendered map image of the similar image set (e.g., data 223*m*), determining, with a feature matching module of the training system (e.g., module 226), a matching error metric (e.g., data 225) between the extracted image feature and the extracted map feature, adjusting (e.g., with module 228) at least one parameter of the feature extractor model using the determined matching error, after the adjusting, loading the feature extractor model onto the memory component of the second mobile subsystem (e.g., loading trained model 224 onto mobile subsystem 100 as extractor 220), capturing, at a second moment in time with the second image sensor component (e.g., sensor(s) 210) of the second mobile component, a second mobile image (e.g., data 211), and using, with the processing module of the second mobile subsystem, the loaded feature extractor model (e.g., extractor 220) to estimate the location (e.g., data 241) of the second mobile subsystem at the second moment in time based on the captured second mobile image. In some embodiments, the particular rendered map image (e.g., data 281') may have a lower resolution than the particular captured mobile image (e.g., data 211'). In some embodiments, the method may include, after the extracting, but prior to the determining, confirming a correspondence between the extracted image feature and the extracted map feature using a reprojection function on the mobile orientation of the particular captured mobile image and on the map orientation of the particular rendered map image (e.g., at module 226). In some embodiments, the method may include, after the extracting, but prior to the determining, confirming a correspondence between the extracted image feature and the extracted map feature using a reprojection function on the mobile location of the particular captured mobile image and on the map location of the particular rendered map image (e.g., at module 226**).

A VPS or LPSMS can provide live real-time global positioning estimates to any suitable users (e.g., warfighters or travelers) using a variety of data and prior information, particularly in GPS denied, jammed, or corrupted environments. The proposed system can also accept GPS signals and seamlessly integrate when GPS or other navigation signals are available (e.g., when a mobile subsystem is able to recover previously restricted navigation network capability). In some embodiments, a VPS may be used for aerial applications (e.g., aerial mobile subsystems (e.g., in the 200-1, 200 foot AGL airspace)). Organic visual odometry algorithms may be utilized to process image data that can enable feature extraction in various forms. The resulting output, when combined with algorithmic models and result in high fidelity 3D data locally sourced data, can provide enhanced estimations of current location. Not only may the system rely on local feature extraction of image data, but also on possessing prior information, such as globally localized features or models to compare against (e.g., extensive georeferenced (e.g., GPS tagged) 3D models with features that can be compared against). VIO algorithms may be used for image processing along with SLAM algorithms to provide a robust PNT solution to a need for localization in GPS denied environments.

An operation in some geometric computer vision tasks, such as SLAM and/or Structure-from-Motion ("SfM") may be to extract and describe interest points from images that are stable and repeatable from different lighting conditions, view-points, and/or map representations. ML techniques allow optimal feature description between image and map points by learning from patterns in the data distribution. By formulating feature description as a machine learning problem, it is possible to increase the algorithm effectiveness on particular data sets, such as aerial images. Main libraries that may be used for such purposes may be Open Computer Vision Library ("OpenCV"), Open Computer Graphics Library ("OpenGL"), and/or Pytorch. OpenCV may contain multiple algorithms for image processing, geometric transformation, and pose estimation. OpenGL may be used for rendering and/or 3D map manipulation so that computer vision algorithms may be applied in high definition maps and render different mobile subsystem (e.g., drone) views. Pytorch may be used for the development and training of machine learning models for feature extraction and matching.

An LPSMS (e.g. algorithms thereof) may work by running a ML based feature extractor in both the mobile subsystem camera image(s) and the 3D map(s). Then a feature matching module may run by associating both features taking into account both the features descriptors and geometric information. Then, a 6 DOF pose of the camera may be retrieved by solving a PNP problem followed by non-linear optimization.

Beyond using only a camera feed as the sole sensor input for providing results, improvements to the overall accuracy can be done by incorporating other sensors into the localization problem as well as introducing constraints and known measurable states, such as heading, gimbal pitch angle, and/or potentially locking the horizon thereby reducing into a much simpler 3-4 DoF problem. With the use of an IMU, the LPSMS can improve a Visual-Inertial SLAM pipeline in retrieving a more precise scale and orientation estimation by solving a tightly coupled non-linear optimization problem. This can improve the accuracy of the solution by a factor.

It may be helpful to approach the separate parts, given some prior information, but the LPSMS of this disclosure enables the initial use of geotagged, and potentially other data rich additions to, models that may be built from extensive data collection. Algorithms for visual localization/odometry may process images sequentially or localize against a database of images taken from the same place. However, such sequential image processing may only provide relative displacement, which may be suitable for local trajectory planning and control, but not for localization, while such localizing against a database may need previous footage of the environment taken from a camera with similar viewing angles to the images that are to be localized, which may make scalability to unobserved environments a challenge.

A solution of the LPSMS of this disclosure may use the wide range of maps available from existing 3D mapping infrastructure to perform global localization in GPS-denied environments and combine this with the accurate relative trajectory information obtained by visual inertial SLAM to achieve accurate and scalable 6 DoF localization.

Having widespread access to 3D models and other prior visual information available to these algorithms simplifies and speeds up the solution to the problem tremendously. The LPSMS of this disclosure provides a high resolution, low error, robust estimate of the mobile subsystem's position using limited information including lack of GPS in an integrated solution that can execute on local devices but also combine with teams of devices.

As mentioned, a street view VPS may locate and image capture from one or more cameras by using street-view-like imagery and/or 3D map data as reference, where a street view VPS pipeline may include creating/pre-processing the database where the features stored may be used to localize the query, and query image localizing. The database may be composed of a 3D map and any suitable street view or georeferenced images of an environment (e.g., Google Street View images). To save such images, selected points of interest (e.g., latitude and longitude coordinates) of the mapped region may be selected, then any suitable number of images (e.g., 12) may be downloaded for each coordinate to get a 360 degrees view of each point. As the coordinates (e.g., latitude and longitude) of the image may not be accurate, a localization operation on the 3D map for these images may be carried out. Key features of the images (e.g., using a feature extraction deep learning algorithm) and their corresponding 3D points may be extracted and used on a PnP algorithm to estimate a precise pose of the images. Then, using the estimated pose of the images on the 3D map, a new (e.g., accurate) 3D point of each key feature may be extracted and stored into a file (e.g., ".h5" file) that may be used on the query pose estimation. Such query image localization may be done by matching the query images with the pre-processed database images (e.g., processed Street View images). First, the query image global features may be extracted using a deep learning algorithm and used to retrieve 'N' database images that most have similarity with the query. Then, the query key (e.g., local, detailed, etc.) features may be matched with the retrieved database key features (e.g., features retrieved after any suitable filtering (e.g., localization candidate region filtering from the first matching)) by comparing their descriptors and then using the corresponding 3D points on the PnP algorithm to estimate the query pose on the 3D map. Then, the estimated query pose may be converted into real-world coordinates (e.g., latitude/longitude) and returned to the user or otherwise used for managing a managed element.

A helmet VPS may be used to localize images taken from a helmet while using only a global 3D map as reference. The VPS may use projective geometry and deep learning techniques to perform the localization. Due to low texture likely being presented on the 3D reference map, using an algorithm based on points (e.g., PnP) may provide initial results. Extending the concept of localization from n-segments observed on an image, the system may include a pose recovery method that may work with points and line segments (e.g., semantic edges). This approach, which may be referred to as Perspective-n-Points-Lines ("PnPL") may use the line segments, which may be well suitable for city environments, where the buildings (e.g., skylines) may be used as a main lines source. Aside this, a deep learning model may be used to classify and extract the edges presented on the image plane. The output may be a probability distribution map of any suitable number (e.g., 20) of possible classes, such as buildings contours, sky lines, vegetation, traffic signs, and/or the like. A probability distribution may be used as local feature descriptors. Using an algorithm to compute a global descriptor for the image (e.g., the query image), such a global descriptor, which may be an extension of the bag-of-words ("bow") method for images, may be used to perform image retrieval. This may allow for an initial estimation about the mobile subsystem camera pose. Fusing this measure with the pose provided by PnPL, the pipeline may merge two algorithms that came from different knowledge domains to estimate the camera pose.

Organic visual odometry algorithms may be configured to process image data that may enable feature extraction in various forms (e.g., local feature extraction and/or global feature extraction of image data). Existing GPS tagged 3D model(s) of earth's terrain (e.g., Google Earth, Vricon, etc.) may provide georeferenced (e.g., GPS tagged) 3D models with features that can be compared against (e.g., the possession of prior information, such as globally localized features or models to compare against may be used for map feature extraction). The search of a 3D model to determine match (e.g., image(s) of full motion video compared to a 3D model) may enable GPS position determination through multi source feature matching. VIO algorithms for image processing along with SLAM algorithms may provide a robust PN solution to a need for localization in GPS denied environments, Therefore, an algorithm (e.g., algorithmic models) may be run to find most similar match(es), for example, by finding a match, projecting a camera in 3D space, carrying out some spherical trigonometry, carrying out a plurality of pose estimations to find a best match (e.g., 3D map localized pose) (e.g., by searching a mobile subsystem pose for a total number of found inliers and a total number of matching points), reprojecting inlier points, determining where it is on the earth or any other suitable environment, thereby allowing real time recreation of a mobile subsystem image (e.g., video) in a 3D data set to know where the mobile subsystem is in a GPS denied environment. This may use existing 3D map data to localize a mobile subsystem with any suitable image sensor(s) (e.g., a camera array fixed to a helmet (e.g., one or more GoPro cameras on a user's helmet may be used to identify buildings and immediately determine location in real time on the ground with a simple camera system)). This can benefit any suitable use cases, such as foot or vehicle war fighters/drones in a GPS denied environment.

In some embodiments, a method of achieving a live real-time global positioning estimate without use of GPS, may be provided. The method may include obtaining a camera image from at least one camera at a first moment in time (e.g., a frame of a full motion video captured by a drone), extracting a plurality of camera image features from the obtained camera image, accessing a plurality of map images from a pre-existing GPS/geo-tagged three-dimensional (3D) map/model (e.g., a mapping of the globe from Vricon and/or Google Earth), determining a plurality of map image features from each of the plurality of accessed map images, wherein each one of the extracting and determining may include identifying and describing image features that are stable and repeatable from different lighting conditions, view-points, and map representations using machine learning (ML) techniques that allow optimal feature description between camera image features and map image features by learning from patterns in the data distribution simultaneous localization and mapping (SLAM) and structure-from-motion (SfM)), detecting a particular one of the plurality of accessed map images as a closest match to the obtained camera image by comparing the extracted plurality of camera image features and the determined map image features, wherein the comparing may take into account descriptions of the image features and geometric information of the image features; and presenting, substantially in real-time with (e.g., immediately after) the obtaining, an estimated location of the camera based on a georeferenced localization of the detected particular accessed map image. The method may also include obtaining inertial measurements from an inertial measurement unit adjacent the at least one camera at the first moment in time, determining visual inertial odometry based on the obtained inertial measurements and based on the extracted plurality of camera image features (e.g., visual inertial SLAM), and attaining accurate and scalable 6-degree of freedom localization of the camera based on the determined visual inertial odometry and based on the estimated location of the camera.

Various systems of the disclosure may be configured to generate artificial renders from 3D models, determine a global position of a mobile subsystem in a GPS-denied environment using only images captured from the mobile subsystem as compared to geo-tagged 3D images in a database (e.g., comparing semantic edges from map renders with those from query image(s)), use multi-stage matching where a first stage may leverage location of first matches to filter features for use in a second stage for determining location and/or pose, and/or the like. Systems of the disclosure may be configured to compare features of a 3D map with features of query images, to compare maps of different kinds with imagery, and/or to corelate very well using descriptors determined by comparing both and/or training models with maps of which imagery is also accessible.

The use of one or more suitable models or engines or neural networks or the like (e.g., model 220, 224, 290, etc.) may enable estimation or any suitable determination of a localization of a mobile subsystem in an environment. Such models (e.g., neural networks) running on any suitable processing units (e.g., graphical processing units ("GPUs") that may be available to system 1) provide significant speed improvements in efficiency and accuracy with respect to estimation over other types of algorithms and human-conducted analysis of data, as such models can provide estimates in a few milliseconds or less, thereby improving the functionality of any computing device on which they may be run. Due to such efficiency and accuracy, such models enable a technical solution for enabling the generation or extraction of any suitable feature data (e.g., for enabling matching of image data and map data) and/or the generation of estimated pose data (e.g., for estimating the localization of a navigation-denied mobile subsystem), such as for controlling any suitable functionality of any suitable output assembly or other assembly or component(s) of any subsystem (e.g., for adjusting a user interface presentation of location to a user and/or for adjusting an output that may affect the control of a subsystem and/or the safety of a user or subsystem) using any suitable real-time data (e.g., data made available to the models (e.g., real time image data and/or inertial data that may be generated by a mobile subsystem)) that may not be possible without the use of such models, as such models may increase performance of their computing device(s) by requiring less memory, providing faster response times, and/or increased accuracy and/or reliability. Due to the condensed time frame and/or the time within which a decision with respect to such real-time data ought to be made to provide a desirable user experience, such models offer the unique ability to provide accurate determinations with the speed necessary to enable user safety and/or control within system 1.

One, some, or all of the processes described with respect to FIGS. 1-10 may each be partially or entirely implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 13 of FIG. 1A). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from an LPS subsystem to a mobile subsystem, from a mobile subsystem to an LPS subsystem, and/or from any suitable subsystem to any other suitable subsystem using any suitable communications protocol (e.g., the computer-readable medium may be communicated to a mobile subsystem 100 as at least a portion of application 19 via any suitable communications components and/or via any suitable network(s) 108). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

Any, each, or at least one module or component or subsystem of the disclosure may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. The number, configuration, functionality, and interconnection of the modules and components and subsystems of system 1 are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

Implementations within the scope of the present disclosure can be partially or entirely realized using a tangible computer-readable storage medium, or multiple tangible computer-readable storage media of one or more types, encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device (e.g., via one or more wired connections, one or more wireless connections, or any combination thereof).

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including, but not limited to, routines, subroutines, programs, data structures, objects, modules, applications, applets, functions, and/or the like. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations may be performed by one or more integrated circuits, such as ASICs or FPGAs. In one or more implementations, such integrated circuits may execute instructions that may be stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software may depend upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer" "server", "processor", and "memory" may all refer to electronic or other technological devices. These terms exclude people or groups of people. For the purposes of the specification, the terms "display" or "displaying" means displaying on an electronic device.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. The term "and/or" as used herein refers to and encompasses any and all possible combinations of one or more of the associated listed items. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" may each refer to only A, only B, or only C; any combination of A, B, and C; and/or at least one of each of A, B, and C. The terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, the terms "computer," "personal computer," "device," and "computing device" may refer to any programmable computer system that is known or that will be developed in the future. In certain embodiments, a computer will be coupled to a network, such as described herein. A computer system may be configured with processor-executable software instructions to perform the processes described herein. Such computing devices may be mobile devices, such as a mobile telephone, data assistant, tablet computer, or other such mobile device. Alternatively, such computing devices may not be mobile (e.g., in at least certain use cases), such as in the case of server computers, desktop computing systems, or systems integrated with non-mobile components.

As used herein, the terms "component," "module," and "system," are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or sonic aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While there have been described systems, methods, and computer-readable media for providing a localization processing service, many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the concepts of the disclosure can be practiced by other than the described embodiments, which are presented for purposes of illustration rather than of limitation.

What is claimed is:

1. A method of localizing a mobile subsystem comprising an image sensor component, an orientation sensor component, a memory component, and a processing module communicatively coupled to the image sensor component, the orientation sensor component, and the memory component, the method comprising:

storing, with the memory component, a map feature database comprising a plurality of map feature entries, wherein:

each map feature entry of the plurality of map feature entries is respectively associated with a rendered map image of a plurality of rendered map images rendered from a georeferenced three-dimensional map; and each map feature entry of the plurality of map feature entries comprises at least one map feature vector indicative of at least one map feature that has been extracted from the rendered map image associated with the map feature entry; and after the storing, while the mobile subsystem is denied communication with any navigation subsystem, the method further comprises:

moving the mobile subsystem;

after at least a portion of the moving, capturing, at a moment in time with the image sensor component, an image;

extracting, with the processing module, at least one captured image feature from the captured image;

generating, with the processing module, at least one captured image feature vector based on at least one of the at least one extracted captured image feature;

comparing, with the processing module, the at least one captured image feature vector with at least one map feature vector from each map feature entry of at least a portion of the plurality of map feature entries of the stored map feature database;

classifying, with the processing module, at least one particular map feature entry of the plurality of map feature entries as a matching map feature entry based on the comparing; and defining, with the processing module, an estimated location of the mobile subsystem at the moment in time based on the classifying.

2. The method of claim 1, further comprising presenting, substantially in real-time with the capturing, the estimated location of the mobile subsystem to a user of the mobile subsystem.

3. The method of claim 1, wherein:

each map feature entry of the plurality of map feature entries further comprises map orientation data indicative of a map orientation of the rendered map image associated with the map feature entry;

the method further comprising:

capturing, at the moment in time with the orientation sensor component, image orientation data indicative of an image sensor orientation of the image sensor component; and identifying, with the processing module, a proper subset of the plurality of map feature entries based on the image sensor orientation of the image sensor component indicated by the captured image orientation data; and the comparing comprises comparing the at least one captured image feature vector with at least one map feature vector from each map feature entry of only the proper subset of the plurality of map feature entries.

4. The method of claim 3, wherein the map orientation indicated by the map orientation data of each map feature entry of the proper subset of map feature entries is aligned with the image sensor orientation of the image sensor component indicated by the captured image orientation data.

5. The method of claim 3, wherein:

each map feature entry of the plurality of map feature entries further comprises map location data indicative of a map location of the rendered map image associated with the map feature entry; and the defining comprises defining the estimated location of the mobile subsystem at the moment in time based on the map location data of each classified matching map feature entry.

6. The method of claim 1, wherein:

each map feature entry of the plurality of map feature entries further comprises map location data indicative of a map location of the rendered map image associated with the map feature entry; and the defining comprises defining the estimated location of the mobile subsystem at the moment in time based on the map location data of each classified matching map feature entry.

7. The method of claim 1, wherein:

each map feature entry of the plurality of map feature entries further comprises map location data indicative of a map location of the rendered map image associated with the map feature entry of the plurality of map feature entries;

the storing further comprises storing, with the memory component, another map feature database comprising another plurality of map feature entries;

each map feature entry of the other plurality of map feature entries is respectively associated with a rendered map image of the plurality of rendered map images rendered from the georeferenced three-dimensional map;

each map feature entry of the other plurality of map feature entries comprises at least one other map feature vector indicative of at least one other map feature that has been extracted from the rendered map image associated with the map feature entry of the other plurality of map feature entries;

each map feature entry of the other plurality of map feature entries further comprises the map location data indicative of the map location of the rendered map image associated with the map feature entry of the other plurality of map feature entries; and after the classifying but before the defining, the method further comprises identifying, with the processing module, a proper subset of the other plurality of map feature entries based on the map location data of at least one classified matching map feature entry.

8. The method of claim 7, wherein the defining comprises defining the estimated location of the mobile subsystem at the moment in time based on the map location data of at least one map feature entry of the proper subset of the other plurality of map feature entries.

9. The method of claim 7, further comprising:

extracting, with the processing module, at least one other captured image feature from the captured image;

generating, with the processing module, at least one other captured image feature vector based on at least one of the at least one extracted other captured image feature;

analyzing, with the processing module, the at least one other captured image feature vector in comparison to at least one other map feature vector from each map feature entry of the proper subset of the other plurality of map feature entries of the stored other map feature database; and categorizing, with the processing module, at least one particular map feature entry of the proper subset of the other plurality of map feature entries as another matching map feature entry based on the analyzing, wherein the defining comprises defining the estimated location of the mobile subsystem at the moment in time based on the categorizing.

10. The method of claim 9, wherein:

the at least one other captured image feature is a local image feature; and the at least one captured image feature is a global image feature.

11. The method of claim 10, wherein:

the at least one extracted other captured image feature is an image edges feature; and the at least one map feature vector of each map feature entry of the other plurality of map feature entries is indicative of at least one map edges feature that has been extracted from the rendered map image associated with the map feature entry of the other plurality of map feature entries.

12. The method of claim 9, wherein the defining comprises defining the estimated location of the mobile subsystem at the moment in time based on the map location data of each categorized other matching map feature entry.

13. The method of claim 1, wherein:

the at least one extracted captured image feature is an image point feature; and the at least one map feature vector of each map feature entry of the plurality of map feature entries is indicative of at least one map point feature that has been extracted from the rendered map image associated with the map feature entry.

14. The method of claim 1, further comprising rendering the captured image prior to the extracting, wherein the extracting comprises extracting, with the processing module, the at least one captured image feature from the rendered captured image.

15. The method of claim 1, further comprising, prior to the comparing:

determining, with the processing module, a last known positioning of the mobile subsystem for the moment in time;

identifying, with the processing module, a subset of the plurality of map feature entries based on the determined last known positioning of the mobile subsystem;

for each map feature entry of the identified subset of the plurality of map feature entries, rendering, with the processing module, from the georeferenced three-dimensional map, the map image associated with that map feature entry; and extracting, with the processing module, the at least one map feature vector from the rendered map image for each map feature entry of the identified subset of the plurality of map feature entries.

16. The method of claim 15, wherein the comparing comprises comparing, with the processing module, the at least one captured image feature vector with the at least extracted one map feature vector from each map feature entry of at least a portion of the identified subset of the plurality of map feature entries.

17. The method of claim 1, wherein each map feature entry of the plurality of map feature entries is respectively associated with a position of the georeferenced three-dimensional map.

18. The method of claim 17, further comprising, after the at least a portion of the moving and prior to the comparing:

determining, with the processing module, an initial guess of a position of the mobile subsystem for the moment in time;

identifying, with the processing module, a subset of the plurality of map feature entries based on a similarity between the determined initial guess of the position of the mobile subsystem and the position associated with each map feature entry of the subset;

for each map feature entry of the identified subset of the plurality of map feature entries, rendering, with the processing module, from the georeferenced three-dimensional map, the map image associated with that map feature entry; and extracting, with the processing module, the at least one map feature vector from the rendered map image for each map feature entry of the identified subset of the plurality of map feature entries.

19. A method of localizing a mobile subsystem comprising an image sensor component, an orientation sensor component, a memory component, and a processing module communicatively coupled to the image sensor component, the orientation sensor component, and the memory component, the method comprising:

storing, with the memory component, a three-dimensional map;

after the storing, moving the mobile subsystem;

after the moving, capturing, at a moment in time with the image sensor component, an image;

determining, with the processing module, an initial guess of the positioning of the mobile subsystem for the moment in time;

rendering, with the processing module, a plurality of rendered map images from the stored three-dimensional map, wherein each rendered map image of the plurality of rendered map images is associated with a respective map positioning that is related to the determined initial guess of the positioning of the mobile subsystem for the moment in time;

extracting, with the processing module, the following:

at least one image feature from the captured image; and at least one map feature from each rendered map image of at least a subset of the plurality of rendered map images;

comparing, with the processing module, the at least one extracted image feature with the at least one extracted map feature from each rendered map image of the at least the subset of the plurality of rendered map images;

classifying, with the processing module, at least one rendered map image of the plurality of rendered map images as a matching rendered map image based on the comparing; and defining, with the processing module, an estimated location of the mobile subsystem at the moment in time based on the classifying.

20. The method of claim 19, wherein the defining comprises defining the estimated location of the mobile subsystem at the moment in time based on the map positioning associated with each classified matching rendered map image.

21. The method of claim 20, wherein the map positioning of any particular rendered map image comprises at least one of the following:

a map orientation; or a map location.

22. The method of claim 20, wherein the determined initial guess of the positioning comprises at least one of the following:

an orientation; or a location.

23. The method of claim 19, wherein each rendered map image of the plurality of rendered map images has a lower resolution than the captured image.

24. The method of claim 19, further comprising rendering the captured image prior to the extracting, wherein the extracting comprises extracting, with the processing module, the at least one image feature from the rendered captured image.

25. A method of localizing a mobile subsystem comprising an image sensor component, an orientation sensor component, a memory component, and a processing module communicatively coupled to the image sensor component, the orientation sensor component, and the memory component, the method comprising:

defining a map feature database comprising a plurality of map feature entries, wherein:

each map feature entry of the plurality of map feature entries is respectively associated with a rendered map image of a plurality of rendered map images rendered from a georeferenced three-dimensional map; and each map feature entry of the plurality of map feature entries comprises:

at least one map feature vector indicative of at least one map feature that has been extracted from the rendered map image associated with the map feature entry; and map location data indicative of a map location of the rendered map image associated with the map feature entry;

storing, with the memory component, the defined map feature database;

capturing, at a moment in time with the image sensor component, an image;

extracting, with the processing module, at least one captured image feature from the captured image;

generating, with the processing module, at least one captured image feature vector based on at least one of the at least one extracted captured image feature;

comparing, with the processing module, the at least one captured image feature vector with at least one map feature vector from each map feature entry of at least a portion of the plurality of map feature entries of the stored map feature database;

classifying, with the processing module, at least one particular map feature entry of the plurality of map feature entries as a matching map feature entry based on the comparing;

defining, with the processing module, an estimated location of the mobile subsystem at the moment in time based on the classifying, wherein the defining comprises defining the estimated location of the mobile subsystem at the moment in time based on the map location data of each classified matching map feature entry;

obtaining, at the moment in time with the orientation sensor component, an orientation of the image sensor component;

determining, with the processing module, mobile subsystem orientation data by virtual inertial odometry processing the obtained orientation of the image sensor component in conjunction with the at least one extracted captured image feature; and determining, with the processing module, a pose estimation of the mobile subsystem at the moment in time by global trajectory alignment processing the determined mobile subsystem orientation data in conjunction with the defined estimated location of the mobile subsystem at the moment in time.

26. The method of claim 25, wherein the determined pose estimation comprises a georeferenced position and orientation.

27. The method of claim 25, wherein the determining the pose estimation comprises inserting the determined mobile subsystem orientation data and the defined estimated location as constraints in a graph and using non-linear optimization to determine best alignment of the determined mobile subsystem orientation data and the defined estimated location in the graph.

28. The method of claim 25, wherein:

the storing the defined map feature database comprises:

storing, with the memory component, a global map feature database comprising a plurality of global map feature entries, wherein each global map feature entry of the plurality of global map feature entries comprises:

a global map feature that has been extracted from a respective global map image that has been rendered from a first three-dimensional map; and a global map location of the respective global map image;

storing, with the memory component, a local map feature database comprising a plurality of local map feature entries, wherein each local map feature entry of the plurality of local map feature entries comprises:

a local map feature that has been extracted from a respective local map image that has been rendered from a second three-dimensional map; and a local map location of the respective local map image;

the extracting comprises:

extracting a global image feature from the captured image; and extracting a local image feature from the captured image;

the method comprising:

identifying, with the processing module, a proper subset of the plurality of global map feature entries based on a comparison of the global image feature with the global map feature of each of at least some entries of the plurality of global map feature entries;

defining, with the processing module, a geographic range based on the global map location of each global map feature entry of the proper subset of the plurality of global map feature entries; and identifying, with the processing module, a proper subset of the plurality of local map feature entries based on a comparison of the geographic range with the local map location of each of at least some entries of the plurality of local map feature entries; and the defining comprises defining the estimated location of the mobile subsystem at the moment in time based on a comparison of the local image feature with the local map feature of each of at least some entries of the proper subset of the plurality of local map feature entries.

29. The method of claim 28, wherein the first three-dimensional map is the same as the second three-dimensional map.

30. The method of claim 28, wherein the first three-dimensional map is different than the second three-dimensional map.

* * * * *